(12) United States Patent
Omae et al.

(10) Patent No.: US 6,358,487 B1
(45) Date of Patent: Mar. 19, 2002

(54) CARBON BLACK AND PROCESS FOR PRODUCING THE SAME

(75) Inventors: Yoshihiro Omae; Nobutake Mise; Yutaka Fukuyama; Yuuichi Sekine; Takaharu Yamamoto; Hiroaki Takehara; Tsuyoshi Yamaguchi, all of Kitakyushu; Susumu Nakajima; Masanobu Ishida, both of Yokohama; Mamoru Nakayama, Yokkaichi; Hiroshi Maeda, Ibaraki, all of (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/297,056

(22) PCT Filed: Aug. 28, 1998

(86) PCT No.: PCT/JP98/03862

§ 371 Date: Jun. 22, 1999

§ 102(e) Date: Jun. 22, 1999

(87) PCT Pub. No.: WO99/11722

PCT Pub. Date: Mar. 11, 1999

(30) Foreign Application Priority Data

Aug. 28, 1997 (JP) .............................................. 9-232502
Aug. 28, 1997 (JP) .............................................. 9-232503
Aug. 28, 1997 (JP) .............................................. 9-232504
May 25, 1998 (JP) .............................................. 10-142524
May 25, 1998 (JP) .............................................. 10-142525
May 25, 1998 (JP) .............................................. 10-142526
May 25, 1998 (JP) .............................................. 10-142527
May 25, 1998 (JP) .............................................. 10-142528

(51) Int. Cl.$^7$ ................................................. C09C 1/50
(52) U.S. Cl. ....................................... 423/450; 423/455
(58) Field of Search ................................. 423/455, 450

(56) References Cited

U.S. PATENT DOCUMENTS

| | | | | |
|---|---|---|---|---|
| 3,490,869 A | * | 1/1970 | Heller | 423/455 |
| 4,391,789 A | * | 7/1983 | Estopinal | 423/450 |
| 5,262,146 A | * | 11/1993 | Kanamaru et al. | 423/455 |
| 5,772,975 A | * | 6/1998 | Mise et al. | 423/449.1 |

* cited by examiner

Primary Examiner—Stuart L. Hendrickson

(57) ABSTRACT

A carbon black having an average particle size of at most 13 nm, $D_{mod}$ of at most 80 nm, a $D_{1/2}/D_{mod}$ ratio of at most 0.6 and at least pH 5.

7 Claims, 12 Drawing Sheets

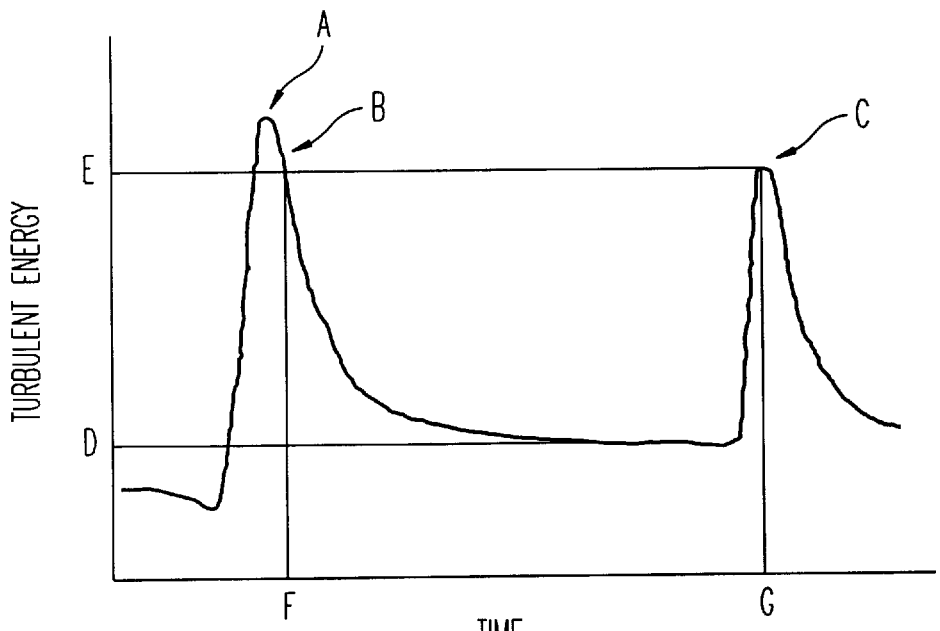
FIG. 3
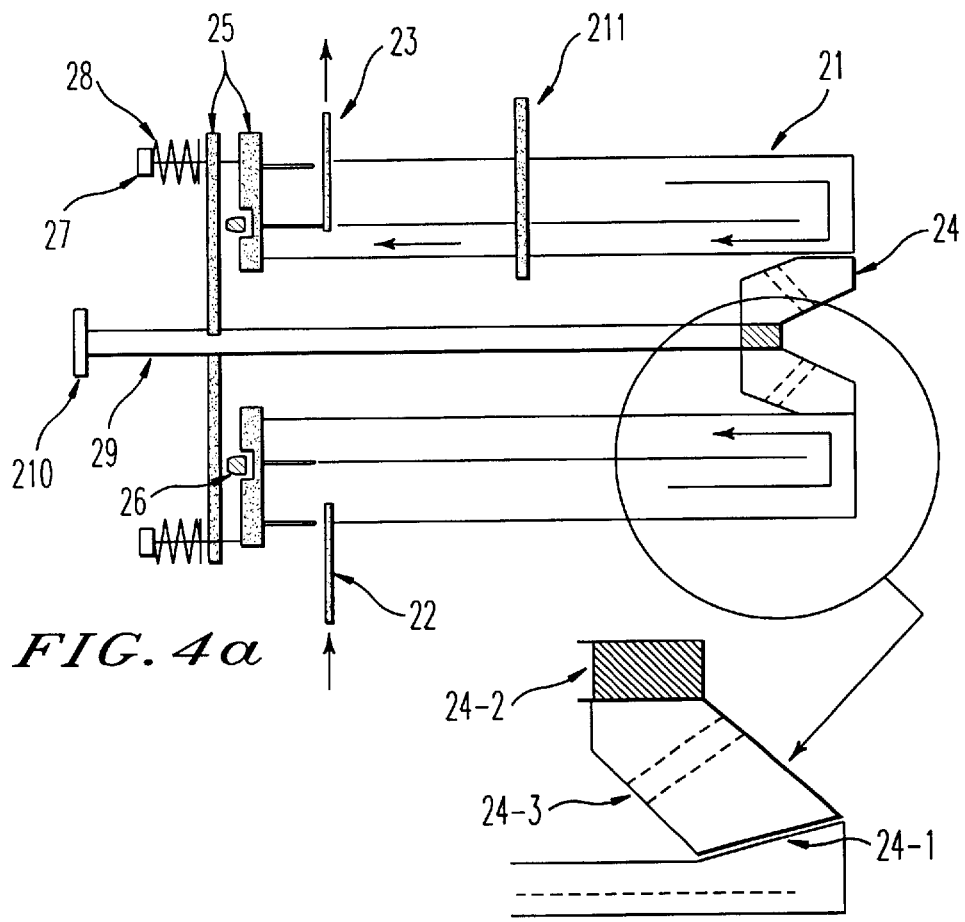
FIG. 4a
FIG. 4b

1: FIRST REACTION ZONE
2: SECOND REACTION ZONE
3: THIRD REACTION ZONE
4: CHOKE PART
5: NOZZLE FOR INTRODUCING FUEL AND OXIDATION GAS
6: NOZZLE FOR INTRODUCING MATERIAL OIL
7: NOZZLE FOR INTRODUCING FLUID FOR TERMINATING REACTION
8: CONTROL VALVE

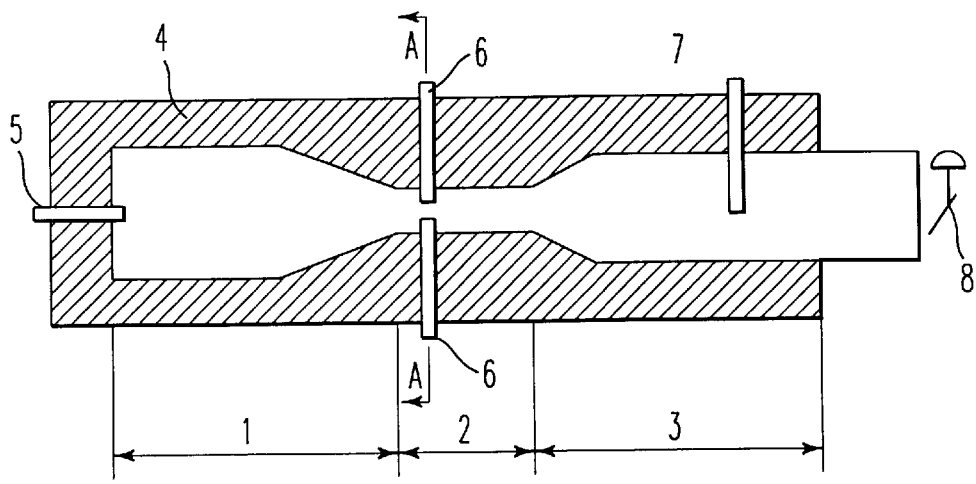

1: FIRST REACTION ZONE
2: SECOND REACTION ZONE
3: THIRD REACTION ZONE
4: REFRACTORY FURNACE
5: NOZZLE FOR INTRODUCING FUEL AND OXIDATION GAS
6: NOZZLE FOR INTRODUCING MATERIAL OIL
7: NOZZLE FOR INTRODUCING FLUID FOR TERMINATING REACTION
8: CONTROL VALVE

*FIG. 8*

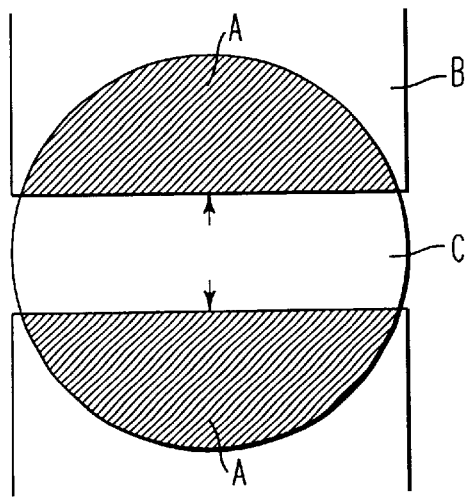

A: PART COVERED WITH NOZZLE FOR JETTING MATERIAL OIL
B: NOZZLE FOR JETTING MATERIAL OIL
C: CROSS SECTION OF PRODUCING FURNACE

*FIG. 9*

1: FIRST REACTION ZONE
2: SECOND REACTION ZONE
3: THIRD REACTION ZONE
4: NOZZLE FOR SUPPLYING MATERIAL OIL

1: FIRST REACTION ZONE
2: SECOND REACTION ZONE
3: THIRD REACTION ZONE

CARBON BLACK AND PROCESS FOR PRODUCING THE SAME

TECHNICAL FIELD

The present invention relates to carbon black which is useful for various applications such as a filling material, a reinforcing material, an electroconductive material or a coloring pigment, and an effective method for its production to control physical properties thereof.

BACKGROUND ART

Carbon black has been widely used as a pigment, a filler, a reinforcing pigment or a weather resistance-improving agent. As a method for its production, a furnace type production method by using a cylindrical carbon black producing furnace is widely known wherein in a first reaction zone, an oxygen-containing gas and a fuel are introduced in the furnace axis direction or in the tangent direction; while a high temperature combustion gas stream obtained by burning them is moved to a second reaction zone provided downstream to the first reaction zone in the furnace axis direction, a feed stock is introduced to the gas stream to form a carbon black; and the reaction gas is quenched to terminate the reaction in a third reaction zone.

Carbon black to be used as a coloring agent for resin coloring agents, printing inks or coating materials, is desired to be excellent in blackness, dispersibility, gloss and coloring power. Further, carbon black to be used mainly as a reinforcing agent for tires for vehicles is desired to be excellent in wear resistance.

Carbon black particles usually exist in a state where particles fuse each other such as the spitted doughboys, and each spherical particle merely characterizes the hill and the dale between doughboys. However, when considering it as a single particle, the particle size has a close relation with the performances in various applications, such as reinforcing property or blackness (Carbon black manual, 3rd edition, I. Abstract, page 7).

The particle size of carbon black is represented by a value obtained by direct measurement by taking a picture with several tens thousands magnifications by an electron microscope with a resolution of at least from 1.5 to 2 nm. The particle size or the first order particle size of carbon black usually means the particle size of carbon black thus measured. The particle size is within a range of from 10 to 300 nm depending upon the grade, and belongs to a region of so-called aerosol or colloid.

It is known that when carbon black is used as a black pigment, blackness and coloring power depend largely on the first order particle size of carbon black, and the smaller the first order particle size, the higher the blackness. The relation between the blackness and the first order particle size is disclosed, for example, in JP-A-50-68992. Further, it is known that when carbon black having such a small particle size is used as a reinforcing agent for tires, it shows high wear resistance.

In the case of using carbon black as a black pigment, ultrafine carbon black having a particle size of at most 15 nm has high blackness, and it is used for high grade coating materials, high grade resin coloring agents or the like. With regard to carbon black of this class, one produced by a channel method is called as HCC (High color Channel), and one produced by a furnace method is called as HCF (High Color Furnace).

Among carbon blacks of small particle size, ultrafine carbon black having a particle size of less than 14 nm has very high blackness, and used for highest grade coating materials, highest grade resin coloring agents or the like. All the articles on the market are occupied by one produced by the channel method. This may be attributable to a fact that in the channel method, carbon black of ultrafine particles having a particle size of from 13 to 14 nm, having a sharp particle size distribution, can be produced, and it shows very high blackness. Particularly in the field of high grade coating materials and high grade resin coloring agents, there is tendency that carbon black which shows highest blackness engrosses the market.

It is said that in order to obtain carbon black having a small particle size by the furnace method, it is effective to jet a feed stock into the high speed gas stream in the choke part installed in the second reaction zone, to atomize the liquid supplied material, by the kinetic energy and heat energy of the gas.

For example, JP-B-54-10358 describes that in order to effectively atomize and disperse the liquid introduced hydrocarbon, it is advisable that combustion gas flow rate at the part of jetting the liquid introduced feed stock is at least Mach 0.35, preferably within a range of from Mach 0.4 to Mach 0.8.

It is considered that for effective atomization and dispersion of the liquid feed stock, the higher the flow rate at the part of introducing the liquid feed stock, the better. However, in the case of attempting to obtain higher flow rate at the part of introducing the feed stock, when the flow rate at the part of introducing the feed stock is increased to nearly sound speed, for example, a significant pressure drop is brought about in the entire furnace. Particularly, in the case of jetting the feed stock in a relatively long choke part, the pressure drop tends to be large, and it will be unavoidable to significantly raise the performance of the peripheral equipment such as a blower for combustion air. Further, when the combustion gas is introduced into the choke part at a high speed, the part where the combustion gas directly or indirectly strikes, such as the choke inlet, will be damaged by the kinetic energy of the gas. Accordingly, it is desired to establish a method to raise the flow rate of the combustion gas at the part of introducing the feed stock to be from Mach 0.8 to Mach 1, without significant increase in the pressure drop or significant damage of the apparatus.

Further, it has also been known that carbon black having a small particle size can be obtained when the amount of material oil injected is made to be small relative to the amount of the combustion gas. However, the proportion of the material oil injected is small, productivity of carbon black decreases. As a method not to decrease the productivity, it has also been known to be effective to raise the temperature of gas at the region of injecting the material oil for effective production of carbon black having a small particle size. In such a case, in the production of furnace black, it is common to leave a certain amount of remaining oxygen in the gas at the part of injecting the starting oil, to partially burn the starting oil itself, thereby the temperature at the region of carbon black production is raised. However, with the method, a part of the material oil injected is used in the combustion reaction and is not formed into carbon black, thereby the yield tends to be low.

Accordingly, it is difficult to constantly produce one having a particle size of about 11 to about 14 nm with the conventional techniques of the furnace method. Even if one having a particle size of smaller than that can be produced, the particle size distribution is broad, and the same level of blackness as channel black can not be obtained. Further, in order to obtain one having a small particle size, it is necessary to extremely decrease the amount of the feed stock injected in the furnace relative to the amount of the combustion gas generated in the furnace, and as a result, the yield of the product will extremely decrease.

Further, in order to obtain high blackness with the conventional techniques of the furnace method, it is necessary not only to make the particle size small, but also to decrease a DBP oil absorption as a index of development of aggregate as mentioned hereinafter. As a method to make the DBP oil absorption small, usually an alkali metal salt or its solution is added into the material oil, or it is introduced into the combustion zone or the reaction zone. However, if the DBP oil absorption decreases, particularly in the case of blending carbon black in a vehicle for coating materials or in a resin, there are defects that dispersibility or fluidity deteriorates.

Heretofore, several reports have been made with regard to trials to produce carbon black corresponding to channel black by the furnace method. For example, JP-B-54-7632 discloses that with a method wherein a feed stock is vaporized to supply into the furnace, carbon black having an EM average particle size (corresponding to the average particle size) of 9 nm, an EM particle size standard deviation of 5.7 nm and a BET specific surface area/EM specific surface area ratio of 1.25, and carbon black having an EM average particle size of 14 nm, an EM particle size standard deviation of 5.5 nm and a BET specific surface area/EM specific surface area ratio of 1.25, can be obtained.

However, the size and distribution of the aggregate, as very important physical properties which influences, with the particle size, properties of carbon black, particularly blackness, are not described or mentioned at all. By judging from the BET specific surface area/EM specific surface area ratio being at most 1.3, high ratio of polycyclic aromatic hydrocarbon is estimated, and there is a probability that safety is not sufficient, as described hereinafter.

In the channel method, carbon black of ultrafine particles with high blackness can be produced. On the contrary, it is produced under oxygen atmosphere, the production process itself has defects that the yield of production is poor and productivity is low. As channel black having a small particle size produced by the channel method, for example, FW200 (commercial product produced by Degussa) is commercially available, and the particle size shall be 13 nm (value in the catalog). However, such channel black obtained by the channel method is produced under oxygen atmosphere, carbon black itself shows acidity. Accordingly, there are following important defects. Namely, it substantially possesses defects as follows:

(1) If it is blended in a resin, the obtained resin composition is likely to deteriorated.

(2) If it is blended in rubber, the obtained rubber composition tends to be poor in wear resistance.

(3) If an aqueous coating material composition is prepared, carbon black is likely to aggregate in the coating material composition.

On the other hand, not only the average value of the first order particle size, but also the distribution of the first order particle size has a significant impact on a tire tread rubber composition which requires a rubber property, particularly high wear resistance, and it is considered that the narrower the distribution of the first order particle size, the better. In general, the smaller the average particle size, the narrower the distribution, and a method to make the distribution of the first order particle size narrow is disclosed. For example, JP-A-3-33167 discloses a method to obtain carbon black having a relatively narrow particle size distribution, wherein the influence of the vortex flow generated at the outlet escalated part of the choke part, so-called "back mixing", will not be exerted on the reaction for carbon black production, by making the choke length to be sufficient for substantial completion of the reaction for carbon black production.

As a factor which influences the properties of carbon black, with the first order particle size, aggregate may be mentioned. The size of the aggregate has a significant impact on the tensile stress or the extruding property in the case of carbon black being blended in a rubber, or dispersibility, blackness or viscosity in the case of carbon black being blended in a vehicle for inks or coating materials or in a resin. Carbon black comprises assemblies of aggregates having the first order particles ranged with each other. To control the size or the shape of the aggregate results in to control the properties of carbon black itself, and it is more important than to control the first order particle size.

With regard to the effect of the aggregate, it is attempted to quantitate the size or the distribution, by considering the aggregate as a mere particle. When the aggregate is treated as a particle, various techniques for measuring particle size can be applied thereto, and the size of the aggregate thus measured is represented as the aggregate size. It has been becoming clear that the aggregate has a significant impact on the properties of carbon black, and many properties of carbon black which was considered to be resulted from the first order particle size, can be well explained rather by the aggregate size. For example, the aggregate size has an important role on optical properties such as coloring power or a dynamic viscoelasticity property or a reinforcing property of a blended rubber composition. In the case of application to resin coloring agents, it is known that the smaller the aggregate size, the higher the blackness.

Further, as an index of the aggregate, in addition to the aggregate size as an index when it is considered as a particle, an index such as a DBP oil absorption and cDBP may, for example, be known. The impact of cDBP on blackness and dispersibility is also known, and it is said that the lower cDBP, the lower dispersibility, although the higher the blackness.

As a method to make a aggregate size small, usually an alkali metal salt or its solution is added into the material oil, or it is introduced to the combustion zone or the reaction zone.

As an index representing the narrowness of the aggregate size distribution, $D_{1/2}/D_{mod}$ is employed, which is a ratio of the half width of the strokes diameter at the point of the peak $D_{1/2}$ to the strokes diameter at the point of the peak $D_{mod}$ in the strokes diameter distribution of aggregate by disc centrifuge. By controlling the value within a specific range, improved properties may, for example, be imparted to a rubber blended product having carbon black kneaded.

For example, Japanese Patent No. 2695701 discloses, as carbon black having improved handling and cornering performance, improved wear resistance and improved traction property, carbon black having CTAB of 162 m$^2$/g, a I$_2$ number of 206 mg/g, N$_2$SA of 197 m$^2$/g, a Tint value of 154%, cDBP of 100 cc/100 g, DBP of 133 cc/100 g, ΔDBP(ΔDBP=DBP-cDBP) of 33 cc/100 g, $D_{1/2}$ of 34 nm, $D_{mod}$ of 58 nm, a $D_{1/2}/D_{mod}$ ratio of 0.59 and a ASTM aggregation volume of 106129 nm$^3$.

It has been known that the aggregate size distribution has a significant impact on a tire tread rubber composition which requires a rubber property, particularly high wear resistance. The narrower aggregate size distribution is considered to be preferable. For example, JP-A-6-179774 describes that carbon black having uniform aggregate size distribution with $D_{1/2}/D_{mod}$ of 0.36, 0.40, 0.47 and 0.63 can be obtained by separating from generated carbon black powders. As mentioned above, two factors of the particle size and the aggregate are particularly important for application properties to carbon black.

However, in above-mentioned JP-A-6-179774, very complicated means is required such that generated carbon black powders are separated by the centrifugal separator to obtain carbon black having a narrow aggregate size distribution. It is also described that "improvement in generation step of carbon black is limited" and "$\Delta D_{50}/d_{st}$ (the same meaning as $D_{1/2}/D_{mod}$) obtainable with conventional carbon black is about 0.6 in the way".

As mentioned above, a certain extent of information could be obtained with regard to the impacts of carbon black having a narrow aggregate size distribution on the rubber property. However, it is extremely difficult to practically obtain desired aggregate size distribution, it is much more impossible to obtain means to simultaneously control several important properties such as the particle size of carbon black, the aggregate size and the aggregate size distribution, with known information alone.

Further, in the case where carbon black is blended in a vehicle for inks or coating materials or in a resin, if the particle size is made small and the aggregate size is made small, dispersibility or fluidity tends to deteriorate.

Accordingly, with regard to relation between properties of carbon black and resin properties, how to satisfy both blackness and dispersibility which are generally in an antinomic relation to each other, is important.

Further, it is an object to effectively produce such carbon black. Particularly, it is desired to directly produce carbon black having the same level of blackness as channel black or higher, having good dispersibility when blended in a coating material or a resin, and preferably, having no defect above mentioned like channel black has, by the furnace method with good production efficiency.

On the other hand, with regard to unreacted polycyclic aromatic hydrocarbons remaining in carbon black, risks of carcinogenesis are pointed out in recent years, and it is recently considered that when the ratio of them in carbon black as a product is high, there are problems in safety. Accordingly, it is required to produce safe carbon black by the furnace method with a good production efficiency, having same blackness as channel black, having good dispersibility when blended in a coating material or in a resin, and having a small ratio of unreacted polycyclic aromatic hydrocarbons in the product, thus being safe.

As explained above, with regard to relation between properties of carbon black and properties of a carbon black containing composition such as a resin composition, how to satisfy blackness and dispersibility which are in an antinomic relation to each other, and safety, is an important problem. Further, carbon black is also required to be excellent in wear resistance when it is blended with a rubber component to obtain a rubber composition, and to suppress deterioration of the resin composition. In addition, carbon black once dispersed can not be aggregated again.

It is an object of the present invention to provide carbon black wherein high blackness and good dispensability can be kept, and aggregation is prevented, when it is formed into various carbon black-containing compositions.

On the other hand, risks of calcinogenesis by unreacted polycyclic aromatic hydrocarbons remaining in carbon black, are pointed out in recent years. It is recently considered that if the ratio of them contained in carbon black as a product is high, there are problems in safety. Accordingly, it is required to produce carbon black by the furnace method with good production efficiency, having same blackness as channel black, having good dispensability when blended in a coating material or in a resin, and having a small ratio of unreacted polycyclic aromatic hydrocarbons in the product, thus being safe.

Accordingly, the present invention provides a method for effectively producing carbon black which satisfies both blackness and good dispersibility. The present invention further provides a production method to effectively obtain carbon black wherein the first order particle size is small, the aggregate size is small, the width of the aggregate distribution is narrow, and the amount of aggregates having a large particle size is small. The present invention further provides carbon black wherein when it is formed into various carbon black-containing compositions, high blackness and good dispensability can be kept, aggregation is prevented, and safety is high. In addition, the present invention provides carbon black wherein when it is formed into various carbon black-containing compositions, high blackness and good dispensability can be kept, aggregation is prevented, and safety is high.

Hereupon, it is clarified by studies by the present inventors that as a method for producing carbon black having a small particle size and high blackness, it is important condition factor to conduct heat decomposition of the feed stock oil at a high temperature, to make flow rate at the part of introducing material oil high, or the like. Here, it is clarified by studies by the present inventors that in the case where physical conditions such as making flow rate at the part of introducing material oil high are applied, to a practical carbon black producing furnace, equipments which supplies a significant amount of energy are required, and yet the effects on improving properties does not increase any more. Namely, it is difficult to obtain effects according to investment in equipment.

Therefore, it is considered that when the temperature at the region of injecting material oil high, useful means to effectively produce carbon black having a small particle size and high blackness can be obtained. However, for conventional carbon black producing furnace, alumina type (high alumina or ultra-high alumina) brick is used as a lining refractory material at the part of the maximum temperature. Therefore, there are problems that if it is contacted with a high temperature gas stream having a temperature higher than the fire resistant temperature (about 1900° C.), phenomena such as spalling or melt fusion are brought about, and thus it is impossible to conduct operation any more. Further, under conventional operation condition at a temperature lower than fire resistant temperature, there are defects such as lack of mechanical strength against wear during operation for a long period of time.

On the other hand, as an ultra-high temperature fire resistant substance, a zirconia refractory material has been known. Zirconia has a high melting point of 2700° C., and is resistant to very high temperature. However, there are defects that it is weak against high temperature gaseous phase, it has a high coefficient of thermal expansion, and thus it involves problems on organization techniques. Accordingly, when it is used for a carbon black furnace, required properties such as spalling resistance or heat resistant strength are not sufficient, and the carbon black furnace is severely damaged. Accordingly, it is difficult to practically use zirconia.

For problems on zirconia refractory material, it is proposed to improve properties by adding additives to the zirconia refractory material (JP-B-57-23673, JP-A-4-103670). However, it is clarified by the studies by the present inventors that in the operation for a long period of time, the additives will splash, and spalling resistance or heat resistant strength will be low. Accordingly, properties required for a carbon black furnace can not be adequately maintained with conventional techniques yet.

Further, it is proposed to forcibly cool the furnace and make the structure resistant against high temperature (JP-A-4-359068). However, such a structure may be a burden on cost or work efficiency when organizing or repairing the furnace, and heat loss due to cooling is inevitable. Accordingly, it is difficult to put the proposal into practical use.

DISCLOSURE OF INVENTION

The present inventors have analyzed and studied the factors which influence blackness and dispersion behavior of carbon black in matrix, to obtain carbon black having higher blackness and better dispersibility as compared with conventional one. Particularly, they have studied on the method for producing carbon black having blackness equal to or higher than channel black, and having good dispersibility, by a furnace method. As a result, they have found that fine aggregate will be a bad influence on dispersion, and large aggregate will be a bad influence on blackness, and thus carbon black having uniform aggregate free from fine aggregate or large aggregate, has high blackness and good dispersibility. Namely, they have found that carbon black having a small particle size, a small aggregate size and a sharp aggregate size distribution, particularly carbon black free from large aggregate, has high blackness and good dispersibility. Namely, it solves the problems of blackness and dispersibility which are believed to be in an antinomic relation to each other. Further, they have succeeded to directly produce novel carbon black having an average particle size of at most 13 nm, $D_{mod}$ of at most 80 nm and a $D_{1/2}/D_{mod}$ ratio of at most 0.6, by the furnace method, and found that its properties are extremely excellent.

Further, the present inventors have found that dispersibility of carbon black is influenced by, for example, the pH value, in addition to the particle size and the aggregate size. Namely, if the pH value is low, there are defects such that when carbon black is mixed with a resin, the resin is likely to decompose, and when carbon black is used as an aqueous coating material, aggregation is likely to take place. It is clarified that adjusting the pH of carbon black to be within a specific range contributes to dispersibility.

Namely, the first invention of the present specification resides in a carbon black having an average particle size of at most 13 nm, $D_{mod}$ of at most 80 nm, a $D_{1/2}/D_{mod}$ ratio of at most 0.6 and a pH of at least 5, and further, a resin composition, a rubber composition, a coating material composition and an ink composition characterized by containing such a carbon black.

Further, the present inventors have succeeded to directly produce novel carbon black having $N_2SA$ of at least 200 m²/g, $D_{mod}$ of at most 80 nm and a $D_{1/2}/D_{mod}$ ratio of at most 0.6 by the furnace method, and found that the properties are extremely excellent.

Namely, the second invention of the present specification resides in carbon black having $N_2SA$ of at least 200 m²/g, $D_{mod}$ of at most 80 nm, a $D_{1/2}/D_{mod}$ ratio of at most 0.6 and a pH of at least 5, and further, a resin composition, a rubber composition, a coating material composition and an ink composition characterized by containing such a carbon black.

Further, the present inventors have conducted various studies on a method for producing carbon black capable of solving defects which channel black possesses by the furnace method. As a result, it was clarified that in the case where the $N_2SA/SEM$ specific surface area ratio does not reach a specific value, the ratio of unreacted polycyclic aromatic hydrocarbon remaining in carbon black is too high to be ignored. In recent years, risks of calcinogenesis by polycyclic aromatic hydrocarbons are pointed out. It is considered that if carbon black as a product can be obtained wherein the ratio of them can be suppressed and at the same time good performance can be obtained, high safety can be obtained. The $N_2SA/SEM$ specific surface area ratio indicates the degree of pore area of the surface of the carbon black particles. It was found that by making the value to be a specific value or above, in the case where surface treatment of carbon black such as graft-modification treatment wherein a monomer is polymerized on the carbon black surface to conduct polymer coating is, for example, conducted the degree of surface treatment such as a graft-modification ratio may be improved. Further, when carbon black is used as electroconductive black, the electroconductivity will increase. Further, in the case where carbon black is used as a catalyst support supporting platinum or other metals, the particle size of the catalyst tends to be small and the activity is likely to be obtained, such being favorable.

Namely, the present inventors have found that in order to obtain carbon black having high blackness and high dispersibility, high safety and desired properties, it is important to control properties such as the pH or the $N_2SA/SEM$ specific surface area ratio to be within a desired range.

Further, the present inventors have found that it is important to control the balance of the pH and $N_2SA/SEM$ specific surface area to be within a specific range, in order to keep high wear resistance when it is formed into a rubber composition, to prevent deterioration of a resin composition, and to prevent aggregation of an aqueous coating material. Accordingly, it was desired to effectively produce carbon black having such properties controlled.

As a result of further extensive studies, the present inventors have succeeded to produce a novel carbon black having an average particle size of at most 13 nm, a $N_2SA/SEM$ specific surface area ratio of higher than 1.3 and a pH value of at least 5, and found that the carbon black shows extremely excellent properties. Further, they have succeeded to produce a novel carbon black having the average particle size, the $N_2SA/SEM$ specific surface area ratio, the pH value and the CDBP value adjusted to be within a specific range, and found that the carbon black shows extremely excellent properties.

Namely, the third invention of the present specification resides in carbon black having an average particle size of less than 13 nm, a $N_2SA/SEM$ specific surface area ratio of higher than 1.3 and a pH value of at least 5, and a coating material composition, a resin composition, a rubber composition and a ink composition characterized by containing such a carbon black.

Namely, the fourth invention of the present specification resides in carbon black having an average particle size of at most 14 nm, a $N_2SA/SEM$ specific surface area ratio of higher than 1.3, a pH value of at least 5 and cDBP of at least 50 cc/100 g, and a coating material composition, a resin composition, a rubber composition and an ink composition characterized by containing such a carbon black.

Although above-mentioned JP-B-54-7632 describes carbon black having a BET specific surface area/EM specific surface area ratio of at most 1.3, it does not mention a BET specific surface area/EM specific surface area and the advantage of making the value to be a specific value or above, and it does not describe or mention the pH, the size or distribution of the aggregate and cDBP, which are important properties influencing blackness with the particle size, and the influences of them on dispersibility or blackness at all.

Further, the present inventors have studied to obtain carbon black having high blackness and good dispersibility, as compared with conventional one. During the study, they have found that carbon black having blackness and dispensability simultaneously can be obtained by not only controlling the aggregate size and the aggregate distribution, but also controlling the mode of the aggregate, i.e. the degree of structure development.

The present inventors have paid attention to the $DBP/D_{mod}$ value which is a ratio of DBP representing the degree of aggregate development to $D_{mod}$ representing the size of the aggregate, and they have found that good dispersibility can be obtained while high blackness can be kept by controlling the ratio to be at a specific value or above, and the present invention has been achieved.

The present inventors have found that carbon black having a small aggregate size and a value of the $DBP/D_{mod}$ ratio being at least a certain extent, has higher blackness and better dispersibility as compared with conventional one.

The value of the $DBP/D_{mod}$ ratio being at least a certain extent means that the volume of the pore part of the aggregate is large relative to the size of the aggregate. This is estimated to indicate the shape of the aggregate being closer to linear. This is considered to satisfy both properties of blackness and dispersibility which are in an antinomic relation to each other.

Further, they have found that fine aggregate will be a bad influence on dispersion, large aggregate will be a bad influence on blackness, and thus carbon black having uniform aggregate free from fine aggregate or large aggregate has both properties of blackness and good dispersibility which have been considered to be in an antinomic relation to each other. And they have found novel carbon black having a $DBP/D_{mod}$ ratio of at least 3.6 while keeping $D_{mod}$ to be at most 80 nm, preferably at most 40 nm. The carbon black has a ratio of the half width of the stokes diameter at the point of the peak to the stokes diameter at the point of the peak $D_{mod}$, i.e. the $D_{1/2}/D_{mod}$ ratio of preferably at most 0.6, more preferably at most 0.55. Further, in order to obtain high blackness, the average particle size is preferably at most 13 nm, and the present inventors have succeeded to produce such a carbon black. And they have found novel carbon black having a $DBP/D_{mod}$ ratio of at least 3.4, while keeping $D_{mod}$ to be at most 80 nm, preferably at most 40 nm. Further, in order to obtain high blackness, the average particle size is preferably at most 13 nm, and the present inventors have succeeded also to produce such a carbon black.

Although above-mentioned JP-B-54-7632 describes carbon black having an EM average particle size of 14 nm and a small particle size of 9 nm, it does not describe about e.g. the size of the aggregate which is an important property influencing blackness with the particle size. Accordingly, the present invention is novel and can not be predicted from the conventional techniques.

Namely, the fifth invention of the present specification resides in carbon black having $DBP/D_{mod}$ of at least 3.4 and $D_{mod}$ of at most 80 nm, and a resin composition, a rubber composition, a coating material composition and an ink composition characterized by containing such a carbon black.

As explained above, the present inventors have analyzed and studied on factors which influence blackness and dispersion behavior of carbon black in the matrix, in order to obtain carbon black having higher blackness and better dispensability as compared with conventional one. As a result, they have found that fine aggregate will be a bad influence on dispersion, large aggregate will be a bad influence on blackness, and thus carbon black having uniform aggregate free from fine aggregate or large aggregate has high blackness and good dispersibility. Namely, carbon black having a small particle size, a small aggregate size, a sharp aggregate size distribution and no large aggregate has high blackness and good dispersibility. Namely, they have found that such a carbon black solves above-mentioned problems of blackness and dispersibility which are considered to be in an antinomic relation to each other. They have further conducted extensive studies on effective conditions to obtain carbon black having such excellent properties. As a result, they have found the following information, and achieved the sixth to eighth inventions of the present specification. They have found that carbon black having above-mentioned excellent properties can be effectively produced by using a producing furnace having a specific choke part and making the part of introducing a feed stock to be under specific condition, and achieved the sixth invention of the present specification. Unexpectedly, the present inventors have found that by using a producing furnace provided with a choke part having at least certain length, and making the oxygen concentration at the part of introducing the feed stock as small as possible, uniform carbon black wherein the particle size is small, the aggregate size is small, and the aggregates having a large particle size are suppressed, can be obtained with a good yield. Namely, the sixth invention of the present specification resides in a method for producing carbon black, which comprises using a producing furnace having a first reaction zone wherein a high temperature combustion gas stream is formed, a second reaction zone having a choke part wherein a feed stock is mixed with the obtained high temperature combustion gas stream to produce carbon black, and a third reaction zone located at the downstream to the second reaction zone for terminating the reaction, wherein the choke part length is at least 800 mm and the oxygen concentration in the combustion gas at the part where the feed stock is introduced is at most 3 vol %.

Then, they have found that the carbon black having above-mentioned excellent properties can be effectively produced by using a carbon black producing furnace having a specific choke part, and by making the flow rate of the combustion gas in the choke part to be within a specific range, and achieved the seventh invention of the present specification.

Namely, the seventh invention of the present specification resides in a method for producing carbon black, which comprises using a producing furnace having a first reaction zone wherein a high temperature combustion gas stream is formed, a second reaction zone having a choke part wherein a feed stock is mixed with the obtained high temperature combustion gas stream to produce carbon black, and a third reaction zone located at the downstream to the second reaction zone for terminating the reaction, wherein the choke part length is least 800 mm, the choke part diameter is at most 170 mm and the flow rate of the combustion gas in the choke part is at least 250 m/s.

Further, they have found the following information, and achieved the eighth invention of the present specification.

It has been clarified that in order to make the particle size of the first order particles small, it is effective to make the droplet size of the feed stock as small as possible immediately after the feed stock is introduced to the combustion gas in the producing furnace.

Then, they have studied on controlling the first order particle size and the aggregate size. As a result, it has been clarified that in order to produce carbon black having a small particle size and a small aggregate size, it is necessary to make the time for formation and carbonization of carbon black to be short, namely, it is necessary to form carbon black in as short period of time as possible.

Accordingly, it is necessary to shorten the time after the liquid feed stock is jetted into the combustion gas until it will evaporate, to shorten the time for production of carbon black precursor and carbon black, and to make the feed stock to effectively absorb the heat energy of the surrounding heat gas after the feed stock is introduced in the heat gas.

The present inventors have further studied on conditions to satisfy atomizing the droplet of the feed stock and shortening the time for carbon black formation reaction by effective utilization of the surrounding heat gas energy as mentioned above, and found that the above object could be achieved by making the part of introducing the feed stock to be under specific conditions.

Namely, the eighth invention of the present specification resides in a method for producing carbon black, which comprises using a producing furnace having a first reaction zone wherein a high temperature combustion gas stream is formed, a second reaction zone having a choke part wherein a feed stock is mixed with the obtained high temperature combustion gas stream to produce carbon black, and a third reaction zone located at the downstream to the second reaction zone for terminating the reaction, wherein the turbulent mixing speed at the part where the feed stock is introduced is at least 120/s.

Within a range defined by the sixth to eighth production methods of the present invention, by changing various conditions such as the amount of the feed stock inserted, carbon black having various desired physical properties can be produced. Accordingly, various types of carbon black useful for various applications can be optionally produced with a high yield.

Now, the first invention of the present specification will be explained. Carbon black of the first invention of the present specification has an average particle size of at most 13 nm, particularly preferably from 8 to 12 nm. If the average particle size exceeds 13 nm, blackness is not sufficient when carbon black is formed into a coating material. Here, the average particle size indicates the average size of the particle size obtained by an electron microscope method.

In the first invention of the present specification, $D_{mod}$ is at most 80 nm, and a $D_{1/2}/D_{mod}$ ratio of at most 0.6, preferably at most 0.55.

Here, $D_{1/2}/D_{mod}$ indicates the ratio of the half width of the stokes diameter at the point of the peak to the stokes diameter at the point of the peak $D_{mod}$ in the stokes diameter distribution of aggregate by disc centrifuge. Carbon black having the ratio of at most 0.6, preferably at most 0.55, and further, carbon black having the ratio of the volume 75% diameter $D_{75}$ to $D_{mod}$, $D_{75}/D_{mod}$ of at most 1.6, preferably at most 1.3, can be obtained. This carbon black is one wherein the content of large aggregate having an aggregate size of larger than the volume 75% size, which will be a bad influence on dispersion, is extremely low. Namely, carbon black wherein the particle size is small, the aggregate size is small, the aggregate size distribution is sharp, and the amount of large aggregate is small, can be effectively obtained.

Accordingly, by adjusting the particle size, the aggregate size and the aggregate size distribution to be within a specific range, an excellent property which satisfies blackness and dispersibility simultaneously, can be obtained. Namely, carbon black of the present invention is extremely excellent in blackness, and dispersibility in various vehicles is improved.

Further, carbon black of the present invention has a pH of at least 5. If the pH is less than 5, a resin composition made by using such a carbon black is likely to deteriorate, and a rubber composition made by using such a carbon black is poor in wear resistance, and in the case of using such a carbon black to prepare an aqueous coating material, carbon black is likely to aggregate, such being problematic. A pH of at most 6 is particularly preferred. A method for measuring the pH is in accordance with a method described in JISK6221-1982. As mentioned above, channel black which is available on the market as carbon black having an excellent blackness and a small particle size, has a low pH of less than 5, usually less than 3, from the method.

Carbon black of the first invention of the present specification as mentioned above is novel and extremely useful one, and it can be obtained by a relatively easy method with a good productivity as mentioned hereinafter.

Carbon black of the first invention of the present specification satisfies blackness and dispersibility simultaneously which are believed to be in an antinomic relation to each other, by making above-mentioned particle size, $D_{mod}$, $D_{1/2}/D_{mod}$ ratio and pH to be within a specific range. cDBP is preferably at least 50 cc/100 g. cDBP is also called as breaking DBP absorption number, and measured in accordance with ASTM D-3493-88. If cDBP is less than 50 cc/100 g, dispersibility tends to be poor. The value of cDBP is particularly preferably at least 60 cc/100 g.

Now, the second invention of the present specification will be explained. Carbon black of the second invention has a nitrogen absorption specific surface are ($N_2SA$) of at least 200 m$^2$/g. Preferably it is at least 400 m$^2$/g, more preferably at least 500 m$^2$/g. If $N_2SA$ is less than 200 m$^2$/g, blackness tends to be insufficient when carbon black is formed into a coating material.

In the second invention of the present specification, $D_{mod}$ is at most 80 nm, and a $D_{1/2}/D_{mod}$ ratio is at most 0.6, preferably at most 0.55. $D_{mod}$ is particularly preferably from 20 to 80 nm. Carbon black having such a small aggregate size displays significant blackness as a coloring agent, and is excellent in physical properties when it is formed into a rubber composition.

Here, $D_{1/2}/D_{mod}$ is the ratio of the half width of the stokes diameter at the point of the peak $D_{1/2}$ to the stokes diameter at the point of the peak in the stokes diameter distribution of aggregate by disc centrifuge. Carbon black having the ratio of at most 0.6, and further, carbon black having $D_{75}/D_{mod}$ which is the ratio of the volume 75% size to $D_{mod}$, of at most 1.6, preferably at most 1.3, can be obtained. This carbon black is one wherein the content of large aggregate having an aggregate size of larger than the volume 75% size, which will be a bad influence on dispersion, is extremely low. Namely, carbon black wherein the particle size is small, the aggregate size is small, the aggregate size distribution is sharp, and the amount of large aggregate is small, can be effectively obtained.

Accordingly, by adjusting the specific surface area, the aggregate size and the aggregate size distribution to be within a specific range, an excellent property which satisfies blackness and dispersibility simultaneously can be obtained.

Namely, carbon black of the present invention is extremely excellent in blackness, and the dispersibility in various vehicles is improved.

Further, the carbon black of the second invention of the present specification has a pH of at least 5. If the pH is less than 5, a resin composition made by using such a carbon black is likely to deteriorate, a rubber composition made by using such a carbon black is poor in wear resistance, and in the case of using such a carbon black to prepare an aqueous coating material, the carbon black is likely to aggregate, such being problematic. Particularly preferably the pH is at least 6. The method for measuring pH is as mentioned above.

Now, the third invention of the present specification will be explained. Carbon black of the third invention has an average particle size of less than 13 nm, particularly preferably from 8 to 12 nm. If the particle size is 13 nm or above, blackness tends to be insufficient when carbon black is formed into a coating material. Here, the average particle size indicates the average size of the particle size obtained by electron microscope method.

Carbon black of the third invention of the present specification has a $N_2SA/SEM$ specific surface area ratio of larger than 1.3. If the ratio is 1.3 or below, it is hard to conduct oxidation treatment, such being problematic. Further, the ratio correlates with the ratio of unreacted polycyclic aromatic hydrocarbon remaining in carbon black. One having the ratio of at most 1.3 is unfavorable in view of safety, since the amount of polycyclic aromatic hydrocarbons can not be ignored. In the present invention, the $N_2SA/SEM$ specific surface area ratio is higher than 1.3, preferably at least 1.5, more preferably at least 1.8. On the other hand, if the ratio is too high, the viscosity increases, or dispersibility is badly influenced, when it is formed into an ink composition. Accordingly, it is usually preferably at most 2.8, particularly preferably at most 2.5.

Further, carbon black of the third invention of the present specification has a pH of at least 5. If the pH is less than 5, a resin composition made by using such a carbon black is likely to deteriorate, a rubber composition made by using such a carbon black is poor in wear resistance, and in the case of using such a carbon black to prepare an aqueous coating material, carbon black is likely to aggregate, such being problematic. Particularly preferably it is at least 6. Methods for measuring pH and $N_2SA/SEM$ are as mentioned above.

The third carbon black of the present specification satisfies blackness and dispersibility simultaneously, and is excellent in safety, by making above-mentioned particle size, $N_2SA/SEM$ specific surface area ratio and pH to be within a specific range.

In the third invention of the present specification, the aggregate size is not particularly limited. However, $D_{mod}$ is preferably at most 80 nm, more preferably at most 40 nm. As mentioned above, the roles of the aggregate size on dispersibility and blackness are becoming clear. Carbon black of the present invention having a particle size, a $N_2SA/SEM$ specific surface area ratio and a pH adjusted to be a specific value, displays suitable properties when $D_{mod}$ is at most 80 nm, more preferably at most 40 nm.

As mentioned above, an excellent property which satisfies blackness and dispersibility simultaneously can be obtained by adjusting the particle size and the aggregate size to be within a specific range.

Further, by adjusting the $D_{1/2}/D_{mod}$ ratio to be at most 0.6, preferably at most 0.55, extremely excellent blackness can be obtained, and dispersibility improves.

Here, $D_{1/2}/D_{mod}$ is the ratio of the half width of the stokes diameter at the point of the peak $D_{1/2}$ to the stokes diameter at the point of the peak $D_{mod}$ in the stokes diameter distribution of aggregate by disc centrifuge. Carbon black having the ratio of at most 0.6, and further, carbon black having $D_{75}/D_{mod}$ which is the ratio of the volume 75% size $D_{75}$ to $D_{mod}$ of at most 1.6, can be obtained. This carbon black is one wherein the content of large aggregate having an aggregate size of larger than the volume 75% size, which will be a bad influence on dispersion, is extremely low. Namely, carbon black wherein the particle size is small, the aggregate size is small, the aggregate size distribution is sharp, and the amount of large aggregate is small, can be effectively obtained. Further, the present inventors have found that in order to obtain higher blackness, it is preferred that carbon black has $D_{mod}$ of from 20 to 80 nm and cDBP of at most 50 cc/100 g, and succeeded to produce such a carbon black.

Further, cDBP is preferably at least 50 cc/100 g. cDBP is also called as breaking DBP absorption number, and measured in accordance with ASTM D-3493-88. If cDBP is less than 50 cc/100 g, dispersibility tends to be poor. The value of cDBP is particularly preferably at least 60 cc/100 g.

Now, the fourth invention of the present specification will be explained. Carbon black of the fourth invention has an average particle size of at most 14 nm. Particularly preferably it is from 8 to 12 nm. If the particle size exceeds 14 nm, blackness tends to be insufficient when carbon black is formed into a coating material. Here, the average particle size indicates the average size of the particle size obtained by an electron microscope method.

Carbon black of the fourth invention of the present specification has a $N_2SA/SEM$ specific surface area ratio of higher than 1.3. The ratio correlates with the ratio of unreacted polycyclic aromatic hydrocarbon remaining in carbon black. One having the ratio of at least 1.3 is preferred in view of safety, since the amount of the polycyclic aromatic hydrocarbon can be significantly reduced. In the fourth invention of the present specification, $N_2SA/SEM$ specific surface area ratio is higher than 1.3, preferably at least 1.5, more preferably at least 1.8. On the other hand, if the ratio is too high, the viscosity may increase, or dispersibility may be badly influenced, when it is formed into a ink composition. Accordingly, it is usually preferably at most 2.8, particularly preferably at most 2.5.

The $N_2SA/SEM$ specific surface area ratio is obtained by obtaining each $N_2SA$ and $N_2SA/SEM$ specific surface area, and calculating the ratio. The measurement of $N_2SA$ is determined in accordance with ASTM D-3037-88. The measurement of the SEM specific surface area is calculated from the following formula:

$$SEM=6000/(\rho \cdot dA)$$

$\rho$: Specific gravity of carbon black (1.86 g/cm$^3$)
dA: Volume area particle size (nm)

Further, carbon black of the fourth invention of the present specification has a pH of at least 5. If the pH is less than 5, a resin composition obtained by using such a carbon black is likely to deteriorate, a rubber composition obtained by using such a carbon black tends to be poor in wear resistance, and in the case of using such a carbon black to prepare an aqueous coating material, carbon black is likely to aggregate, such being problematic. It is particularly preferably at least 6. The method for measuring pH is as mentioned above.

In the fourth invention of the present specification, CDBP is at least 50 cc/100 g. CDBP is also called as breaking DBP absorption number, and measured in accordance with ASTM D-3493-88. If CDBP is less than 50 cc/100 g, dispersibility tends to be poor. The value of CDBP is particularly preferably at least 60 cc/100 g.

Carbon black of the fourth invention of the present specification satisfies blackness and dispersibility simultaneously, and is excellent in safety, by making above-mentioned particle size, $N_2SA/SEM$ specific surface area ratio, pH and cDBP to be within a specific range.

In the fourth invention of the present specification, the aggregate size is not particularly limited. However, $D_{mod}$ is preferably at most 80 nm, more preferably at most 40 nm. As mentioned above, the roles of the aggregate size on dispersibility and blackness are becoming clear. Carbon black having a particle size, a $N_2SA/SEM$ specific surface area ratio, a pH and cDBP adjusted to be a specific value, displays suitable properties when $D_{mod}$ is at most 80 nm, more preferably at most 40 nm. Particularly preferably, by adjusting the ratio of the half width of the stokes diameter at the point of the peak $D_{1/2}$ to the stokes diameter at the point of the peak $D_{mod}$, $D_{1/2}/D_{mod}$ to be at most 0.6, preferably at most 0.55, carbon black wherein blackness is extremely excellent, and dispersibility is improved, can be obtained. Further, within a range of the present invention, $D_{75}/D_{mod}$ which is the ratio of the volume 75% size $D_{75}$ to $D_{mod}$ is preferably at most 1.6, particularly preferably at most 1.3. This carbon black is one wherein the content of large aggregate having an aggregate size of larger than the volume 75% size, which will be a bad influence on dispersion, is extremely low. Namely, in the present invention, the average particle size is less than 13 nm, the $N_2SA/SEM$ specific surface area ratio is higher than 1.3, and the pH value is at least 5. The present invention resides in such a carbon black and a coating material composition, a resin composition, a rubber composition and an ink composition characterized by containing such a carbon black.

Carbon black of the fifth invention of the present specification is one having $DBP/D_{mod}$ of at least 3.4, $D_{mod}$ of at most 80 nm, preferably at most 40 nm. If $DBP/D_{mod}$ is less than 3.4, dispersibility tends to be insufficient when carbon black is used as a black pigment, and if $D_{mod}$ exceeds the range, blackness tends to be insufficient.

Further, the ratio of the half width of the stokes diameter at the point of the peak $D_{1/2}$ to the stokes diameter at the point of the peak $D_{mod}$ in the stokes diameter distribution of aggregate by disc centrifuge, $D_{1/2}/D_{mod}$ is at most 0.6, preferably at most 0.55.

Further, carbon black having $D_{75}/D_{mod}$ which is the ratio of the volume 75% size to $D_{mod}$ of at most 1.6, preferably at most 1.3, can be obtained. This carbon black is one wherein the content of large aggregate having an aggregate size of larger than the volume 75% size, which will be a bad influence on dispersion, is extremely low. Namely, carbon black wherein the particle size is small, the aggregate size is small, the aggregate size distribution is sharp, and the amount of large aggregate is small, can be effectively obtained.

Accordingly, by adjusting the aggregate size, the aggregate distribution and the particle size to be within a specific range, an excellent property which satisfies blackness and dispersibility simultaneously can be obtained. Namely, carbon black of the fifth invention of the present specification is highly excellent in blackness, and the dispersibility to various vehicles is improved.

Further, the carbon black of the fifth invention of the present specification has a pH of at least 5. If the pH if less than 5, a resin composition obtained by using such a carbon black is likely to deteriorate, a rubber composition obtained by using such a carbon black tends to be poor in wear resistance, and in the case of using such a carbon black to prepare an aqueous coating material, carbon black is likely to aggregate, such being problematic. Particularly preferably pH is at least 6. The method for measuring pH is as mentioned above.

A method to obtain above-explained carbon blacks of the first to fifth inventions of the present specification is not particularly limited. However, they can be suitable produced by production methods which are the sixth and subsequent inventions of the present specification as explained hereinafter. The sixth invention of the present specification relates to so-called furnace method wherein carbon black is obtained by introducing a feed stock in a producing furnace having a first reaction zone, a second reaction zone and a third reaction zone.

The constitution of the present invention will be explained with reference to Figures.

FIG. 1 is a longitudinal schematic diagram of important part illustrating an example of a carbon black producing furnace used in the present invention.

The furnace is divided, in the length direction, into a first reaction zone 1 wherein a high temperature combustion gas stream is formed, a second reaction zone 2 having a choke part (having a choke part 4) wherein a feed stock is mixed with the obtained high temperature combustion gas stream to form carbon black, and the third reaction zone 3 located at the downstream connected from the second reaction zone for terminating the reaction. As the process of each reaction zone itself, the same method as a conventional process can basically be employed.

In the first reaction zone, usually a feed stock and oxygen-containing gas are introduced from a combustion nozzle 5, to generate a high temperature combustion gas stream. As the oxygen-containing gas, air, oxygen or their mixture is usually used. As the fuel hydrocarbon, hydrogen, carbon monoxide, natural gas, petroleum gas, a petroleum type liquid fuel such as heavy oil, or a coal type liquid fuel such as creosote oil, may be usually used.

In the second reaction zone, a feed stock is introduced into the high temperature combustion gas stream obtained in the first reaction zone, as it is jetted from a nozzle 6 for introducing feed stock provided in parallel with or in a transverse direction to the high temperature combustion gas stream, whereupon the feed stock is thermally decomposed and converted to carbon black.

As the feed stock, usually an aromatic hydrocarbon such as benzene, toluene, xylene, naphthalene or anthracene, a coal type hydrocarbon such as creosote oil or carboxylic acid oil, a petroleum type heavy oil such as ethylene heavy end oil or FCC oil, an acetylene type unsaturated hydrocarbon, an ethylene type hydrocarbon, or an aliphatic saturated hydrocarbon such as pentane or hexane, may, for example, be suitable used.

In the third reaction zone, in order to cool the high temperature reaction gas to a level of not higher than 1000 to 800° C., a liquid cooling medium such as water or a gas cooling medium is jetted from a nozzle 7 for introducing fluid to terminate the reaction. Cooled carbon black can be recovered by a conventional process, such as a process of separating it from the gas by means of e.g. a collecting bag filter. In the Figure, 8 is a control valve.

In the present invention, the second reaction zone has a choke part. The choke part is a part where the cross-sectional area suddenly becomes narrow. In the present invention, the choke part is at least 800 mm. It is particularly preferably from 800 to 3000 mm. The present inventors have found that the aggregate size of obtained carbon black can be made very small particularly within the range.

By extensive studies of the present inventors, it has been found that the region where the aggregate forms is free from a highly turbulent site due to e.g. a change in the flow path such as in a throttle portion. Further, it has been clarified that in the case of controlling the aggregate distribution, longer time is required for control as compared with the case of controlling the particle size distribution. Accordingly, it is estimated that as the choke part has a certain length, conditions of the reaction zone can be uniform until the first order particles and the aggregates of carbon black are formed after the feed stock is supplied, and the highly turbulent site due to e.g. a change in the flow path can be suppressed until the completion of the reaction of the first order particles and the aggregates of carbon black formation after the feed stock is supplied. Accordingly, having the choke part of a certain length contributes to controlling the aggregate distribution, and is effective to prevent the formation of large aggregate.

Here, the choke part inlet which is the starting point of the choke part, is a part which includes the narrowest flow path, and at which the angle against the axis direction in which the flow path reduces changes from a value exceeding 50° to not higher than 5°. On the other hand, the choke part outlet which is the final point of the choke part, is a part at which the angle against the axis direction in which the flow path reduces becomes a value exceeding 5°. Further, in the seventh invention of the present specification, the diameter of the choke is at most 170 mm. Particularly preferably it is from 30 to 170 mm, more preferably from 50 to 150 mm. The present inventors have found that one having a small particle size, a small aggregate size and a sharp aggregate distribution can be easily obtained particularly within the range.

The reason why carbon black having favorable physical properties can be obtained by flowing the gas with a specific flow rate or higher through the choke part having a small bore of a specific value or smaller is estimated as follows. Namely, by keeping the combustion gas flow rate high in a choke part having a small diameter, not only the degree of the turbulent mixing of the gas in the choke part is made high, and the atomizing of the droplets of the feed stock is accelerated, but also the atmosphere under which the carbon black formation reaction becomes uniform, and the heat energy of the combustion gas can be effectively utilize for the carbon black formation reaction. Accordingly, the reaction speed increases, the reaction field becomes uniform, and formation and carbonization of carbon black in a short period of time becomes possible. As a result, carbon black having a small particle size, a small aggregate size and a sharp aggregate distribution can be effectively produced.

The higher the gas flow rate in the choke, the better. The feed stock is atomized by kinetic and heat energy of the combustion gas. The higher the speed of the combustion gas, the better, and it is preferably at least 250 m/s, and it is suitably from 300 to 500 m/s. Within this range, carbon black having particularly small particle size, small aggregate size and narrow particle size distribution, can be easily obtained.

The seventh invention of the present specification is characterized by making the flow rate of the combustion gas in the choke part to be at least 250 m/s.

Studies by the present inventors clarified that in order to make the first order particle size of carbon black small, it is effective to make the droplet size of the feed stock immediately after the feed stock is introduced into the combustion gas in the producing furnace extremely small.

It has been known that to produce carbon black, kinetic and heat energy of the high speed combustion gas are utilized for atomization of the feed stock. However, the particle size is not adequately made small with conventional techniques. Accordingly, the present inventors have further conducted extensive studies on atomizing mechanism of droplets in a high speed air current, and found the atomization of droplets by the air current relates to the difference in relative speed between gas and the particles, and the time until the particles jetted into the air current is accelerated to nearly the flow rate of the air current.

The relation between the gas flow rate and the final size of the feed stock after atomized, has been studied, and it has been found that although the final size suddenly reduces with the increase of the gas flow rate at the gas flow rate of less than 250 m/s, the final size calmly decreases at the gas flow rate of 250 m/s or above. Accordingly, studies by the present inventors clarified that the flow rate of the gas introduced in a throttle portion is required to be at least 250 m/s, it is preferably about 500 m/s, and the feed stock is preferably introduced in the throttle portion in almost transverse direction to the gas flow. Accordingly, with the flow rate of less than 250 m/s, it is difficult to obtain the effect of making the particle size adequately small, which is a purpose of the present invention.

Here, particularly the eighth invention of the present specification is characterized by making the degree of turbulent mixing of the combustion gas stream at the part where the feed stock is introduced to be within a specific range. Namely, the turbulent mixing speed at the part where the feed stock is introduced is at least 120/s, hereby carbon black having a small particle size, a small aggregate size and a sharp aggregate distribution, can be effectively produced.

It is considered that as the turbulent mixing speed is such a high value, not only the atomization of the droplets of the feed stock is accelerated, but also the atmosphere for the carbon black formation reaction becomes uniform, and the heat energy of the combustion gas can be effectively utilize for the carbon black formation reaction. Accordingly, the reaction speed increases, and the reaction field becomes uniform. As a result, carbon black having a small particle size, a small aggregate size and a sharp aggregate distribution can be effectively produced.

Here, the turbulent mixing speed as a physical value is introduced as an index to indicate intensity of the turbulent mixing. It is a physical value obtained by dividing the turbulent excessive extinction rate $\epsilon$ ($m^2/s^3$) by intensity of turbulent energy $k(m^2/s^2)$, it has a dimension of (1/time), and it is an index representing intensity of mixing by turbulent. These $\epsilon$ and k are physical values conventionally used to represent the degree of turbulent in hydrodynamics. $\epsilon$ and k can be obtained by known method such as numerical calculation. In the present invention, as the turbulent model to conduct the numerical calculation, common k–$\epsilon$ model is employed.

As a result of studies, the present inventors have found that the $\epsilon/k$ value of the gas stream at the part where the feed stock is introduced relates to quality of carbon black produced.

Namely, when the turbulent mixing speed ($\epsilon/k$) at the part where the feed stock is introduced is within a specific range, preferred properties can be obtained such as a small particle size of the first order particles formed, a small aggregate size and a sharp aggregate distribution.

In order to make the $\epsilon/k$ value high, it is effective to raise the gas flow rate in the choke. It is also possible to raise $\epsilon/k$ by making the choke diameter small.

The angle of the reduction part at the choke inlet part is also important. The steeper the angle, the higher $\epsilon/k$.

In such a manner, the present inventors theoretically solved a method for effectively producing carbon black having a small particle size, a small aggregate size and a sharp aggregate size distribution. They have conducted simulations and experiments under various conditions, and found that the $\epsilon/k$ at the part where the feed stock is introduced of at least 120/s is required, and from 500 to 5000/s is particularly preferred.

From the studies by the present inventors, it is considered that in order to obtain carbon black having desired first order particle size and aggregate size, the time after the liquid feed stock is jetted into the combustion gas until the liquid feed stock evaporates is preferably short, and the time for the formation of carbon black precursor and carbon black is preferably short, thereby heat energy of the surrounding heat gas can be effectively absorbed after the feed stock is introduced into the heat gas, such being important. Further, it is considered that by employing above-mentioned $\epsilon/k$ value, the time from carbon black formation to its carbonization can be made further short, namely, carbon black can be formed in an extremely short period of time. As a result, carbon black having a small particle size and a small aggregate size can be obtained, and atomization of droplet size of the feed stock and shortening the time for the carbon black formation reaction by effectively utilizing the surrounding heat gas energy, can be simultaneously satisfied.

The shape of the choke inlet is particularly preferably a specific shape as explained below. Namely, the choke part has a choke part inlet angle of from 45° to 100°, preferably from 80° to 90°, more preferably 90°. Here, the choke part inlet angle is, among angles of a furnace axis and the surface of the wall at the choke inlet convergent part, the angle of upstream side in the flow path, and the angle corresponds to 12 in FIG. 2. At the value of from 45° to 90°, the higher the value, the larger the ratio of decrease in cross-sectional area relative to distance on the furnace axis line toward the choke part. If the value is 90°, the throttle is sharp. In FIG. 2, 9 indicates the choke part inlet, 10 indicates the choke part, 11 indicates the combustion gas flow direction, and 12 indicates the choke part inlet angle.

The invention wherein conditions of the choke part inlet angle is as specified, can be applied without particular limitation of the choke part length. When it is applied to the case where the choke part is at least 800 mm, preferred synergism effect with making the flow rate at least 250 m/s, can be obtained.

Further, the choke part inlet angle is preferably from 45° to 100°, particularly preferably from 80° to 90°, more preferably 90°. The present inventors have found that particularly within the range, one having a small particle size, a small aggregate size and a sharp aggregate size distribution, can be easily obtained.

The reason why carbon black having favorable properties can be obtained by flowing the gas with a specific flow rate or higher through the choke part having an inlet angle of within a specific range, may be considered as follows. Namely, by keeping the combustion gas flow rate to be high in a choke part, and by making the angle of the choke part inlet steep, not only the degree of the turbulent mixing of the gas in the choke part becomes high, and the atomizing of the droplets of the feed stock is accelerated, but also the atmosphere for the carbon black formation reaction becomes uniform, and the heat energy of the combustion gas can be effectively utilize for the carbon black formation reaction. Accordingly, the reaction speed increases, the reaction field becomes uniform, and formation and carbonization of carbon black in a short period of time becomes possible.

Time and labor are required to conduct experiments of changing the inlet angle of the choke part. Accordingly, the present inventors have developed a program to simulate the formation process of carbon black by using a computer, and studied to change the inlet angle by using the program. The program is to combine the thermal fluid analysis program using difference calculus which is used widely, with a program on formation of the first order particles of carbon black, based on a classical nucleation theory developed by the present inventors, to predict how the first order particle size and the distribution will change depending upon changes in the shape of the furnace or the operation conditions. It is specifically described in Aerosol Research, vol.12 (3) pages 175–182 (1997).

The sixth invention of the present specification is characterized by making the oxygen concentration at the part where the feed stock is introduced to be at most 3 vol %. Preferably it is from 0.05 to 1 vol %. The present inventors have found that by making the oxygen concentration within such a range, carbon black wherein the aggregate size is small, the aggregate distribution is extremely sharp, generation of large aggregate can be suppressed, and the particle size is small, can be obtained with good yield.

Heretofore, it has been considered that furnace black obtainable by a furnace method is formed by a partial combustion of the feed stock. Accordingly, the concentration of the remaining oxygen in the combustion gas at the part where the feed stock was introduced was about 5 to 10 vol %, and the material oil was partially burned. Unexpectedly, the present inventors have found that when the oxygen concentration is suppressed to be extremely small, carbon black of small particle size, having a sharp aggregate distribution, no large aggregate and a small aggregate size, can be obtained with a high yield.

The reason why the above-mentioned effects of the present invention can be achieved by suppressing the oxygen concentration at the part where the feed stock is introduced, is not completely clear. However, the present inventors have conducted experiments to change the oxygen concentration at the part, and as a result, they have found that the lower the oxygen concentration, the smaller the ultimate CO concentration in the exhaust gas. Small CO concentration means that the ratio of $CO_2$ generated is increasing in the combustion reaction, and it is considered that the heat release value in the combustion reaction will be large, and the temperature of the combustion gas will be high. The reaction in which the excessive oxygen becomes $CO_2$ is represented by $C+O_2 \rightarrow CO_2$, and the reaction in which it becomes CO is represented by $2C+O_2 \rightarrow 2CO$. As evident from the formulae, double amount of carbon is consumed when oxygen becomes CO. Accordingly, it is estimated that as the oxygen concentration at the part where the feed stock is introduced is low, the amount of CO formed is reduced, carbon black having a small particle size can be obtained, and at the same time, the yield is significantly improved.

Further, it is estimated that as the oxygen concentration at the part where the feed stock is introduced is small, the feed stock is less likely to be partially burned, and the atmosphere for the region at which carbon black is formed can be kept uniform, and thus carbon black having a sharp aggregate size distribution can be obtained.

The measurement of the oxygen concentration at the part where the feed stock is introduced can be conducted by gathering the air at the part where the feed stock is introduced, and measuring nitrogen, oxygen, carbon dioxide, carbon monoxide, hydrogen, methane and acetylene by e.g. a gas chromatography measuring apparatus. Here, water generated from the combustion is not considered.

The part where the feed stock is introduced is preferably in the choke part and also within a range of 1 ms from the choke inlet based on the cross-sectional average flow rate of the combustion gas. More preferably it is within a range of 0.6 ms. When the feed stock is introduced at the part, carbon black wherein the particle size is particularly small and the aggregate size is uniform, can be obtained.

The residue time of the feed stock in the choke after introduced is preferably at least 0.4 ms, hereby carbon black having particularly sharp aggregate distribution can be easily obtained. The aggregate is believed to be formed in such a manner that the feed stock is thermally decomposed, and then condensed to form liquid drops, whereby nuclei of a precursor will form and mutually collide to one another to fuse and be carbonized to form the aggregate. Accordingly, it is considered that by adjusting the residue time in the choke to be within the above range, the aggregate can be obtained without sustaining a highly turbulent site due to e.g. a change in the flow path.

Here, in the present invention, it is preferred not to give substantial turbulent in the flow state 6f the gas stream in a certain period of time after the feed stock is introduced into the apparatus.

In the present invention, 'not to give substantial turbulence in the flow state of the gas stream' specifically means as follows.

'Turbulent' is represented usually hydrodynamically by magnitude of turbulent energy ($m^2/s^2$) and the vortex dissipation ratio ($m^2/s^3$) The present inventors have conducted various experiments and value simulation to which the hydrodynamics is applied, and studied correlation between various experimental conditions and the physical values of the flow. As a result, they have found that to prevent the formation of the aggregate having particularly large aggregate size, it is effective to suppress at least one increasing rate of the turbulent energy and the vortex dissipation ratio to be within 10%, in 1.5 ms after the material oil (feed stock) is introduced, in order not to give a substantial turbulence in the flow state of the gas stream. Namely, it is considered that by suppressing at least one increasing rate of the turbulent energy and the vortex dissipation ratio to be within 10%, turbulence in the flow state of the gas stream can be substantially suppressed, and development of the aggregate having a large aggregate size can be substantially suppressed during the carbon black aggregate formation process.

The present invention will be explained in further detail with reference to FIG. 3 illustrating changes in turbulent energy at the center part of the flow path as an example. At the choke part inlet, as the flow path cross-sectional area decreases, the turbulent energy shows reaches (A), and it will gradually decrease. And at the choke outlet magnified part, it reaches peak again (C). Above-mentioned "to suppress the increasing rate of the turbulent energy or the vortex dissipation ratio to be within 10% in 1.5 ms after the feed stock is introduced" means the time from the feed stock introducing point B to the point C at which the turbulent energy increases in FIG. 3 being kept to be 1.5 ms or longer, or E/D which is the ratio of the value D of the turbulent energy immediately before the point C to the maximum E of the turbulent energy at the point C being at least 1.1.

Although, the turbulent energy is monotonously decreasing from B to immediately before C in the present example, it is not limited to monotonous reduction in the present invention.

It is considered that by employing the conditions defined in the present invention, the condition in the reaction zone is kept uniform until the first order particles and the aggregate of carbon black are formed after the feed stock is supplied. Namely, it is considered that as the high turbulent due to e.g. a significant change in the shape of the cross-section of the flow path is prevented until the reaction in which the first order particles and the aggregate of carbon black is formed after the feed stock is supplied, carbon black having uniform aggregate size and no large aggregate can be obtained.

Namely, the aggregate is believed to be formed in such a manner that the feed stock is thermally decomposed, and then condensed to form liquid drops, whereby nuclei of a precursor will form, and first order particles will form and mutually collide to one another to fuse and be carbonized to form the aggregate. Accordingly, it is considered to be advisable that the choke part is long and the aggregate formation zone is free from a highly turbulent site due to e.g. a change in the flow path such as in a throttle portion. Studies by the present inventors have clarified that it is necessary to control in a longer period of time in the case of controlling the distribution of the aggregate, as compared with the case of controlling the particle size. In the present invention, this problem can be accomplished by the shape of the flow path of the gas stream, in 1.5 ms after the feed stock is introduced, giving substantially no turbulence in the flow state of the gas stream. If turbulence is brought about due to e.g. a significant change in the shape of the flow path of the gas stream in 1.5 ms after the feed stock is introduced, the formation of the aggregate having a large aggregate size can not ignored any more, and the carbon black aggregate distribution tends to be broad.

As explained above, it is desired not to give substantial turbulence in the flow state of the gas stream. Accordingly, the inner wall of the choke part is preferably one as explained below. Namely, the present inventors have found that the aggregate size relates to not only the choke length but also smoothness of the choke inner wall, and carbon black having extremely excellent physical properties as carbon black, having extremely sharp aggregate distribution, can be obtained, when the choke part length is adjusted to be a specific length or longer, and the smoothness of the choke inner wall is adjusted to be a specific value or below.

The smoothness $\epsilon$ of the choke inner wall is preferably at most 1 mm, more preferably at most 0.3 mm.

Here, $\epsilon$ is an index representing smoothness of the choke inner wall, and commonly called as equivalent sand roughness (Mechanical Engineering Manual, New Edition A5, Fluid Engineering chapter 11, Flow in flow tube, 11-2 Pipe friction coefficient of a straight pipe). The equivalent sand roughness is a value defined to obtain the pipe friction coefficient of flow in a tube, and represents roughness of the tube inner wall by defining the size of sand particles, and values of the equivalent sand roughness of the various practical tubes have been obtained by Japan Society of Mechanical Engineers (Japan Society of Mechanical Engineers Edition, Technical data pipe line-duct fluid resistance (1979), 32, Japan Society of Mechanical Engineers).

As a representative example of a smooth material having $\epsilon$ of at most 1 mm, a metal such as stainless of copper may be mentioned. As a material other than a metal, SiC, diamond, aluminum nitride, silicon nitride or a ceramics type refractory material may, for example, be mentioned.

Further, in the case of a material which can not keep the initial smoothness under production conditions of e.g. flow rate or temperature, particularly under conditions of extremely high temperature or high flow rate, it is required to adjust the smoothness to be within a range defined in the present invention, by e.g. providing an cooling structure, to conduct carbon black production. For example, in the case of using a metal, the temperature of the internal combustion gas reaches the heat resistant temperature of a metal or above, it is desired to cool from the outside by providing a structure such as a water-cooling jacket structure.

By using such a material having a smooth surface for the choke part, carbon black wherein the aggregate and the aggregate distribution are within a suitable range, can be easily obtained.

It is considered that by using a specific one for the choke inner wall, carbon black having an uniform aggregate size and no large aggregate can be obtained by reasons as follows.

First, as fine aggregate is formed mainly by aggregation of fine particles, it is desired to employ conditions to make the particle size distribution sharp, i.e. to employ a method of e.g. introducing a feed stock in the region of high flow rate.

It is clarified from the studies by the present inventors that the large aggregate is formed in such a manner that in the carbon black aggregation process which sustains turbulence, the aggregates having a relatively heavy weight move by the turbulent flow and mutually collide to one another to form the large aggregate. It is considered that in the present invention, the suppression of the large aggregate formation could be achieved by suppressing turbulent flow in the region of the producing apparatus which corresponds to the carbon black aggregation process.

Namely, it is considered that the conditions in the reaction zone are uniform until the carbon black first order particles and aggregate are formed after the feed stock is introduced into the furnace, and rapidly mixed with a high temperature combustion gas with a high miscibility, followed by atomization and temperature rising. Therefore, a high turbulence due to significant change in the shape of the cross-section of the flow path can be prevented, after the feed stock is introduced and atomized until the carbon black first order particles are formed and collide to one another to form the aggregate, namely until the surface of the particles and the aggregate of the carbon black is adequately solidified in such an extent that adhesion due to collision does not take place. Further, the turbulence due to vortex flow induced by collision between the high speed gas and irregular surface of the choke part inner surface, and separation, can also be prevented. Accordingly, both conditions can be satisfied.

Namely, the aggregate of carbon black is believed to be formed in such a manner that the feed stock is thermally decomposed, and then condensed to form liquid drops, whereby nuclei of a precursor will form and mutually collide to one another to fuse and be carbonized to form the aggregate. Studies by the present inventors have clarified that in the case of controlling the distribution of the aggregate, it is necessary to control in a longer period of time, as compared with the case of controlling the particle size. This is considered to be attributable to the fact that the particles are formed by aggregation in the step of the liquid phase hydrocarbon in the middle of polymerization, on the other hand, the aggregate is formed in such a manner that the liquid phase particles in a state where they collide and adhere to one another, are further polymerized and carbonized to be in a solid state at the reaction region temperature. Therefore, it takes time until the liquid phase hydrocarbon is solidified under high temperature. It has been clarified from the studies on the basis of the results of various experiments by the present inventors that it takes from twice to five times longer time is required for aggregation formation than the particle formation.

It is clarified from the studies by the present inventors that by adjusting the choke part length or the length from the part where the feed stock is introduced to the choke part outlet to be above-mentioned specific value or above, and by employing a specific material and a specific structure for the choke, the aggregate size, the particle size and their distributions can be kept within a desired range. This is considered to be attributable to the fact that the choke inner surface is constituted by the smooth surface, the smoothness of the inner surface is not impaired during the long-term use of the producing equipment, and changes in the choke inner diameter can be prevented. Namely, it is considered that the above-described conditions are achieved by producing carbon black using a producing apparatus having, as a structure of the choke part, the above-mentioned one. Namely, by employing the choke part having the specific structure of the present invention, the choke part deterioration can be prevented even under conditions of high temperature and high flow rate, and it becomes possible to constantly produce carbon black having preferred properties for the first time.

JP-A-3-33167 describes to obtain carbon black wherein the choke length is kept long, and the particle size distribution is relatively narrow. However, it does not describe the influences on the aggregate size distribution which is the most important factor which influences the properties of carbon black among the effects, at all. About the choke diameter, it only describes that the suitable diameter is from 7 to 10 inch, and it is different from the conditions of the choke part of the present invention. In the present invention, by adjusting the choke length to be a specific value or above, carbon black having a small aggregate size, a sharp distribution and little large aggregate, can be obtained, and the content of the present invention is completely different from the invention above described.

The temperature at the part where the feed stock is introduced is preferably at least 1800° C., more preferably at least 1900° C., particularly preferably from 2000 to 2400° C., whereby carbon black having a small particle size, a small aggregate size and a sharp aggregate distribution can be easily obtained.

The carbon black aggregate is believed to be formed in such a manner that the feed stock is thermally decomposed, condensed and then adhered to form liquid drops, whereby nuclei of a precursor will form, and first order particles will form, and the particles mutually colloid to one another to fuse and be carbonized to form the aggregate. The higher the temperature is, the faster the reaction proceeds, the smaller the first order particles become, and the faster the carbonization speed becomes. Accordingly, the time until the first order particles colloid to one another to form the aggregate and be solidified, becomes shorter, and thus the aggregate is considered to be small. Accordingly, the temperature at the part where the feed stock is introduced is preferably adequately high for uniform atomization and thermal decomposition of the feed stock, and further for obtaining carbon black of small particle size. In the present invention, it is considered to be suitable to employ the above-mentioned temperature range.

To adjust the temperature where the feed stock is introduced to be within the above-mentioned range, for example, oxygen may be added into air when the high temperature combustion gas stream is formed in the first reaction zone. Of course, a method to raise the combustion gas temperature is not limited to addition of oxygen, and it is possible to employ a method of e.g. pre-heating the air.

The temperature inside the furnace can be confirmed by means of e.g. a radiation thermometer.

In order to uniformly disperse the feed stock in the furnace, it is preferred to introduce the feed stock into the furnace from at least two nozzles, hereby carbon black having particularly small aggregate size can be obtained.

By the method for producing carbon black of the present invention as explained above, carbon black having a small aggregate size, a sharp distribution and a small particle size can be obtained. As an index for evaluating the aggregate, an electron microscope analysis or disc centrifuge in water dispersed system of cDBP or carbon black have been conventionally known. In recent years, disc centrifuge is employed to evaluate the size and distribution of the aggregate. In Examples of the present invention, as the index of the aggregate size being sharp, the ratio of the half width of the stokes diameter at the point of the peak $D_{1/2}$ to the stokes diameter at the point of the peak $D_{mod}$ in the stokes diameter distribution of aggregate by disc centrifuge is employed, and as the index of large aggregate size not existing, $D_{75}$ was employed.

By the production method of the present invention as explained above, carbon black having an average particle size of at most 25 nm, a ratio of the half width of the stokes diameter at the point of the peak $D_{1/2}$ to the stokes diameter at the point of the peak in the stokes diameter distribution of aggregate by disc centrifuge, i.e. $D_{1/2}/D_{mod}$ of at most 0.6, $D_{75}/D_{mod}$ which is the ratio of the volume 75% size to $D_{mod}$ of at most 1.3, a small particle size, a small aggregate size, a sharp aggregate size distribution, and a small amount of large aggregate, can be effectively obtained. Further, carbon black having an average particle size of at most 20 nm, which is more preferred to heighten PVC blackness, can be easily obtained.

Further, by the production method of the present invention as explained above, carbon black having an average particle size of from 5 to 25 nm, further from 8 to 17 nm, having $N_2SA$ of from 100 to 700 $m^2/g$, further from 120 to 700 $m^2/g$, having cDBP of from 40 to 110 cc/100 g, further from 50 to 80 cc/g, having $D_{mod}$ of from 10 to 70 nm, further from 20 to 50 nm, having $D_{1/2}$ of from 10 to 50 nm, further from 10 to 30 nm, having PVC blackness of from 3 to 35, further from 5 to 35, and having a dispersibility index of from 1 to 200, further from 10 to 150, can be obtained.

By the production method of the present invention as explained above, a furnace black having an average particle size of at most 135 nm, $D_{mod}$ of at most 80 nm and a $D_{1/2}/D_{mod}$ ratio of at most 0.6, can be obtained. Furnace black indicates carbon black obtained by the furnace. The particle size, the aggregate size and the distribution of such a furnace black are suitable to obtain extremely high blackness. Further, as it is furnace black obtainable by the furnace method, above-described problems of the channel method can be avoided, and it is significantly useful industrially.

Further, furnace black having an average particle size of at most 14 nm, a $N_2SA/SEC$ specific surface area ratio of higher than 1.3 and cDBP of at least 50 cc/100 g can also be obtained. Such a furnace black satisfies blackness and dispersibility simultaneously, and further it is extremely excellent in safety. Further, as it is furnace black, above-described problems by the channel method can be avoided.

When a coating material composition, a resin composition or a rubber composition containing carbon black of the present invention as explained above is prepared, suitable properties for each application can be obtained. As explained above, carbon black of the present invention is extremely excellent in dispersibility in various vehicles, and at the same time it has very high blackness. Accordingly, such compositions also have extremely excellent properties.

Further, by adjusting the pH of carbon black of the present invention to be within a specific range, a rubber composition having excellent wear resistance can be obtained, a resin composition which is less likely to deteriorate can be obtained, and aggregation in an aqueous coating material composition can be prevented.

Such a carbon black of the present invention which makes it possible to obtain an excellent carbon black-containing composition by blending various vehicles therewith, is novel one which has not existed, and it can be easily obtained by e.g. the production method as described above.

In order to obtain the coating material composition of the present invention, the resin composition of the present invention, the rubber composition of the present invention and the ink composition of the present invention, the desired composition can be prepared by employing known various methods, in addition to incorporating carbon black of the present invention.

In the case of preparing the resin composition containing carbon black of the present invention, the resin to be applied is not particularly limited. It may, for example, be a thermoplastic resin, a thermosetting resin, a mixture of such resins or one having additives such as a filler added thereto. One which is usually used for preparation of a resin composition can be suitably selected depending on the purpose.

Carbon black of the present invention is added to such resin components, followed by kneading as the case requires. Here, one which is usually used as a rubber kneading machine may be used, including a batch open type such as a roller mixer, a batch closed type such as Banbury type mixer, a continuous screw type such as a monoaxial kneading extruder and a biaxial kneading extruder, and a continuous rotor type such as a monoaxial kneading machine and a biaxial kneading machine. The amount of carbon black may also be determined by employing known techniques. It is usually suitably from 1 to 60 wt %.

In the case of preparing a coating material composition containing carbon black of the present invention, the varnish to be used is not particularly limited so long as it can be used for a coating material. It may, for example, be a varnish to be used for an oil coating material, an alcoholic coating material, a synthetic resin coating material or a water coating material. The coating material for which carbon black is used is not particularly limited and may, for example, be an oil paint, an oil enamel, a phenol resin, a maleic acid resin, an alkyd resin coating material, an aminoalkyd resin coating material, a urea resin coating material, an alcoholic coating material, a lacquer, a vinyl resin coating material, an acrylic resin coating material, a polyester resin coating material, an epoxy resin coating material, a polyurethane resin coating material, a silicone resin coating material, an emulsion resin coating material or a water-soluble resin coating material.

As described above, carbon black of the present invention is particularly excellent in effect to prevent aggregation when it is formed into a water coating material composition. Accordingly, it is preferably used to prepare a water coating material composition such as an emulsion coating material or a water-soluble resin coating material, as significantly high properties can be obtained.

The content of carbon black can also be determined by employing known techniques. It is usually suitably from 0.1 to 10 wt %.

Further, for preparation of a rubber composition containing carbon black of the present invention, carbon black of the present invention may be blended with at least one natural rubber or synthetic rubber. In such a case, carbon black is blended in an amount of suitably from 30 to 150 parts by weight based on 100 parts by weight of rubber, whereby it is possible to obtain a rubber composition having a small loss factor or heat release value.

The rubber component to be used here is not particularly limited For example, the synthetic rubber may be mentioned such as styrene butadiene rubber, butadiene rubber, isoprene rubber, chloroprene rubber, nitrilebutadiene rubber, isobutyleneisoprene rubber, ethylenepropylene rubber, silicone rubber, fluorine rubber, chlorosulfonated polyethylene, chlorinated polyethylene, polysulfide rubber, urethane rubber, acryl rubber, epichlorohydrin rubber, propylene oxide rubber, an ethylene-vinyl acetate copolymer, liquid rubber, polyalkylene sulfide or nitroso rubber. Natural rubber or a mixture of such rubber may also be used of course. Additives may also be blended thereto, as the case requires.

Carbon black of the present invention is added to the above-mentioned rubber component, followed by kneading to obtain a rubber composition. The kneading machine may be the one commonly used as a kneading machine for rubber, including a roll mixer, a Banbury type mixer, a monoaxial kneading extruder or a biaxial kneading extruder of a continuous screw type or a continuous rotor type.

To obtain an ink composition of the present invention, there is no particular limitation so long as one of the present invention is used as carbon black. Namely, carbon black is blended with a known varnish or a solvent, and adequately dispersed. Carbon black of the present invention is particularly excellent when it is used as a water ink composition. Known means may be employed such that carbon black is dispersed in an aqueous medium with a water-soluble varnish, as a varnish, such as an alkali-soluble resin or a hydrosol resin.

A dispersing method is not particularly limited. Known dispersing method may be employed, and various additives may be added to the mixture.

It has been known that in order to obtain carbon black of small particle size, it is advantageous to conduct the reaction for carbon black formation under high temperature as described above. However, as described above, a producing furnace capable of being used practically is desired, which endures severe conditions of the carbon black formation reaction in which the combustion gas flows in high speed under acid atmosphere. A carbon black producing furnace is provided, which is constituted by a furnace material excellent in mechanical strength properties at high temperature, which solves above problems and which makes it possible to make the temperature at the region of introducing the material oil to be high when the feed stock is introduced to the high temperature gas stream to form carbon black, and the producing furnace which makes it possible to effectively produce carbon black having a small particle size and high blackness, will be explained hereinafter.

The present inventors have conducted extensive studies to achieve the above-mentioned problems and as a result, they have found that the above-mentioned problems can be solved by using a specific material for at least one part of the carbon black producing furnace, and the present invention has been accomplished. Namely, the present invention resides in a method for producing carbon black wherein carbon black is produced in a furnace having at least one part of the furnace wall constituted by a magnesia-chrome refractory material when the feed stock is introduced into the high temperature gas stream to produce the carbon black; and a carbon black producing furnace having at least one part which will contact with the high temperature gas stream constituted by a magnesia-chrome refractory material.

Here, in the present invention, the producing furnace is one having at least one part of the furnace wall formed by a magnesia-chrome refractory material. Preferably whole part or one part of the furnace wall which will contact with the high temperature gas stream is constituted by a magnesia-chrome refractory material. As a mode to make such a part of the furnace wall to be constituted by a magnesia-chrome refractory material, for example, the furnace wall is lined with magnesia-chrome refractory brick. It may of course be possible to form such a part of the furnace wall by mortar.

The magnesia-chrome refractory material is a refractory material obtained by improving the defects of a magnesia refractory material and a chrome refractory material. As it is resistant to a relatively high temperature and it is excellent in corrosion resistance against slag or steel, it has been known to be used as a refractory material for a steal producing furnace. However, it can be used at a temperature of about 1650° C. at highest. Further, for producing carbon black, durability under severe conditions such that it will contact with the gas of high temperature and high speed.

Further, as the parameters of the furnace shape play important roles in controlling the properties of obtained carbon black, the carbon black producing furnace is formed into a complicated and precise shape.

As a result of extensive studies by the present inventors, it was found that such a magnesia-chromium refractory material is an extremely excellent furnace material which is excellent in both ultraspalling-resistance and mechanical strength at ultra-high temperature under conditions for producing carbon black at a extremely high temperature, and which satisfies the required properties as a furnace material for a carbon black producing furnace wherein carbon black of small particle size can be obtained by an ultra-high temperature reaction.

A magnesia-chromium refractory material can be obtained by using magnesia and chromium iron ore as a material. Usually one having magnesia in an amount of 50% or more is called as magnesite-chrome brick, and one having magnesia in an amount of less than 50% is called as chrome-magnesite brick. A composition having more magnesia has higher heat resistance, but the spalling resistance decreases. The chrome-magnesite brick has a fusion temperature of about 2300° C., and when the temperature for safe use is set to be the temperature from about 100 to about 200° C. lower than the fusion temperature, it can be used under temperature condition of higher than 200° C. However, preferably the magnesite-chrome brick wherein the melting temperature is at least 2300° C., heat resistance is further improved, and spalling resistance satisfies the required properties, is suitable.

Accordingly, as the composition of the magnesia-chrome refractory material, it contains from 30 to 95 wt % of MgO, from 3 to 40 wt % of $Cr_2O_3$, preferably from 55 to 80 wt % of MgO and from 5 to 30 wt % of $Cr_2O_3$. Other components may be incorporated such as $Fe_2O_3$, $Al_2O_3$ or CaO.

Further, it is classified into re-bond, semi-re-bond or direct depending on the bonding conditions of the composition, and they may be suitably selected depending on use condition or operation condition.

Here, the furnace wall part downstream to the part of introducing the feed stock at which the feed stock is introduced, the gas temperature decreases by the process of thermal decomposition reaction, and which will be under reduced atmosphere, can be adequately dealt with the lining by conventional high alumina refractory material.

Further, the above-mentioned problems can be solved by the invention as explained below, i.e. a carbon black producing furnace having at least one part of the furnace wall formed by a magnesia refractory material. Preferably whole part or one part of the furnace wall which will contact with the high temperature gas stream is formed by a magnesia refractory material. As a mode to make such a part of the furnace wall to be formed by a magnesia refractory material, for example, the furnace wall is lined with magnesia refractory brick. It may of course be possible to form such a part of the furnace wall by magnesia of indefinite shape.

It was mentioned above that when magnesia refractory material is used, it is poor in spalling resistance, as compared with common refractory material, due to the high coefficient of thermal expansion. However, the present inventors have found that by adjusting the thickness of the magnesia refractory material in the furnace inner wall to be from 30 to 50 mm, generation of cracks due to spalling can be reduced, and the magnesia refractory material can be applied to the carbon black producing furnace.

Further, the studies by the present inventors clarified that for the operation of the producing furnace, the temperature rising rate and/or the temperature falling rate is preferably at least 80° C./h during temperature rising and temperature falling and when changing the furnace temperature during operation. Particularly, when it is operated at a temperature rising and falling rate (temperature rising rate and temperature falling rate) of at most 80° C./h at whole region from low temperature to high temperature, deterioration in mechanical strength of magnesia can be prevented.

Further, for the operation of the producing furnace, the temperature rising rate and/or the temperature falling rate of the furnace temperature is preferably at most 30° C./h, at the region of from 800 to 1300° C.

Particularly at the region of from 800° C. to 1300° C. in which there is the magnesia fragility/plasticity transition point, and the mechanical strength deteriorates, when the furnace is operated at a temperature rising and falling rate of at most 30° C./h, mechanical strength deterioration can be further prevented, and the life of the furnace can be made to be significantly long.

As described above, in order to improve quality of carbon black and productivity by raising the reaction temperature in the furnace type producing furnace, the reaction conditions are limited due to limitation of spalling resistance or heat resistant temperature of the producing furnace. Namely, as the lining refractory material at the part of the highest temperature, alumina type (high alumina or ultra-high alumina) refractory material is used, if it is contacted with a high temperature gas stream of the heat resistant temperature (about 1800° C.) or above, phenomena such as melt deterioration and separation of the refractory material due to spalling are brought about in a short period of time, and operation can not be conducted, such being problematic.

On the other hand, as an ultra-high temperature refractory material, refractory materials such as magnesia have been known. Among these, magnesia has a high melting point of 2800° C., and can be resistant against very high temperature. However, the coefficient of thermal expansion is large, and it is poor in spalling resistance as compared with conventional refractory materials. Accordingly, it is very difficult to design the furnace structure with magnesia, and it can not be used practically as an industrial furnace, such being the state of things. Accordingly, if it is used for a carbon black furnace, the required properties such as spalling resistance and heat resistance strength are not sufficient, and the furnace will be severely damaged, and thus it is difficult to practically use magnesia.

To solve the problems on the ultra-high temperature refractory material, such a method is mentioned that e.g. magnesia or zirconia is used as a base material, and additives are added thereto in order to improve spalling resistance. However, the studies by the present inventors clarified that not only refractoriness of base material itself decreases, but also additives scatter, and spalling resistance itself decreases in a long-term operation, and thus the method is not yet enough to adequately keep properties necessary for a carbon black producing furnace.

Further, such a method is mentioned that brick made of an ultra-high temperature refractory material such as high purity magnesia or zirconia is divided into small pieces to organize a furnace in order to minimize the amount of thermal stress generated. However, in such a structure, the brick skew can not be made large, and the life of furnace becomes short due to e.g. separation of brick, and the burden on operation or economy is heavy when organizing the furnace or repairing it, and thus it is difficult to put the method to practical use.

The inventions as explained above are conducted to solve the above problems, and to provide a carbon black producing furnace, which is constituted by a furnace material excellent in shape keeping property and heat resistance at high temperature, and which makes it possible to make the temperature of the region of introducing the material oil to be high when the feed stock is introduced into the high temperature gas stream to form carbon black.

The present inventors have conducted extensive studies to achieve the above-mentioned objects. As a result, they have found that the above-mentioned problems can be solved by using a refractory material having at least one part of carbon black stamp-applied, and achieved the invention as explained below. Namely, the invention as explained below resides in a producing furnace having at least one part of the furnace wall constituted by a stamp material when the feed stock is introduced into the high temperature gas stream to produce carbon black, and a method for producing carbon black which comprises conducting the carbon black formation reaction in such a producing furnace.

Here, the stamp material is a simple substance of a refractory material having a high melting point such as magnesia, zirconia or alumina or a dried powder having a binder mixed therewith, and the stamp application is an application method to ram the stamp material by a tool such as an air tool or a vibrator.

Here, in the invention as explained hereinafter, the producing furnace is one having at least one part of the furnace wall constituted by the stamp material. Preferably whole part or one part of the furnace wall which will contact with the high temperature gas stream is constituted by the stamp-applied refractory material. As a mode to make such a part of the furnace wall to be constituted by the stamp-applied refractory material, for example, the furnace wall is lined with a stamp material of a refractory material having a high melting point such as magnesia, zirconia or alumina. It is preferred that the stamp material is made of at least one of magnesia, zirconia and alumina as the main component. Among these, magnesia stamp material having high melting point withstands high temperature best, and is suitable for a high temperature producing furnace for carbon black.

Here, in addition to commercially available stamp material as mentioned above, magnesia-chrome type refractory material such as magnesite-chrome refractory material or chrome-magnesite refractory material may be used as a stamp material.

Further, for producing carbon black, durability under severe conditions such that it is contacted with the gas of high temperature and high speed is required. Further, as the parameters of the furnace shape play important roles in controlling the properties of obtained carbon black, the carbon black producing furnace is formed into a complicated and precise shape.

As a result of extensive studies by the present inventors, it was found that the stamp application by such a stamp material is excellent in both shape keeping property and heat resistance under conditions for producing carbon black at ultra high temperature, and the stamp material and the stamp application are extremely excellent furnace material and application method, respectively, which satisfy the required properties as a furnace material and an application method for carbon black producing furnace to obtain carbon black of small particle size by ultra-high temperature reaction.

With regard to a material to be used as a stamp material, although the composition having higher purity has higher heat resistance, it has lower spalling resistance. However, in the producing furnace of the present invention, even if cracks form on the stamp material due to spalling, the stamp material does not separate off from the furnace thanks to roughness of the broken surface. Accordingly, in order to satisfy the required properties, the stamp application by the stamp material having high purity is suitable.

Further, the above-mentioned stamp material is usually used as only inner wall surface of the furnace being sintered during temperature-rising of the furnace, and the backside being unsintered. The stamp application has been known to be used for an inducing furnace for melting a metal. This is because the flow of molten product can be stopped by unsintered powder stamp material of backside even if cracks form on the sintered stamp material layer on the surface due to thermal expansion. However, in the case where the operation temperature exceeds about 1800° C., width and depth of the cracks on the stamp material become large, pores expand to the unsintered stamp material of backside, and the molten product flow outside the furnace. Accordingly, the operation temperature is limited to not higher than 1800° C. On the other hand, in the carbon black producing furnace, the molten product will not be generated, and thus it is possible to sinter even backside.

If the stamp material of the backside is sintered, cracks will form in the surface direction of the application layer at a certain depth, with cracks in the thickness direction. Accordingly, when the application thickness is adjusted to be from 35 to 50 mm, the stamp material is less likely to be separated off from the furnace, and the shape keeping property becomes high. Here, if the application thickness is adjusted to be thinner than 35 mm, the skew area of the broken stamp material tends to be small, and the possibility of separation tends to be high.

Further, when grooves (score lines) of a predetermined depth (for example, about from 5 to 10 mm) are preliminarily formed uniformly on the above-mentioned stamp material, the part where the cracks will form can also be determined uniformly, the refractory material is less likely to be divided into small pieces, and the shape keeping property can be made high. It is more preferred to form score lines having a depth of from 2 to 5 m/m on the furnace inner wall with 300×400 square mm.

If the entire furnace is stamp-applied with the refractory material having a high coefficient of thermal conductivity such as magnesia, the layer will be significantly thick, and the furnace itself will be large, such being uneconomical. Accordingly, the outside of the stamp-applied layer is lined with a refractory material having a low coefficient of thermal conductivity such as heat resistant board or heat resistant brick, the furnace itself can be made compact.

In the case of stamp-applying the lining of the furnace wall with magnesia, and applying the adjacent layer with a refractory material such as high alumina brick, magnesia reacts with alumina to form a compound of low melting point, which lowers the refractoriness of the magnesia stamp. Therefore, it is preferred to adjust the temperature at the border of the layers to be not higher than 1500° C., or to provide a refractory material layer made of magnesite-chrome brick as the adjacent layer to the magnesia stamp material to make the temperature at the border of the magnesite-chrome layer and the alumina brick layer to be not higher than 1500° C.

Here, although the stamp material-applied part is applicable to entire part of the furnace, from the part where the feed stock is introduce in the second reaction zone to the third reaction zone, the gas temperature becomes low as the thermal decomposition of the feed stock proceeds, thus leading to be under reduced atmosphere. Accordingly, for the furnace inner wall of such a part can be dealt with the lining of the conventional refractory material such as high alumina brick.

Here, as mentioned above, the flow rate of the combustion gas at the part of introducing the feed stock is preferably high, and it is desired to realize the producing furnace with which such a condition can be achieved. The invention as explained hereinafter is to solve a problem to make the flow rate of the combustion gas at the part of introducing the feed stock to be high speed of from Mach 0.8 to Mach 1, without significant increase in pressure drop in the producing furnace or without severe damage of the apparatus.

The present inventors have studied to make the flow rate of the combustion gas at the part where the feed stock is introduced to be high, and as a result, they have found a method to utilize the nozzle itself which introduce the feed stock.

The nozzle for introducing feed stock is installed in the second reaction zone for purposes of introducing the feed stock as a feed stock for carbon black into the combustion gas. Usually it has a cylindrical shape, and it has a nozzle chip from which the feed stock is jetted at the top. Further, it may have a jacket structure having a cooling structure to withstand the high temperature combustion gas when it is inserted into the furnace.

The flow rate of the combustion gas in the furnace in the furnace axis direction, can usually be obtained by dividing the actual amount of flow in volume of the combustion gas by the cross-sectional area of the furnace at the part where the flow rate is obtained.

The present inventors have found that by adjusting the diameter of the nozzle for introducing feed stock to be relatively large relative to the furnace cross-sectional area at the part where the nozzle is inserted, the cross-sectional area at the part where the feed stock nozzle is inserted can be significantly reduced by the feed stock nozzle itself, and the combustion gas flow rate passing through the nozzle top can be accelerated to from Mach 0.8 to Mach 1.

Namely, the invention as explained hereinafter resides in a method for producing carbon black, which comprises using a producing apparatus having a first reaction zone wherein an oxygen-containing gas and a fuel are mixed and burned to form a high temperature combustion gas stream, a second reaction zone having a choke part wherein a feed stock is successively mixed with the obtained high temperature combustion gas stream to form a carbon black, and a third reaction zone located at the downstream to the second reaction zone wherein cooling water is jetted to terminate the reaction, wherein one or plurality of nozzles to introduce the feed stock are installed in the second reaction zone, and the nozzle is stuck out into the furnace within a range where it is effective to reduce the cross-sectional flow area, to reduce the cross-sectional flow area at the part of introducing the feed stock, and to adjust the combustion gas flow rate at the top of the nozzle for introducing feed stock to be from Mach 0.8 to Mach 1, and an apparatus for it.

In the invention as explained hereinafter, the part of the nozzle for introducing feed stock in the furnace cross-section is specified. Namely, one or plurality of nozzles are stuck out into the furnace within a range where reduction in the cross-sectional flow area is effective, in order to reduce the cross-section flow area of the combustion gas at the part of introducing the feed stock.

This will be explained with reference to FIG. 9.

FIG. 9 is a cross-sectional view at A—A in FIG. 8. In the furnace cross section as illustrated as a circle, as the nozzle for introducing feed stock represented as B is stuck out, among cross section flow area i.e. the furnace cross section, the area where the combustion gas can be passed through substantially decreases by an area illustrated as the slanted part (A), and thus the combustion gas flow rate increases at the top of the nozzle for introducing feed stock. The degree of sticking out the nozzle for introducing feed stock is not particularly limited so long as the increase in the combustion gas flow rate due to reduction in the cross section flow area can be achieved to a desired extent, namely, the combustion gas flow rate at the top of the nozzle can be adjusted to be from Mach 0.8 to Mach 1. However, it is preferred to stick out the nozzle so that the cross section flow area is reduced by at least 30%.

The nozzle is stuck out so that the cross section flow area is reduced by at least 30%, preferably at least 50%, more preferably at least 60%.

By an easy operation to stick out the top of the nozzle for introducing feed stock into the furnace, it can be easily achieved to make the combustion gas flow rate to be very high which has conventionally required complicated surrounding equipment, with keeping the pressure,drop to be low, and thus the present invention is industrially significant.

Here, in the case where the nozzle for introducing feed stock has an equipped part such as a cooling jacket, and they are stuck out in the furnace together, it is needless to say that they together can reduce the furnace cross section to a desired extent.

The reduction ratio of the cross section flow area is a value obtained by dividing the cross sectional area at the part of the nozzle for introducing feed stock in the furnace cross section, by the furnace cross sectional area including the nozzle for introducing feed stock.

As an example, in the case where the diameter of the part of the furnace where the nozzle for introducing feed stock is inserted is 60 mm, the number of the nozzles 2 for introducing feed stock, the outer diameter of the nozzle is 60 mm, and the top of the nozzle is inserted in the furnace by 20 mm, the cross-section of the part where the gas passes through is represented as FIG. 9. When there is no nozzle or the like, the furnace cross-sectional area of this part is about 2827 $mm^2$. However, as the nozzle for introducing feed stock having an outer diameter of 60 mm is inserted into the furnace, 1659 $mm^2$ in the furnace is covered with the nozzle, and the actual cross-sectional area at the part where the combustion gas passes through is about 1177 $mm^2$, which is about 41.6% of the furnace cross-sectional area at this point.

The flow rate of the combustion gas flowing in the furnace can be obtained by dividing the actual amount of the combustion gas flowing in volume by the cross-section flow area. Sound speed in the choke varies depending upon the temperature or the composition of the combustion gas. When the temperature of the combustion gas is 1800° C., the sound speed in this case is about 913 m/s. When the cross-section average flow rate of the gas in the second reaction zone is supposed to be 350 m/s, by influences of the nozzle for introducing feed stock as mentioned above, the flow rate of the combustion gas at the part is about 840 m/s, which is about 2.4 times as the cross-section average flow rate, and it is Mach 0.92.

As mentioned above, the combustion gas flow rate in the second reaction zone except the part of introducing the feed stock is about Mach 0.38 which is a common flow rate. However, by the effects of the nozzle for introducing feed stock, the flow rate at the part of jetting the feed stock can be made to exceed the level of from Mach 0.4 to Mach 0.8 which has been thought to be a general flow rate, and it can be made high speed of nearly Mach 1.

By this effect, the combustion gas flow rate immediately after the feed stock is introduced into the furnace can be made high, the feed stock is instantaneously atomized due to atomizing effect of the combustion gas, and the vaporization of the feed stock and carbon black forming reaction can be immediately conducted. As a result, carbon black wherein the particle size and the aggregate size are small, can be obtained.

In this example, the number of the nozzles for introducing feed stock is two. However, by further increasing a plurality of nozzles depending on the choke diameter or the diameter of the nozzle for introducing feed stock, the same effect as mentioned above can be obtained for furnaces having various inner diameters.

Further, as the combustion gas flow rate is accelerated to nearly the sound speed in a very short zone of only around the feed stock nozzle, the pressure drop can be suppressed to the minimum. This was confirmed by comparing the difference in the pressure drop in the entire furnace between in the case where the nozzle for supplying feed stock is stuck out to raise the combustion gas flow rate to nearly Mach 1, and in the case where the nozzle is not stuck out, and the diameter of the second reaction zone is made small to raise the combustion gas flow rate to nearly Mach 1. In this case, as time and labor are required to confirm the difference between them by experiments, the fluid analysis by using a computer was conducted to compare them. In this case, the fluid analysis was conducted by using a widely used commercially available heat fluid analysis program employing the difference calculus.

Further, by the method, the damaged part in the furnace due to kinetic energy of the combustion gas can be limited to the top of the nozzle, which contributes to reduce the cost for keeping the equipment for a long-term operation.

The carbon black producing apparatus itself to which the present invention is applied is not particularly limited so long as the cross-section flow area can be reduced by the nozzle for introducing feed stock as mentioned above. Particularly when the choke length is at least 500 mm, more effect can be obtained. This is attributable to a fact that when such a producing furnace having a long choke part is used, the combustion gas flow rate at the part of introducing the feed stock can be made high to from Mach 0.8 to Mach 1.0, and thus carbon black which is particularly excellent in blackness and dispersibility, can be obtained. On the other hand, as described above, if it is attempted to make the flow rate at the part of introducing the feed stock to be high by known methods in the producing furnace having such a long choke part, the pressure drop will be large, such being problematic.

In the third reaction zone, in order to cool the high temperature reaction gas to the level of not higher than from 1000 to 800° C., e.g. water is jetted from a nozzle 7 for introducing reaction terminating fluid. The cooled carbon black can be recovered by a conventional process such as a process of separating it from the gas by means of e.g. a collecting back filter.

Here, as mentioned above, the choke part inner wall surface is preferably in a smooth state, and the angle of the choke part inlet is preferably from 45° to 100°. However, it was considered to be hard to keep the part where the combustion gas of high temperature and high flow rate hits to be in a desired state.

For example, even when a refractory material made of high purity alumina, or alumina and chromia, carcia or lanthanoid element oxide, as a high temperature stabilizer, incorporated with alumina, is used as a material for the choke part, in the case of contacting it with the combustion gas of 1800° C. or above, the throttle portion will be significantly damaged or deteriorated due to wear by high temperature and the heat gas, and it was found to be difficult to keep the shape suitable for the carbon black production.

As the above-described material which can withstand a high temperature of 1800° C. or above, a refractory material having zirconia, magnesia or magnesia-chromia as the main component is considered to be most effective. However, the studies by the present inventors clarified that even if such a material is used, when the inside gas flow rate reaches 100 m/s at the temperature of 1800° C. of above, the thickness significantly decreases due to separation of such a material from the furnace material surface, and it may be difficult to keep the suitable shape of the reaction furnace. Accordingly, the material for the choke part is required to be a material which will not be damaged even when it is contacted with the gas stream of high temperature and high flow rate required to produce carbon black having an extremely sharp aggregate distribution. However, general refractory material which has been conventionally known can hardly satisfy such requirements, and the production of carbon black having high quality can not be continuously conducted, such being problematic.

As a method to prevent such a damage or deterioration of the choke part, JP-B-44-31926 and JP-A-47-563 propose to constitute the choke by a metal structure having a cooling structure by a coolant from the outside. Certainly, it is considered that when the choke part is constituted by using a metal structure having a forced cooling structure, reduction in thickness is significantly suppressed, and it may be possible to keep the suitable shape of the choke part. On the other hand, the studies by the present inventors clarified that when the choke part constituted by the metal structure is cooled from outside, the aggregate size of obtained carbon black tends to be large. This is estimated to be attributable to the fact that the amount of outgoing radiation from the metal surface having a low temperature is large, and thus significant temperature drop is caused in the carbon black production zone. Accordingly, longer time is required for solidification and carbonization of carbon black formed in the liquid phase, the number of collision and aggregation of carbon black increases, and thus carbon black wherein the aggregate is developed will form.

As a method to control the aggregate size of carbon black, a method has been conventionally known wherein an alkali metal compound such as potassium is added to the feed stock to suppress the structure. However, it was clarified that in the case of using the choke part constituted by the above-described metal structure having the forced cooling structure, it will be necessary to add a large amount of alkali metal compound, and thus inorganic salt impurities such as an alkali metal salt contained in the obtained carbon black will significantly increase, which will be cause to deteriorate optic suitability, dispersed condition and electric properties of a carbon black blended product.

More specifically, it was found that it will be necessary to increase the amount of the alkali metal compound to be added by so much as from about 200 to about 1000%, and as a result, the amount of inorganic compound impurity contained in the formed carbon black increases by about twice to ten times; carbon black having such a high impurity is likely to be disadvantage in view of various suitabilities such as defective dispersion, the influence is significant particularly in carbon black having a low DBP oil absorption, and this method is unsuitable to produce carbon black having a low oil adsorption of at most DBP oil adsorption 80 cc/100 g.

The producing equipment is required to generate the combustion gas stream of high flow rate and high temperature of 1800° C. or above, and to keep the high flow rate during the predetermined residue time required for carbon black formation. It is required to suppress wear and deterioration to be extremely low in a long period of time, hereby to suppress ununiformity in temperature in the system at the carbon black formation region, and to suppress the entire temperature drop.

The present inventors have conducted extensive studies to solve the above problems. As a result, they have found that the above problems can be solved by a carbon black producing apparatus having a choke of specific structure, and the present invention has been accomplished. Namely, the invention as explained hereinafter resides in a carbon black producing apparatus having a choke part, which comprises a first step part including the part of introducing the feed stock and a latter step part connected therefrom, wherein the first step part has a forced cooling structure, and difference in the inner diameter between the latter step part and the first step part is within 50% of the inner diameter of the first step part, and a method for producing carbon black which comprises using it.

It is preferred to use the producing apparatus having the choke formed in a second reaction zone by a taper type, a sudden reduction type or a shape of combining of these two, to accelerate the combustion gas in such a producing apparatus to a high flow rate of at least 250 m/s (preferably 300 m/s) suitable for carbon black production, and then to mix the combustion gas with a feed stock in the second reaction zone. Here, for reaction of the feed stock at a high speed at the part of introducing the material oil, it is preferred to form a sudden reduction part or a reduction taper angle part of at least 10° immediately before introducing the material oil, to heighten the miscibility.

In the present invention, the choke part comprises the first step part including the part for introducing the feed stock and the latter step part connected therefrom, the first step part has a forced cooling structure, and difference in the inner diameter between the latter step part and the first step part is within 50% of the inner diameter of the first step part. Here, the inner diameter of the latter step part of the choke part may be larger, the inner diameter of the first step part may be larger, or they may be the same. As mentioned above, it is important to employ one having the choke part with a forced cooling structure at the first step part.

The material for the first step part is preferably a metal. It is easy to cool, damages and deteriorations of the inner wall can be prevented by cooling, and smoothness of the inner wall can be kept. Accordingly, the carbon black formation reaction is conducted uniformly in the choke part, and carbon black wherein the aggregate size is extremely sharp can be continuously obtained.

The means to cool the first step part is not particularly limited, and any one may be employed so long as the damages and the deteriorations of the choke inner wall can be prevented, and the smoothness can be kept. Usually, a structure to forcibly cool from the outside of the throttle portion, more specifically one having a jacket structure such as a metal jacket structure having a high thermal conductivity, to forcibly cool the throttle portion of the first step part by flowing a cooling medium such as a liquid or a gas, may be mentioned.

Further, it is preferred to form the part where the choke part contacts with the forced cooling structure such as a jacket, by an inorganic compound or a metal having the higher heat resistant temperature than the metal constituting the jacket.

As the length of the first step part, the distance from the part of introducing the feed stock to the final point of the first step part of the choke part, i.e. the boundary between the first step part and the latter step part of the choke, is preferably from 30 to 300 mm, more preferably from 50 to 200 mm.

Further, downstream to the above-mentioned first step part, the latter step part is connected therefrom, which has a difference in the inner diameter with the first step part within 50%, preferably within 30%, of the inner diameter of the first step part.

The latter step part is formed preferably by a refractory material, more preferably a refractory material having a softening point of at least 1800° C. The length of the latter step part is preferably at least 500 mm, more preferably 700 mm.

It is considered that the hydrocarbon mixed with the combustion gas of high flow rate and high temperature is immediately atomized in the choke part, the atomized hydrocarbon is completely mixed with the combustion gas in successive residue distance of several tens mm, and it reaches an adequate temperature to initiate the reaction, and at the same time, it suddenly cools the temperature of the mixed gas.

As a result of analyzing temperature balance by practical measurement of temperature at each part of the reaction, by the reaction analysis or the like, it was clarified that a large amount of heat of the combustion gas is consumed to raise the temperature of the feed stock and to atomize it; under each production condition as described above, the feed stock is atomized and mixed immediately after introduced into the high flow rate gas stream, and the residue distance to the mixed gas being cooled is from 50 to 100 mm from the point of introducing the feed stock, in which atomization of almost all the hydrocarbon is completed.

It was clarified that the mixing speed is extremely high under gas flow rate of at least 250 m/s, and as soon as the atomization completes, the hydrocarbon is mixed with the surrounding high temperature combustion gas, and the temperature of the entire gas decreases by at least 200° C.

In the present invention, the first step part of the choke has a cooling structure. Accordingly, damages and deteriorations of the choke part can be prevented, and high smoothness can be kept. On the other hand, the development of the aggregate which has been conventional problem due to the choke part having a cooling structure, is considered to be influenced by the temperature drop after the temperature-rising and atomizing of the feed stock. Accordingly, it is considered that the above-mentioned problems can be solved by equipping with a cooling structure for the part wherein the temperature, in the state where the temperature of the introduced feed stock is raised, the feed stock is atomized, and it is mixed with the high temperature combustion gas refluxed from the first reaction zone, is cooled to a durable temperature or lower, including durability against wear of the refractory material, to improve durability; and by suppressing the outgoing radiation from the material by using a refractory material having a melting point of 1900° C. or higher, such as an alumina-chromia type refractory material or an alumina type refractory material which has a small silica contents, as the choke part latter step part is usually a reaction gas zone of 1600° C. or lower. Accordingly, it is considered that in the present invention, as the distance from the part of introducing the feed stock to the boundary between the first step part and the latter step part of the choke part is adjusted to be from 0 to 300 mm, the temperature drop due to the feed stock being mixed with the combustion gas and atomized completes, and the increase in the size of the carbon black aggregate can be suppressed.

Accordingly, the portion from the choke part orifice to the part from about 50 to about 100 mm after the feed stock is introduced, is preferably constituted by a structure, capable of suppressing heat resistance against the high temperature gas of 1800° C. or above and wear by turbulence due to generation of the high flow rate, i.e. a metal structure having the surface cooled to heat resistant temperature of 800° C., to which the wear resistance of the ordinary metal added. The region downstream thereto can be dealt with a refractory material of about 1800° C., as the cooling by the feed stock will take place. For such a region, the producing equipment of a different material (property) composed of refractory material such as alumina having a high heat resistant temperature, capable of keeping the surface temperature to be from about 800 to 1800° C., is effective not to significantly cool the gas temperature, and the choke part latter step part is preferably composed of such a region.

With regard to the material for the choke first step part, it is preferred that the temperature of the material surface decreases by cooling, and heat resistance improves. Accordingly, to suppress wear of the material, a highly heat resistant inorganic compound such as alumina or silica, in addition to a metal having a high thermal conductivity, as a material for a forced cooling structure, may be coated on the metal surface.

Here, in the case of keeping the furnace inside temperature to be at least 2000° C. just like in each production method of the present invention as mentioned above, it is important to precisely estimate the temperature in the furnace. This is because not only the temperature in the furnace directly relates to the quality of carbon black formed, but also if the temperature in the furnace is raised to much and exceeds the heat resistant temperature of the furnace wall, the furnace wall will be damaged, hereby it becomes impossible to conduct operation.

The combustion temperature in the conventional furnace has been considered to be about 1800° C. at highest, and it is possible to insert a thermocouple into the furnace to directly measure the gas temperature.

However, if the temperature in the furnace is 1800° C. or above, which is the heat resistant temperature of the thermocouple or above, it is impossible to directly measure the temperature in the furnace by inserting it into the furnace.

As a method for measuring the temperature exceeding 1800° C., a radiation thermometer or an optic thermometer may, for example, be mentioned. However, it is difficult to precisely measure the temperature in the furnace during operation of the furnace.

Accordingly, particularly in the case where the temperature in the furnace is 1800° C. or above, it is required to establish a method to precisely estimate the temperature in the furnace.

The invention explained hereinafter provides a method to estimate the gas temperature in the furnace and the temperature of the furnace inner wall which have been impossible to measure, to prevent the furnace wall material from being damaged due to the temperature of the furnace inner wall surface becoming high temperature of heat resistant temperature of the furnace wall material or above, in the case of effectively producing of carbon black having an excellent coloring power and rubber reinforcing property by keeping the combustion temperature in the furnace to be high temperature of 1800° C. or above.

The present inventors have conducted extensive studies to solve the above-mentioned problems. As a result, they have found a method to precisely obtain the temperature in the furnace even at a high temperature of 1800° C. or above by a specific method, and the present invention has been accomplished. Namely, the invention as explained hereinafter resides in a method for producing carbon black, which comprises using a carbon black producing furnace by a furnace method, wherein a step to estimate the gas temperature in the furnace and/or the furnace wall temperature by measuring the temperature of the thermocouple put in the furnace wall is conducted.

The present inventors have conducted various studies on a method to precisely estimate the temperature in the furnace even when the temperature in the furnace is 1800° C. or above, and as a result, they have found that a method to put the thermocouple in the furnace wall, and to estimate the temperature in the furnace from the measured temperature, is most precise.

The present invention can be widely applied to producing furnaces to produce carbon black. Specifically, it is suitable to obtain the temperature in the furnace or the temperature of the furnace wall for a carbon black producing furnace to be used in the furnace method.

The furnace is usually cooled naturally or forcibly from the outside, and the heat is emitted outside. Accordingly, the temperature grade is generated in the inside of the furnace material constituting the furnace, and even if the part close to the furnace inner wall has a high temperature of about 1800° C., the inside of the furnace wall has a lower temperature than that. Accordingly, it is possible to put the thermocouple in the inside of the furnace wall and to measure the temperature at the part.

Mainly two kinds of temperatures should be estimated. One is the temperature of the surface of the furnace inner wall of the refractory material, and the other is the combustion gas temperature in the furnace. The furnace inner wall temperature of the refractory material is important not to damage the refractory material, and the combustion gas temperature in the furnace is important to control the quality of carbon black formed.

The present inventors have found that both two kinds of temperatures as mentioned above can be estimated from the measured temperature of the thermocouple put in the furnace wall.

First, the furnace inner wall temperature can be estimated from a heat transfer calculation. The thermal conductivity of the furnace wall material is known, and in general, the value varies depending upon the temperature. The formula to be the basis of the heat transfer calculation is:

$$Q = \lambda A \Delta T / L$$

and called as Fourier's formula. Here, Q is amount of heat transfer per unit time, $\lambda$ is the thermal conductivity, A is an area which the heat pass through, $\Delta T$ is a difference in temperature between the two points, and L is a distance between the two points. Basically the heat transfer calculation is conducted based on the formula, the practical furnace has complicated shape, and the way of heat transfer is three dimensional, and the way of transfer differs depending upon the shape of the furnace. Further, although the thermal conductivity of the furnace wall material has been known, the value usually changes depending upon the temperature. Accordingly, it is more precise to conduct computer simulation employing finite element method to estimate the temperature of the surface of the furnace inner wall from the temperature in the inside of the furnace wall. Here, it is preferred to precisely model the shape of the furnace, and to consider the dependency of the thermal conductivity on the temperature. The finite element method employed here is one used widely for technical calculations.

Then, with regard to estimation of the gas temperature in the furnace, it can also be conducted by using computer simulation. As the furnace wall is usually cooled naturally or forcibly from outside, heat is emitted outside through the furnace wall, and difference between the furnace inner wall temperature and the gas temperature in the furnace will be generated. The present inventors have conducted the heat fluid analysis by a computer, and calculated the difference between the gas temperature in the furnace and the furnace wall temperature, and established a method to estimate the gas temperature in the furnace from the furnace wall temperature. In the calculation, convective heat transfer due to the gas in the furnace and radiation heat transfer due to combustion flame or gas in the furnace are taken into consideration. The calculation technique itself is one used widely for technical calculations employing difference calculus.

When the furnace inner wall temperature and the combustion gas temperature in the furnace are estimated by the above-mentioned method, in order to heighten the reliability of the estimated value, it is preferred to provide at least two thermocouples inside the furnace wall. Further, in such a case, when they are provided in the normal line direction of axis of the furnace, the amount of heat emitted at the two points can be measured. One of the thermocouple is preferably located as close to the furnace inner wall as possible within a range of the thermocouple not being ruptured. The other thermocouple is located preferably at the lower temperature side in the same refractory material.

In such a manner, by estimating the furnace inner wall temperature and the gas temperature in the furnace, the temperature can be controlled.

In order to obtain the high temperature combustion gas of at least 2000° C., usually a method to pre-heat at least one of the air and the hydrocarbon fuel, or a method to use oxygen-enriched air for fuel gas, may be mentioned. To control the combustion gas temperature and the furnace inner wall temperature, in the former case, the degree of pre-heating of the air and the hydrocarbon fuel is controlled. Namely, the temperature of the combustion gas and the furnace inner wall rise too much and should be lowered, the degree of pre-heating is reduced, and when the temperature should be heightened, the degree of pre-heating is increased. Further, in the latter case of using the oxygen-enriched air, the concentration of oxygen and the amount of fuel supplied are controlled. Namely, when the temperatures of the combustion gas and the furnace inner wall rise too much and should be lowered, the concentration of oxygen and the amount of fuel supplied is reduced, and when the temperature should be heightened, the concentration of oxygen and the amount of fuel supplied is increased.

In such a manner, carbon black having excellent coloring power and rubber reinforcing property, can be effectively produced without damaging the furnace wall material, by keeping the combustion temperature in the furnace to be the maximum temperature within a range of not damaging the furnace wall material.

Here, as mentioned above, in order to obtain carbon black having a small particle size, it is effective to jet the feed stock into the high speed gas stream in the choke part at the reaction zone at first, to utilize kinetic and heat energy of the gas for atomizing the liquid supplied material, and to effectively utilize heat energy of the high temperature combustion gas by turbulent mixture in the reaction part for the reaction for carbon black formation.

As a combustion burner for the carbon black producing furnace, various ones having different shape may be employed. However, as the material, a metal for high temperature such as stainless steel for high temperature is commonly used, and it can be used to the temperature of 1700° C. at highest even under oxygen atmosphere such as producing carbon black.

However, it was clarified that at the temperature of higher than 1700° C., problems such as damage in burner due to melt deterioration or deformation by heat are likely to result in the combustion burner which has been conventionally used for the carbon black producing apparatus, such being very dangerous.

For example, JP-B-44-31926 discloses a carbon black producing furnace with a structure, having a fuel hole and a fuel gas hole with a refractory material, wherein diffusion and combusting is conducted in the combustion chamber. However, such a combustion burner structure can hardly be used at a temperature higher than the heat resistant temperature of the refractory material. Some refractory materials are considered to withstand the temperature of 2000° C. or above (for example, zirconia type refractory material, magnesia-chrome type refractory material or magnesia type refractory material), problems of heat shock due to a change in the temperature e.g. during temperature rising or temperature falling under a high oxidation atmosphere of the carbon black producing furnace, or problems such that the refractory material is broken by e.g. erosion due to the high speed gas stream, in the case where the fuel hole and the fuel gas hole are made by a refractory material, are brought about, and it was difficult to put such a refractory material into a practical use.

The object of the invention as explained hereinafter is to provide a combustion burner capable of withstanding production for carbon black by using a high temperature gas, and a production apparatus.

The present inventors have conducted extensive studies to solve the above-mentioned problems. As a result, they have found that carbon black having excellent properties such that the first order particle size is small, the aggregate size is small, the width of the aggregate distribution is small, and the amount of large aggregate is small, can be obtained by using a combustion burner having a specific structure to generate the combustion gas, and achieved the invention as explained hereinafter.

Namely, the invention as explained hereinafter resides in a combustion burner for producing carbon black which comprises a cooling jacket structure, a method for producing carbon black by using it, and a carbon black producing apparatus which consists of a combustion part, a reaction part and a part for terminating the reaction, and which has a combustion burner equipped with a cooling jacket structure.

The invention as explained hereinafter is to use a carbon black producing apparatus which consists of a combustion part, a reaction part and a part for terminating the reaction, and which has, as the combustion burner, one having a specific structure. The carbon black producing apparatus which consists of the combustion part, the reaction part and the part for terminating the reaction itself has been known, and known techniques can be suitably selected. For example, a producing apparatus can be constituted as illustrated in FIG. 1.

In the invention as explained hereinafter, the combustion burner has a cooling jacket structure. A schematic diagram of one example of the combustion burner having a cooling structure is illustrated in FIG. 4. In FIG. 4, 21 is a cooling jacket, 22 is a cooling medium inlet nozzle, 23 is a cooling medium outlet nozzle, 24 is a diffuser part, 24-1 is a taper part, 24-2 is a combustion gas jetting hole, 24-3 is a fuel gas introducing hole, 25 is a flange, 26 is an O-ring, 27 is a fixed screw, 28 is a spring for enforcing the diffuser, 29 is a fuel introducing tube, 210 is a fuel introducing flange, and 211 is a fuel gas introducing nozzle.

The cooling jacket has a cylindrical double tube structure installed outside the combustion gas introducing tube of the combustion burner, the diffuser part for combustion contacts with the inside of the double tube, and thus the diffuser part for combustion is also cooled.

As the material for the double tuber and the diffuser part is preferably a material having good thermal conductivity. Here, the material having good thermal conductivity is a material having a thermal conductivity of at least 100 kcal/mhr° C., and specifically, it may, for example, be copper, copper alloy or aluminum. For the part in the cooling jacket, which faces the furnace, and which will sustain high temperature, other structure material can be employed. The cooling jacket has a double tube structure capable of cooling the combustion burner by flowing a cooling structure in the direction of the arrow in the Figure.

When a measuring instrument capable of detecting the temperature such as a thermocouple is installed in the double tuber or the diffuser part, the cooling condition lo of the combustion burner point can be grasped, and the stable operation becomes practicable. Further, by grasping the temperature in such a manner, the optimum operation becomes practicable by adjusting the amount of cooling medium. Namely, it is necessary to minimize the amount of radiation to obtain high temperature, to operate with the minimum amount of the cooling medium is one means to keep high temperature.

It is usually difficult to conduct operation covering a region of from low temperature to high temperature by using one combustion burner. Accordingly, it is preferred to raise the temperature to the high temperature region by using at least two combustion burners. Such a mode becomes practicable by exchanging the diffuser for a special diffuser for each temperature region. In such a case, as the inner surface of the outer cylinder of the cooling jacket and the peripheral face of the diffuser are contacted with each other, heat exchange is effectively conducted, and the point contacting with the high temperature atmosphere is cooled. In the case where the contacting face is parallel with the axial direction of the furnace, it is difficult to pull the diffuser part out. This is attributable to a structure wherein the faces of both material contact with each other by heat expansion, by adjusting the inner diameter of the outer cylinder of the cooling jacket and the outer diameter of the diffuser part. However, by making the contact face in a form of a taper, it becomes possible to easily exchange the combustion burner even at a high temperature. The taper angle is not particularly limited so long as it is at most 60° Preferably it is from 1° to 10°.

In order to obtain the smooth contact of the diffuser with the taper part of the cooling jacket point, a spring for enforcing the diffuser is used. Any means may be employed so long as the enforcing force functions as a spring in FIG. 4. As the seal structure of the flange part, a structure having the same sealing property as the O-ring, may be optionally employed. For example, by employing a grand box structure using a ground packing, a structure keeping sealing property can be obtained.

Novel and useful carbon black satisfying blackness and dispersibility simultaneously, and its production method are explained above. Here, the studies by the present inventors clarified that conventional carbon black has the following problems. Namely, with regard to carbon black obtained with a conventional method, it was clarified that in the region of the average particle size of 14 nm or smaller, further, in the region of the small particle size of from about 8 to about 13 nm, the relation of an inverse proportion between the particle size and blackness collapses, and blackness in a resin or in a coating material does not increase even when the particle size is made small, and carbon black having a certain level of blackness or higher can hardly be obtained.

For example, with regard to the visual comparison of the type having a transparent soft PVC type and carbon black as a coloring agent directly kneaded therewith, it was confirmed by the present inventors that in the case where carbon blacks having a particle size of 10 nm, 12 nm, 13 nm or 15 nm, each having a compression DBP oil absorption of 70 ml/100 g, are compared with each other, although there is a significant difference in the visual blackness between one of 15 nm and one of 13 nm, there is no difference between one of 13 nm, 12 nm and 10 nm at all.

A method to impart functional groups on the surface of carbon black particles, as a factor on blackness, in addition to the particle size or the aggregate size, has been proposed. For example, JP-B-46-18368 discloses an example to improve blackness of an ink by oxidation of carbon black with ozone. However, such a method to impart functional groups is a method wherein the functional groups on the surface of carbon black adsorb functional groups or polar atom part of varnish having a relatively low molecular weight such as an ink or a coating material, thereby the varnish phase is formed on the carbon black surface to change the refractive index of the light, or to prevent aggregation of carbon black when it is solidified to improve optical suitability. It is effective only in a certain inks or coating material varnish having highly polarized polymerizable low molecular weight resin component such as an alkyd resin, a melamine resin or a phenol resin, dissolved in a solvent. In the case where it is dissolved in most thermoplastic resin consisting of high molecular polymer, or in the case where it is dissolved in a varnish or a mineral oil varnish having a few functional groups and having a weak polarity, consisting of e.g. an acrylic resin or a styrene resin, blackness is hardly influenced even when the functional groups are imparted by a known surface treatment such as oxidation.

The present inventors have conducted extensive studies to analyze phenomena on specific behaviors of blackness within a region of small particle size of 14 nm or smaller, and to improve blackness. As a result, they have reached a conclusion that as one reason of carbon black having a small particle size which originally displays optically higher blackness not adequately displaying blackness in the dispersed system, aggregation property by the carbon black surface significantly increases due to decrease in carbon black particle size and increase in the specific surface area resulting therefrom, hereby carbon black remains in a state where the carbon black particles are not adequately separated, and as a result, blackness can not be obtained. Further, they have found methods for improving the problem.

Namely, (1) In order to weaken the aggregating property on the carbon black surface, the surface is improved to be in the state where aggregation is less likely to occur even with high specific surface area. As a result of studies, the aggregation property has a close relation with the amount of oxygen-containing volatile matter per surface area; by imparting the oxygen-containing volatile matter of at least 0.35 mg per 1 $m^2$ of nitrogen absorption surface area of carbon black, the aggregation property of carbon black significantly decreases; and in the soft PVC type wherein blackness is hardly influenced by the oxidation treatment in the carbon black having a large specific surface area, carbon black having a weak aggregation property and having such a surface improvement conducted, has improved blackness as compared with carbon black not having surface improvement conducted.

(2) With regard to the surface improvement of the above-mentioned (1), the influence factor is not the total amount of volatile matter but the amount of volatile matter per unit area. In the case of using one wherein carbon black before oxidation is subjected to high temperature during formation for a long period of time, it is activated to be porous, thereby the specific surface area becomes larger, even though the particle size is same, it is required to impart significant volatile content to satisfy the conditions of (1), it is required to significantly increase the oxidation material and to make the oxidation time long, and thus economical efficiency decreases. Further, in the case of conducting oxidation by using an oxidizing agent such as nitric acid or nitrogen dioxide, if the oxidation temperature is high or oxidation time is long, the activating reaction by the oxidizing agent occurs with the oxidation reaction for imparting volatile matter, and the specific surface area increases. Accordingly, the amount of volatile matter per unit area does not increase, and carbon black having a weak aggregation property can not be obtained. Suppression of the increase in the specific surface area due to activation of oxidized base carbon black and carbon black after oxidation is essential to obtain a carbon black having a low aggregation property, and the specific surface area increases in no small quantities due to the oxidation treatment. Accordingly, it is necessary to adjust the roughness factor ($N_2SA$/SEM ratio) of carbon black before the oxidation treatment to be at most 2.5 and the roughness factor ($N_2SA$/SEM ratio) of carbon black after the oxidation treatment to be at most 2.8, preferably at most 2.5, in addition to the oxidation surface improvement in (1).

A $N_2SA$/SEM specific surface area ratio can be obtained by obtaining each $N_2SA$ and SEM specific surface area, and calculating their ratio. The measurement of $N_2SA$ is determined in accordance with ASTM D3037-88. The measurement of the SEM specific surface area is calculated from the following formula:

$$SEM = 6000/(\rho \cdot dA)$$

ρ: Specific gravity of carbon black (1.86 g/cm$^3$)
dA: Volume area particle size (nm)

(3) As a result of studying relation between blackness and properties of carbon black having various oxidation treatment conducted, by (1) and (2), it was clarified that the amount of iodide adsorbed per carbon black surface influences on blackness, in addition to amount of volatile matter and roughness. Namely, the smaller the ratio of the amount of iodide adsorbed/nitrogen adsorption specific surface area (N$_2$SA), the higher the blackness in the resin blended type tends to be, and it is almost saturated when the ratio of the amount of iodide adsorbed/the nitrogen adsorption specific surface area (N$_2$SA) is 0.45 or below.

It was found that the above three points are effective to obtain high blackness, and by combining at least one of these methods, blackness of carbon black having small particle size wherein blackness does not increase anymore, improves, and it becomes possible to obtain a composition having high blackness level which has not been obtained.

Namely, by carbon black as mentioned hereinafter, a high blackness level which has not been obtained, can be achieved.

(1) A carbon black wherein volatile content per unit surface area is at least 0.35 mg/m$^2$, and the particle size is at most 14 nm.
(2) The carbon black according to the above-mentioned (1), wherein the roughness factor (N$_2$SA/SEM ratio) is at most 2.8.
(3) The carbon black according to the above-mentioned (1) or (2), wherein the ratio of the amount of iodide adsorbed/ nitrogen absorption specific surface area (N$_2$SA) is at most 0.45.
(4) The carbon black according to any one of above-mentioned (1) to (3), wherein cDBP is at least 50 cc/100 g.

In order to produce above-mentioned carbon black having high volatile content, it is preferred to employ a producing process of two steps, which comprises a process to produce base carbon black not having oxidation treatment adequately applied, and an oxidation process to conduct oxidation treatment on carbon black obtained by controlling the surface conditions to impart volatile content.

With regard to production for base carbon black which is the first process, the average particle size is required to be at most 14 nm. Particularly preferably it is from 8 to 13 nm. If the particle size exceeds 14 nm, aggregation property of carbon black significantly decreases, and influence of decrease in the aggregation property due to the surface condition is hardly be observed. The oxidation treatment is effective only in the system wherein affinity between carbon black and a certain polymerizable vanish improves by a known surface improvement, and thus varnish adsorption occurs, which affects optical suitability. This is different from optical suitability improvement used widely by decrease in the aggregation property of carbon black of (1) to (4). Particularly, when the particle size is at most 13 nm, a phenomenon can be observed wherein blackness can not adequately be obtained due to aggregation property of carbon black in almost all the dispersed system. Here, a method to directly weaken the aggregation property of carbon black by the oxidation treatment is effective, which is different from improvement in affinity with the varnish which is conventional techniques. Here, the average particle size indicates the number average size of the first order particle size obtained by an electron microscope method.

Further, the compression DBP oil absorption (cDBP) of carbon black significantly influences on the aggregation property of carbon black. If cDBP is low, the aggregation property of carbon black significantly increases, and it may be difficult to adequately obtain the effect even if the aggregation property improvement is conducted by the surface condition improvement. Accordingly, cDBP of carbon black suitable for obtaining high blackness is preferably at least 50 ml/100 g.

For the above-mentioned carbon black of (1) to (4), it is preferred to use one wherein the N$_2$SA/SEM specific surface area ratio is at most 2.8, more preferably at most 2.5, and produced by controlling roughness factor (N$_2$SA/SEM ratio) of carbon black before the oxidation treatment to be at most 2.5.

With regard to the above-mentioned carbon black of (1) to (4), the aggregate size is not particularly limited. $D_{mod}$ is preferably at most 80 nm, more preferably at most 50 nm. The role of the aggregate size on dispensability and blackness is becoming clear as mentioned above. In the present invention, carbon black having a specific particle size, a specific N$_2$SA/SEM specific surface area ratio, a specific pH and specific cDBP, displays suitable properties within a range of $D_{mod}$ being at most 80 nm, more preferably at most 50 nm.

Further, by adjusting the ratio of the half width of the stokes diameter at the point of the peak $D_{1/2}$ to the stokes diameter at the point of the peak $D_{mod}$, $D_{1/2}/D_{mod}$ to be at most 0.6, preferably at most 0.55, extremely excellent blackness can be obtained, and dispersibility improves.

Further, within a range of the above-mentioned carbon black (1) to (4), the ratio of volume 75% diameter $D_{75}$ to $D_{mod}$, $D_{75}/D_{mod}$ is preferably at most 1.6, particularly preferably at most 1.3. This is one wherein the content of large aggregate having an aggregate size exceeding the volume 75% diameter, which will be a bad influence on dispersibility, is kept to be extremely low.

On the other hand, the present inventors have found carbon black which keeps high blackness, good dispersibility, good fluidity, particularly fluidity under high shear speed, and which prevent aggregation, when it is formed into various carbon black containing compositions. This can be achieved by carbon black as explained hereinafter.

(5) A carbon black having an average particle size of at most 25 nm, a particle size standard deviation/average particle size ratio of at most 0.35, $D_{mod}$ of at most 80 nm, a $D_{1/2}/D_{mod}$ ratio of at most 0.60 and a N$_2$SA/SEM specific surface area ratio of at most 2.8.
(6) The carbon black according to (5), which has a pH of less than 5.
(7) The carbon black according to (5) or (6), which has an average particle size of at most 15 nm.
(8) The carbon black according to any one of (5) to (7), wherein the ratio of the amount of iodine adsorbed (IA) to nitrogen adsorption specific surface area (N$_2$SA) at most 0.5 mg/m$^2$, and IA (mg/g) is less than volatile matter (mg/g)+0.1×N$_2$SA).
(9) The carbon black according to any one (5) to (8), which has cDBP of at least 50 ml/100 g.

With regard to each carbon black of (5) to (9), the average particle size is at most 25 nm. Particularly preferably it is from 8 to 15 nm. If the particle size exceeds 25 nm, blackness of carbon black becomes significantly low, and the carbon black can hardly be applied to the field wherein the quality of "blackness" as a color is required. To obtain higher blackness, it is preferably at most 15 nm.

Even if carbon black has a small particle size, with regard to the particle size distribution, in the case where a large amount of carbon black having a large particle size of at least 150% of the average particle size is contained, such a carbon black of large particle size significantly deteriorates blackness. To avoid this, the particle size distribution wherein the large particles to be a factor for decrease in blackness hardly exist, i.e. the sharp particle size distribution wherein the ratio of particle size standard deviation Dσ to the average particle size D, Dσ/D, is at most 0.45, more preferably at most 0.40, is preferred to obtain high blackness.

Here, the average particle size indicates the average size of the first order particle size obtained by an electron microscope method.

With regard to the above-mentioned carbon blacks of (5) to (9), in order to obtain particularly high blackness, the aggregate size of carbon black is at most $D_{mod}$ 80 nm, more preferably at most 50 nm. This is attributable to the fact that the aggregate size has a close relation with blackness, and with carbon black having a large aggregate size of exceeding 80 nm, extremely high blackness can not be obtained. Further, the distribution of the aggregate size has a close relation with dispersibility. The present inventors have found that in order to achieve desired balance between blackness and dispersibility, it is required to adjust the ratio of the half width of the stokes diameter at the point of peak $D_{1/2}$ to the stokes diameter at the point of the peak $D_{mod}$, $D_{1/2}/D_{mod}$, to be at most 0.6, preferably at most 0.55.

Further, with regard to the above-mentioned carbon blacks of (5) to (9), the ratio of the volume 75% diameter $D_{75}$ to $D_{mod}$, $D_{75}/D_{mod}$, is preferably at most 1.6, particularly preferably at most 1.3. This is one wherein the content of large aggregate having an aggregate size exceeding the volume 75% diameter, which will be a bad influence on dispersibility, is kept to be extremely low.

The above-mentioned carbon blacks of (5) to (9) is one having a $N_2SA$/SEM specific surface area ratio of less than 2.8, more preferably at most 2.5. The smaller the particle size, the higher the temperature during carbon black formation tends to be, both in the channel method and in the furnace method. However, in the channel method having poor heat miscibility, the surrounding gas temperature tends to be high. Accordingly, among carbon blacks having the same particle size, the carbon black produced by the channel method is considered to be more activated and have a higher specific surface area. With regard to carbon black having an average particle size of at most 25 nm, the temperature during formation is at least 1200° C., and at such a temperature, the activation reaction of carbon black is suddenly accelerated, and the development of roughness can not be ignored anymore. Particularly when forming carbon black having a particle size of at most 15 nm, the surrounding gas temperature reaches 1500° C. or above, the activation reaction suddenly occurs in the residue time of from about 5 to about 20 msec after carbon black is formed, and significant increase in the specific surface area can be observed. When the activation reaction on carbon black surface proceeds, and the surface becomes porous, the pore part adsorbs resins, varnish components or solvents in larger amount as compared with the smooth surface which originally exist. Accordingly, the free resins, varnish or solvents existing in the aggregate of carbon black will decrease, and viscosity of the dispersion system is significantly increased. Making carbon black to be porous has a strong relation with a $N_2SA$/SEM specific surface area ratio of carbon black which is called as a roughness factor. The $N_2SA$/SEM specific surface area ratio can be obtained by obtaining each $N_2SA$ and SEM specific surface area, and calculating their ratio. The measurement of $N_2SA$ is determined in accordance with ASTM d3037-88. The measurement of the SEM specific surface area is calculated from the following formula:

$$SEM=6000/(\rho dA)$$

ρ: Specific gravity of carbon black (1.86 g/cm³)
dA: Volume area particle size (nm)

If the $N_2SA$/SEM specific surface area ratio of carbon black exceeds 2.8, for example, in the dispersed system in which at least 20 wt % of carbon black is blended, the viscosity of the dispersed system tends to significantly change even by a small change in the amount incorporated, and it becomes extremely difficult to produce a composition having a stable viscosity. Further, with e.g. a resin masterbatch having at least 40 wt % of such a carbon black incorporated, the mixing torque significantly increases due to increase in viscosity during dispersion, and mixing becomes difficult. Further, the masterbatch having such a high viscosity is not adequately dissolved in other resin in the diluting step for practical use, significant deterioration in optical suitability or in strength property is brought about, and the masterbatch can not be used practically.

In order to suppress the development of roughness, it is important to adjust the part for terminating the reaction so that the residue time from the carbon black formation to the reaction termination is short. On the other hand, the time to the reaction termination will be a significant influence on the content of aromatic hydrocarbon having extremely poor safety, i.e. the degree of process of carbon black carbonization reaction. If the time until the reaction termination is short, the time after the feed stock is supplied until carbon black forms, and the time after carbon black, in the state where formed aromatic hydrocarbon having extremely large amount of hydroxide is aggregated, undergoes dehydrogenation reaction and carbonization, will be short. Therefore, obtained carbon black will have a large amount of aromatic hydrocarbon, and will be poor in safety. Accordingly, termination of the carbon black reaction is conducted by decreasing the temperature to 1200° C. or below at which the activation reaction instantaneously proceeds, around the part where the carbonization reaction completes, in order to satisfy safety and suppression of roughness simultaneously.

As a result of extensive studies on factors on development of roughness of carbon black besides the condition for terminating the reaction, the present inventors have found that the $N_2SA$/SEM specific surface area ratio of carbon black is significantly affected by the particle size distribution of carbon black. The time necessary for formation and carbonization of carbon black, namely the time until the activation reaction starts after carbonization, significantly changes depending upon the particle size of each carbon black. The larger the particle size of carbon black, the later the formation starts, and the lower the temperature of the surrounding extremely close to the carbon black particles formed, and thus longer time is required for carbonization. Accordingly, the particle size distribution of formed carbon black is broad, and the amount of carbon black having a large particle size of at least 150% of the average particle size, is large. Accordingly, it is necessary to delay the reaction termination while the carbonization of carbon black having a large particle size of at least 150% of the average particle size completes. On the other hand, the activation reaction of carbon black having an average particle size or smaller which is rapidly formed and carbonized, starts much earlier. What is worse, the temperature of the surrounding of such a carbon black having a small particle size is extremely high, and the activation reaction proceeds very quickly. As a result, by observing the carbon black having a broad particle size distribution and a small amount of aromatic hydrocarbon by an electron microscope in detail, carbon black smaller than the average is in the porous state, and some of carbon black having particularly extremely small particle size is in the state where "blow hole" is formed on the entire particles. On the other hand, carbon black having an extremely sharp particle size distribution, wherein carbon black, having larger particle size as compared with the average particle size, and having longer time for carbonization, hardly exist, and carbon black, having a smaller particle size as compared with the average particle size, and which is quickly activated, is hardly exists either, i.e. the above-mentioned carbon blacks of (5) to (9) wherein the ratio of the particle size distribution standard deviation $D\sigma$ to the average particle size D, $D\sigma/D$, is at most 0.45, more preferably at most 0.40, is suitable to suppress the development of roughness. In order to produce such a carbon black having a sharp particle size distribution, a method may be employed wherein carbon black is formed under environment which brings high miscibility under conditions of extremely uniform temperature distribution and concentration distribution of the feed stock.

Further, the compression DBP oil absorption (cDBP) of carbon black will be a significant influence on aggregation property of carbon black. If cDBP is low, the aggregation property of carbon black will significantly increase, and the effect of aggregation property improvement by improvement in surface condition of carbon black which is the effect of the present invention, is less likely to be adequately obtained. Accordingly, CDBP suitable for the above-mentioned carbon blacks of (5) to (9) is preferably at least 50 ml/100 g.

It is known that for a varnish type which is a kind of coating materials and inks, one having acid functional groups imparted on the surface of the carbon black particles is used to improve dispersibility of carbon black, dispersion stability and viscosity property. For example, JP-B-46-18368 discloses an example to oxidize carbon black with ozone to improve blackness in the ink type. Such a carbon black having many acid functional groups on the surface has such a effect that it adsorbs polar atom part or functional groups of varnish having a relatively low molecular weight such as an ink or a coating material, varnish phase is formed on the carbon black surface to change refractive index of the light, or the aggregation of the carbon black is prevented when it is solidified, to improve optical suitability. Particularly in a kind of ink or coating material varnish type having highly polarized polymerizable low molecular weight resin component such as an alkyd resin, a melamine resin or a phenol resin dissolved in a solvent, in the case of using carbon black of small particle size having a high aggregation property, blackness and gloss will decrease due to extreme increase in viscosity or re-aggregation of carbon black when it is subjected to hardening, and such an ink or coating material varnish can not be used practically unless the acid functional groups are imparted on the surface. Accordingly, carbon black is required to be acid having the pH of less than 5. With regard to the dispersed system wherein adsorption of such a polar vanish component is effective, the present inventors have studied on the surface condition of carbon black and suitability of the system dispersed, and as a result, they have found that viscosity, dispersion stability and various optical suitabilities are affected by balance of aggregation property and varnish-adsorbing performance of carbon black. More specifically, they have found that the amount of the acid functional groups represented by the amount of known volatile matter will be a significant influence on varnish adsorbing performance, and due to the adsorption, the varnish is always incorporated in carbon black, whereby carbon black can not get close with each other; in addition to this effect, it is important to suppress the aggregation property of carbon black itself; the aggregation property is affected by the attracting force between active points against inorganic matter proportional to the ratio of the amount of iodide adsorbed to the specific surface area of carbon black; and carbon black having a small amount of iodide adsorbed per unit surface area is less likely to aggregate, and tends to have a low viscosity. Further, they have found that when the balance of the ratio of the amount of iodide adsorbed to the specific surface area and the amount of the acid functional groups, satisfies the ratio of the amount of iodide adsorbed (IA) to nitrogen adsorption specific surface area ($N_2SA$) being at most 0.5 mg/m² and the following formula:

$$IA/N_2SA < \text{volatile matter (mg)}/N_2SA + 0.1,$$

simultaneously, the aggregation does not occur in adsorbable varnish type and the suitability will be good.

They have found that a method to conduct a surface oxidation treatment with such a balance to suppress development of roughness due to an oxidizing agent during the oxidation reaction, can be achieved by using a reactor capable of uniformly mixing carbon black and nitric acid gas, adjusting the temperature to be between 50° C. and 200° C., reacting nitric acid gas and carbon black by contacting with each other in a short period of time of from about 10 seconds to about 600 seconds to conduct the oxidation treatment on carbon black, and immediately decreasing the temperature, or by separating carbon black from nitric acid and nitrogen dioxide-containing gas to terminate the oxidation reaction. By using the method, they have conducted oxidation treatment of carbon black like the above-mentioned (5), wherein roughness is suppressed, the particle size distribution and the aggregate size distribution are sharp, and the particle size and the aggregate size are small, and confirmed the suitability of carbon black. As a result, they have found that carbon black has a good dispersibility, good dispersion stability and good fluidity, and displays high blackness.

With regard to the above-mentioned carbon blacks of (5) to (9), by adjusting the particle size, the particle size distribution, the aggregate size, the aggregate distribution, the $N_2SA$/SEM specific surface area ratio, the amount of iodide adsorbed/nitrogen adsorption specific area ($N_2SA$) ratio, the pH and cDBP to be within a specific range, a carbon black composition having excellent balance of optical suitability, dispersibility, dispersion stability and viscosity in various dispersed systems, can be obtained.

Further, the present inventors have analyzed factors which affects blackness, fluidity and dispersion behavior of carbon black having a small particle size of at most 16 nm and having high blackness in matrix, and they have studied to obtain carbon black having higher blackness, better dispersibility and lower viscosity as compared with conventional one. Particularly, they have studied on a method for producing carbon black having the same or higher blackness and dispersibility than channel black and having extremely good fluidity by a furnace method. As a result, it was clarified that with regard to fluidity, the distance between the carbon black aggregates dispersed, i.e. the density in number of carbon black and the strength of aggregation force affecting between the carbon black particles affect significantly on the fluidity; with regard to the former, the existence of fine aggregate raises the density in number of carbon black, and will be a bad influence on fluidity; with regard to the latter, the aggregation force tends to be weak when the density of the oxygen-containing functional groups existing on the carbon black surface is high, and when the density of the points active against the inorganic matter which adsorb iodide is low. Namely, the present inventors have found that carbon black having higher volatile content per surface area of carbon black and lower amount of iodide adsorbed per unit surface are, is less likely to aggregate and tends to have a lower viscosity. More specifically, they have found that by imparting at least 0.35 mg of oxygen-containing volatile matter per $m^2$ of nitrogen adsorption surface area of carbon black, viscosity in the dispersed system can be significantly decreased even with carbon black of small particle size; and carbon black which satisfies the amount of iodide adsorbed (IA)/nitrogen adsorption specific surface area ($N_2SA$) ratio being at most 0.5 mg/$m^2$ and the following formula:

$$IA/N_2SA < 0.01 \times \text{volatile matter (mg)}/N_2SA + 0.1,$$

simultaneously, has an extremely low viscosity when it is dispersed; and the fluidity defects in the dispersed system, which has been considered to be inevitable, in the case of using carbon black having a high DBP oil adsorption and a small particle size, suitable for the balance of blackness and dispensability, significantly improves. Further, with regard to blackness and dispersibility, they have found that fine aggregate will be a bad influence on dispersibility, large aggregate will be a bad influence on blackness, and thus carbon black having uniform aggregate free from fine aggregate or large aggregate is suitable to obtain high blackness and good dispersibility. Namely, they have found that carbon black having a small particle size, a small aggregate size and a sharp aggregate size distribution, particularly carbon black having no large aggregate, has high blackness and good dispersibility. Namely, such a carbon black solves the problem of blackness and dispersibility which are considered in an antinomic relation to each other.

They have found that the method to conduct the surface oxidation treatment with such a balance to suppress roughness development due to an oxidizing agent during the oxidation reaction, can be achieved by using a reactor capable of uniformly mixing carbon black and nitric acid gas, adjusting the temperature to be between 50° C. and 200° C., reacting nitric acid gas and carbon black by contacting with each other in a short period of time of from about 10 seconds to about 600 seconds to conduct the oxidation treatment on carbon black, and immediately decreasing the temperature, or separating carbon black from nitric acid and nitrogen dioxide-containing gas to terminate the oxidation reaction. They have conducted oxidation treatment on carbon black like the above-mentioned (5), wherein roughness is suppressed, the particle size distribution and the aggregate size distribution are sharp, and the particle size and the aggregate size are small, by the method, and confirmed the suitability of carbon black. As a result, carbon black was found to have good dispersibility, good dispersion stability and good fluidity, and to have high blackness.

The following carbon blacks can be obtained in such a manner.

(10) A carbon black having a particle size of at most 16 nm, a $D_{1/2}/D_{mod}$ ratio of at most 0.6 and a volatile content per unit area of at least 0.35 mg/$m^2$.

(11) A carbon black wherein the particle size is at most 16 nm, the $D_{1/2}/D_{mod}$ ratio is at most 0.6, the amount of iodide adsorbed (IA)/nitrogen adsorption specific surface area ($N_2SA$) ratio is at most 0.5 mg/$m^2$, and IA (mg/g)< (volatile content (mg/g)+0.1×$N_2SA$ ($m^2$/g)).

(12) The carbon black according to (10) or (11), which has cDBP of at least 50 cc/100 g.

(13) The carbon black according to any one of (10) to (12), which has $D_{mod}$ of at most 80 nm.

(14) The carbon black according to any one of (10) to (14), which has a $D_{75}/D_{mod}$ ratio of at most 1.6.

(15) The carbon black according to any one of (10) to (13), which has a $D_{75}/D_{mod}$ ratio of at most 1.3.

To produce such carbon blacks of (10) to (15) having high volatile content, it is preferred to employ a production process of two steps with a process wherein the base carbon black which is not adequately oxidation-treated, and with an oxidation process wherein the oxidation treatment is conducted on obtained carbon black while the surface conditions is controlled to impart volatile content.

With regard to production for base carbon black which is the first process, the average particle size is required to be at most 16 nm. Particularly preferably it is from 8 to 13 nm. If the particle size exceeds 16 nm, blackness decreases to a level of color furnace black used widely. Particularly, when the particle size is at most 13 nm, a phenomenon can be observed wherein blackness can not adequately be obtained due to aggregation property of carbon black in almost all the dispersed system. Here, a method to directly weaken the aggregation property of carbon black by the oxidation treatment is effective, which is different from improvement in affinity with the varnish which is conventional techniques. Here, the average particle size indicates the number average size of the first order particle size obtained by an electron microscope method.

Further, the compression DBP oil absorption (cDBP) of carbon black significantly influences on the aggregation property of carbon black. If cDBP is low, the aggregation property of carbon black significantly increases, and it may be difficult to adequately obtain the effect even if the aggregation property improvement is conducted by the surface condition improvement. Accordingly, cDBP of carbon black suitable for obtaining high blackness is preferably at least 50 ml/100 g.

The above-mentioned carbon blacks of (10) to (15) has an aggregate size of $D_{mod}$ being at most 80 nm, more preferably at most 50 nm. As mentioned above, the role of the aggregate size on dispersibility and blackness is becoming clear. Above-mentioned carbon black having a specific particle size, a specific $N_2SA$/SEM specific surface area ratio and specific cDBP, displays suitable properties within a range of $D_{mod}$ being at most 80 nm, more preferably at most 50 nm.

Particularly, by adjusting the ratio of the half width of the stokes diameter at the point of the peak $D_{1/2}$ to the stokes diameter at the point of the peak $D_{mod}$, $D_{1/2}/D_{mod}$, to be at most 0.6, preferably at most 0.55, blackens will be extremely excellent, and dispersibility will improve.

Further, the ratio of volume 75% diameter $D_{75}$ to $D_{mod}$, $D_{75}/D_{mod}$, is preferably at most 1.6, particularly preferably at most 1.3. Carbon black having such a values is one wherein the content of the large aggregate having an aggregate size of exceeding the volume 75% diameter, which will be a bad influence on dispersibility, is kept to be extremely low.

The above-explained novel carbon blacks (1) to (15) can be applied to various carbon black compositions. The carbon blacks may be used to obtain, as a representative example, a composition of a coating material, an ink, a resin or a rubber. For the preparation method, the above-mentioned methods may suitably be employed.

As a method for producing the above-mentioned carbon blacks (1) to (15) which have a small particle size, furnace black or channel black produced by known production apparatus may be used. However, channel black is produced in the high temperature combustion gas containing oxygen from the viewpoint of producing method, and thus it is very hard to suppress roughness. Accordingly, it is more preferred to use one produced by a furnace method as a base. As a method for effectively producing carbon black having high blackness and a small particle size by the furnace method, it is suitable to employ the above-described production method.

As the small particle size carbon black produced by such a method is used as a base, and the volatile content per unit surface area is adjusted to be at least 0.35 mg/m$^2$, the above-mentioned each carbon black can be obtained by continuously conducting the oxidation treatment as explained hereinafter.

In the oxidation treatment to increase the volatile content per unit specific surface area, the volatile content is made large. Further, it is preferred to suppress the increase in specific surface area during oxidation, to adjust the $N_2SA$/SEM specific surface area ratio after conducting the oxidation treatment to be less than 2.8, more preferably at most 2.5. It is preferred to suppress the iodide active points on the carbon black surface having strong aggregation property, in addition to suppressing the increase in the specific surface area. In order to obtain one having preferred balance of volatile content, specific surface area and the amount of iodide adsorbed, it is required to make the time in which the oxidizing agent and carbon black coexist at a temperature of higher than 100° C. to be short, and to adequately conduct the reaction to impart required volatile content, which are in an antinomic relation to each other. In order to achieve this, it is preferred to employ oxidation method of accompanying air current type using nitric acid gas as an oxidizing agent as mentioned hereinafter.

Here, the oxidation method of accompanying air current type is a novel oxidation method which comprises a production process wherein nitric acid gas is used as an oxidizing agent, the high speed air stream is accompanied with carbon black to conduct oxidation under suitable temperature condition, and oxidized carbon black is separated from nitrogen oxide, to obtain carbon black which displays good application suitability having high volatile content imparted in the uniform state. More specifically, into the nitric acid-containing gas having nitric acid gas in an amount of from 1 vol % to 30 vol %, more preferably from 2 vol % to 15 vol % contained, being flowed at a flow rate of at least 3 m/s, more preferably at least 5 m/s, carbon black is dispersed before the autonomic decomposition of nitric acid in the gas into nitrogen dioxide, and carbon black is accompanied and moved into the reaction apparatus in the air current. The weight ratio of nitric acid gas contained in the unit volume gas and carbon black to be dispersed into the gas (nitric acid/carbon black ratio) is an important factor which control the final amount of volatile matter imparted to carbon black. Namely, in the case of imparting a large amount of volatile matter, the amount of volatile matter is adjusted by raising the nitric acid/carbon black ratio. It can be achieved to adjust the concentration of the nitric acid gas to be within the above-mentioned range, by increasing the nitric acid gas concentration in the gaseous phase by means of heating or ultrasonic wave.

Further, as the nitric acid-containing gas to be reacted with carbon black, a gas containing an inert gas such as air or nitrogen, in addition to nitric acid, and steam due to water contained in nitric acid or the air, may be used. It is required to introduced the mixed gas, in the state where the mixed gas is preliminarily pre-heated to the temperature at which components contained such as nitric acid or steam do not aggregate at all, and in the state where the mixed gas is kept warm or heated so that the temperature will not fall during the reaction. However, nitric acid gas will suddenly decompose into nitrogen dioxide, as the temperature rises. Accordingly, the temperature of the mixed gas until it is contacted with carbon black is preferably within a range of from 50° C. to 200° C.

Carbon blacks aggregate with each other when they are recovered by e.g a collecting bag, and they are present in the state where they are weakly aggregated to a size of from about several hundred nm to several mm. For conducting the oxidation reaction, when they are introduced into the air current as aggregated, deposit on the inside of the sedimented apparatus in the accompanying apparatus is brought about, or difference in topical concentration of carbon black between the aggregated part and non-aggregate part is brought about. Accordingly, topical ununiformity of nitric acid/carbon black concentration is brought about, which will be a cause of properties of obtained carbon black being ununiform. With regard to carbon black having weak aggregation property and a low bulk specific gravity, it can be crushed by the energy of air current simply by mixing the carbon black into the high speed air current, and oxidation can be conducted in the state of uniform carbon black concentration. However, with carbon black having strong aggregation property such as carbon black having a high bulk specific gravity, adequate crush may not sometimes conducted with the energy of air stream of from about 3 m/sec to about 5 m/sec. Accordingly, in order to disperse carbon black in the more preferred state, it is preferred to use a gaseous phase dispersion apparatus or a crush apparatus. Among the apparatus having such an aim, as one capable of being installed most compactly in the working apparatus of the present invention, it is extremely effective to use a dispersion apparatus of ejector type wherein the pressure of the high speed accompanying air current is utilized, the speed of the contacting part of carbon black and the air current partially is made further high, the flow rate is accelerated to be at least 20 m/sec, more preferably at least 50 m/sec, and carbon black supplied form the carbon black supplying apparatus is collided with the air current to instantaneously apply to higher crush energy to the air current.

It is preferred to conduct the reaction in the accompanying air current for a period of from 10 seconds to 600 seconds which is necessary for imparting an adequate amount of suitable volatile content due to the oxidation reaction by nitric acid, in the state where the reaction atmosphere is kept to a temperature of at least 50° C. at which the oxidation reaction by nitric acid effectively takes place, and where the reaction atmosphere is kept to a temperature of at most 250° C. at which the heat decomposition of the functional groups formed by the oxidation reaction can be suppressed, while the nitric acid-containing gas and carbon black are strongly mixed by the energy of the high speed air current during the accompanying-moving. In order to obtain carbon black having a high volatile content/$N_2SA$ ratio, which is preferred one of each above-mentioned carbon black, it is more preferred to suppress the temperature at the region of the oxidation reaction to be from 120° C. to 200° C.

As the apparatus to keep carbon black within a predetermined flow rate while the temperature is kept to be within a specific range, e.g. a reaction tube apparatus of double tube type having indirect temperature controlling function can be used.

Here, it is possible to mix the nitric acid gas into the air current during the reaction, in order to supplement nitric acid consumed during the initial oxidation reaction. Then, the oxidized carbon black is separated from the gas after the reaction containing a nitrogen oxide gas such as nitrogen dioxide or nitrogen monoxide which is a by-product of the reaction by nitric acid. As a method for separating the oxidized carbon black from the gas after the reaction, various methods may be applied, such as a classification apparatus to change the performance for transporting fine particles such as a cyclone, or a collecting bag mode by a collecting bag. However, in order to completely separate fine particles from the gas, it is preferred to employ the separation method by a collecting bag filter. The surface of the bag used here is preferably prepared by a furnace cloth constituted by e.g. a glass fiber having acid resistance and nitrogen oxide resistance reinforced, in view of durability.

After the suitable reaction time of from 10 to 600 seconds has passed, carbon black has nitrogen dioxide or unreacted nitric acid which are reactive, adsorbed on the surface. Such substances react with carbon atoms on the carbon black surface while suddenly generating heat as the temperature rises. Accordingly, in the case of recovering the oxidized carbon black by the bag type filter, the collecting part at which carbon black is separated from the gas and accumulated, has a lower efficiency of generating heat as compared with the upstream air current part. Accordingly, if the heat generation due to the reaction takes place, the temperature of carbon black rises, the functional groups attached on the surface will decompose or separate from the surface, the specific surface area will increase due to the activation reaction generated by reaction of nitrogen oxide with carbon black at a high temperature, and at higher temperature, burning will take place and carbon black may disappear. As a result of studies on the cause of such a phenomenon, the causal heat generating reaction takes place at a temperature of carbon black of at least 110° C., and it suddenly proceeds a temperature of at least 120° C. It has been clarified that particularly in the case of conducting the oxidation under conditions where the volatile content is highly imparted to a level of at least 70 wt %, the temperature of carbon black suddenly increase successively when the oxidized carbon black as accumulated reaches 120° C. or above, and one part or whole of carbon black reaches 200° C. or above at which the suitability is inhibited, in a short period of time. In order to avoid such a sudden temperature rising, it is preferred to install a temperature adjusting apparatus of indirect heat exchange type or a temperature adjusting apparatus to directly jet the coolant gas at the collecting back part, and to conduct production under conditions where the temperature is always controlled to be at most 120° C., more preferably at most 100° C., by using a production apparatus capable of adjusting the temperature at the part.

The carbon black obtained in such a state has a large amount of nitrogen oxide adsorbed. Accordingly, an acid carbon black having little harmful nitrogen oxide can be obtained by using a separation apparatus, being capable of controlling the temperature within the temperature range of ±50° C. to the set temperature, and having a structure wherein carbon black while moving in the apparatus is contacted with the gas, by heating the oxidized carbon black in the separation apparatus to a temperature of at least 120° C., more preferably from 150° C. to 200° C., by keeping it from 5 minutes to 600 minutes until the amount of nitrogen oxide contained reaches a level of at most 200 ppm, more preferably at most 100 ppm, to separate the nitrogen oxide adsorbed on the oxidized carbon black surface from the surface.

With regard to carbon black to be used for coloring, if the amount of volatile matter per specific surface area of carbon black is small, dispersion stability in the dispersed system or optical suitability of the coated product may sometimes low.

However, in the case where carbon black is oxidized by a various oxidizing agent, even if the amount of the oxidizing agent is increased, or the reaction temperature is raised to accelerate the reaction, the volatile content/$N_2SA$ ratio increases only to a level of about 0.35 mg/m$^2$. This is attributable to decrease in carbon black reactive to the oxidizing agents, with the process of the oxidation reaction. This tendency can be observed also in the above-mentioned oxidation method. However, it has been found that increase in the specific surface area due to the reaction for activating carbon black by the oxidizing agents is suppressed, and it is possible to increase the amount of the volatile matter per unit area, the volatile content/$N_2SA$ ratio, to be exceeding 0.35 mg/m$^2$, to an extent of 0.50 mg/m$^2$, by adjusting the nitric acid/carbon black ratio and the residue time in the accompanying air current to be suitable, under the condition where the temperature at the region of the oxidation reaction at which carbon black is oxidized in the accompanying air current, is controlled to be from 120° C. to 200° C. And it has been clarified that carbon black obtained by such a method has a significantly good dispersion stability and optical suitability.

Further, with regard to a composition such as a base ink or an ink for offset, having carbon black with a relatively high blend ratio of exceeding 5 wt % dispersed in a viscous varnish, carbon black particles in the ink dispersion having carbon black dispersed in the fluid state, flocculate with each other to generate structural viscosity. In the case of storing the ink e.g. in the ink tank during the ink producing process or storage, if the structural viscosity is high, the viscosity will be significantly high, and discharge or transportation will be difficult, such being problematic. As a result of various studies on the above-mentioned case of reacting nitric acid mixed gas with carbon black, it has been found that carbon black produced under the condition where the temperature at the region of oxidation reaction at which carbon black is oxidized in the accompanying air current, is controlled to be from 50° C. to 150° C., more preferably at most 130° C., has significantly low structural viscosity as compared with carbon black produced at a temperature at the reaction region of higher than 150° C., while other optical suitability and other application suitability are the same.

By employing the above-mentioned production method, carbon black wherein the amount of volatile content per unit surface area is large, the particle size is small, the $N_2SA$/SEM specific surface area ratio is small, the amount of iodide adsorbed/nitrogen absorption specific surface area ($N_2SA$) ratio is small, and cDBP is controlled to be within a specific range, can be produced. With carbon black having such properties, a carbon black composition having higher blackness in a wide range of dispersed system can be obtained. Namely, it is a method mentioned below.

(1) A method for producing an acid carbon black, which comprises contacting and mixing carbon black with nitric acid gas in the state where the carbon black is dispersed in the air current containing nitric acid by the energy of the air current.

(2) A method for producing an acid carbon black, wherein the acid carbon black obtained by the above-mentioned production method (1) is separated from nitrogen oxide-containing gas, and nitrogen oxide adsorbed in carbon black is desorbed from the carbon black at a temperature of from 100° C. to 200° C.

(3) A method for producing an acid carbon black, wherein in the above-mentioned production method (2), a bag type filter is used as a method for separating the oxidized carbon black from the nitrogen oxide.

(4) A method for producing an acid carbon black, wherein in any one of above-mentioned production methods (1) to (3), the temperature of the air current containing nitric acid gas is kept to be from 50° C. to 200° C. until the completion of the carbon black oxidation reaction.

(5) A method for producing an acid carbon black, wherein in any one of the above-mentioned production methods (1) to (3), the temperature of the air current, containing nitric acid, and having carbon black dispersed, is kept to be from 120° C. to 200° C.

(6) A method for producing an acid carbon black, wherein in any one of the above-mentioned production methods (1) to (3), the temperature of the air current, containing nitric acid, and having carbon lack dispersed, is kept to be from 50 C. to 150° C.

(7) A method for producing an acid carbon black, wherein in any one of the above-mentioned production methods (1) to (3), the temperature of the air current containing nitric acid, to which carbon black is dispersed, is controlled to be from 50° C. to 130° C.

(8) A method for producing an acid carbon black, wherein in the above-mentioned production methods (1) to (7), the time for contacting carbon black with a gas stream is adjusted to be from 10 to 600 seconds, preferably from 10 to 120 seconds.

(9) A method for producing an acid carbon black, wherein in the above-mentioned production method (3), the temperature of the bag type filter part is controlled to be at most 120° C.

(10) A method for controlling the quality of a carbon black by changing the ratio of the nitric acid concentration to the carbon black concentration in the air current in each above-mentioned production method (1) to (8).

BRIEF EXPLANATION OF THE DRAWINGS

FIG. 3 is a diagram illustrating one example of mode of the change in turbulent energy.

FIG. 4 is a diagram illustrating the scheme of a combustion burner having a cooling structure used in Examples 49 to 51.

FIG. 8 is a longitudinal schematic diagram of important part illustrating an example of a producing furnace which can be used for producing carbon black of the present invention.

FIG. 9 is an A—A cross-section in FIG. 8.

BEST MODE FOR CARRYING OUT THE INVENTION

Now, the present invention will be described in further detail with reference to Examples.

EXAMPLES 1 TO 4

Figure 1:
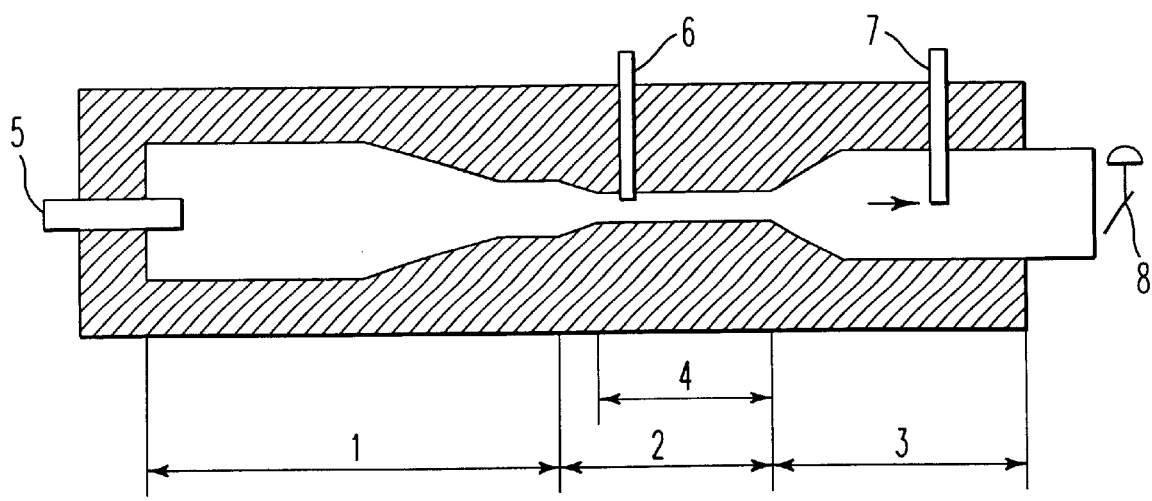
FIG. 1 is a diagram illustrating one example of carbon black producing apparatus in the present invention.
Figure 2:
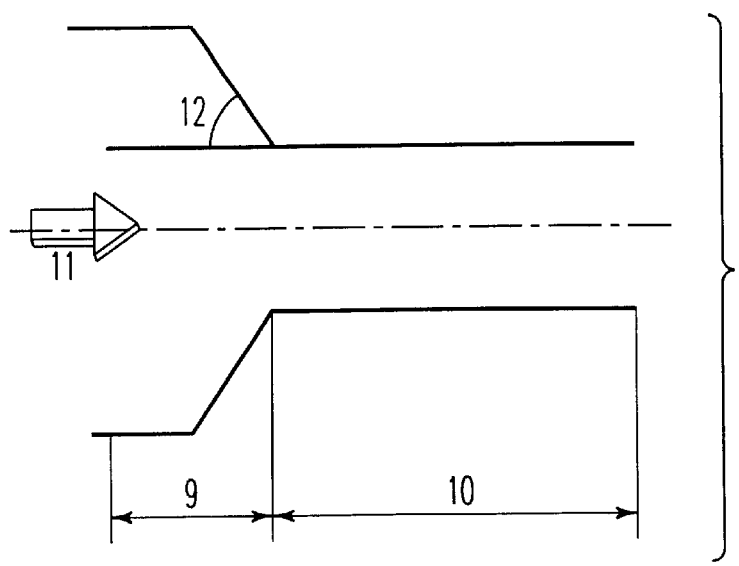
FIG. 2 is a diagram illustrating the choke inlet angle of the carbon black producing apparatus in the present invention.

A carbon black producing furnace as illustrated in FIG. 1, was installed which had a structure in which a first reaction zone having an inner diameter of 500 mm and a length of 1400 mm and provided with a duct for introducing air and a combustion burner, a second reaction zone connected from the first reaction zone and having a choke part having an inner diameter of 60 mm and a length of 800 mm and having a plurality of feed stock nozzles provided along the circumference, a third reaction zone having an inner diameter of 100 mm and a length of 6000 mm and equipped with a quenching apparatus, and a control valve having a inner valve diameter of 80 mm as a throttle mechanism, were sequentially connected.

The part of the feed stock nozzle is 100 mm away from the inlet of the choke part.

By using the above-mentioned furnace, carbon black is produced under conditions as illustrated in Table 1. Creosote oil is used as a fuel and a feed stock. In Examples 3 and 4, oxygen was added to raise the combustion gas temperature.

In Table 1, "combustion gas temperature", "oxygen concentration in the combustion gas" and "pressure in the furnace" are values at the part where the feed stock was introduced. "Potassium concentration" was a value of the concentration of potassium hydroxide added into the feed stock taken as the concentration of potassium.

Various properties of the obtained carbon black are shown in Table 2.

To determine the analytical characteristic of the obtained carbon black, the following testing methods were employed.

Specific Surface Area

The specific surface area ($N_2SA$) was determined in accordance with ASTM D3037-88.

cDBP

The breaking DBP absorption number (cDBP) was determined in accordance with ASTM D-3493-88.

$D_{mod}$, $D_{1/2}$

The stokes diameter at the point of the peak ($D_{mod}$) and the half width of the stokes diameter at the point of the peak ($D_{1/2}$) were determined as follows.

Figure 5:
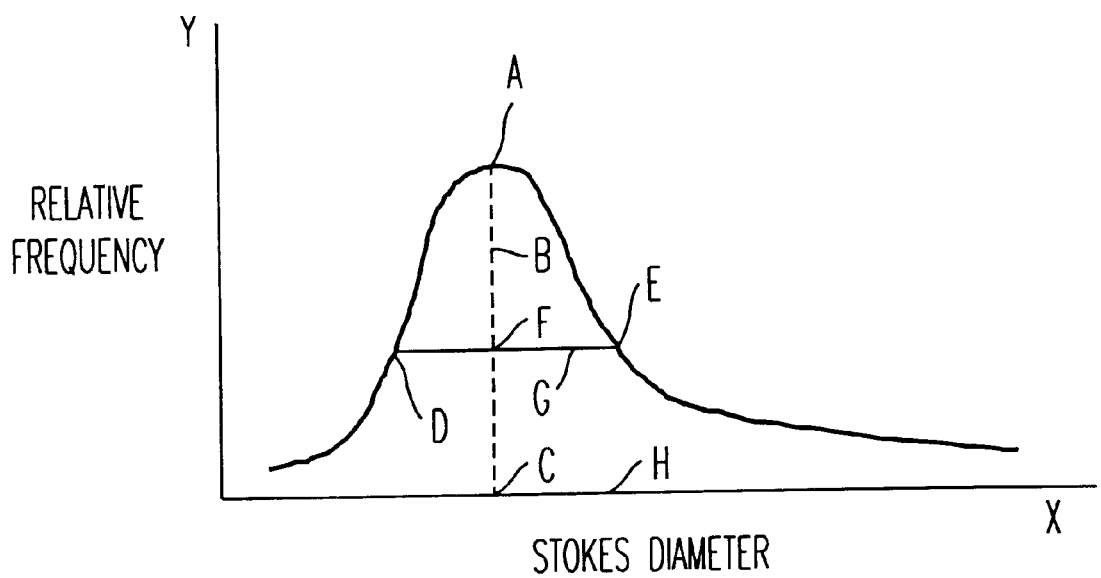
FIG. 5 is a diagram illustrating a method to obtain the stokes diameter at the point of the peak ($D_{mod}$) and the half width of the stokes diameter at the point of the peak ($D_{1/2}$).

The stokes diameter was measured by a particle size distribution measuring apparatus of a disk centrifuge type (DCF Model 3, manufactured by JL Automation Co.) by using a 20% ethanol solution as the spinning solution to prepare a histogram (FIG. 5) of relative frequency in the given sample to the stokes diameter. A line (B) was drawn from the peak (A) of the histogram in parallel with the Y-axis until it reached a point (C) on the X-axis. The stokes diameter at the point (C) is the diameter at the point of the peak $D_{mod}$. The middle point (F) in the obtained line (B) was determined, and a line (G) passing the middle point (F) was drawn in parallel with the X-axis. The line (G) intersected the distribution curve of the histogram at the two points D and E. The half width of the stokes diameter at the point of the peak $D_{1/2}$ is represented by the absolute value of difference in the stokes diameters at the points D and E.

$D_{75}$

The volume 75% diameter ($D_{75}$) was determined as follows.

Figure 6:
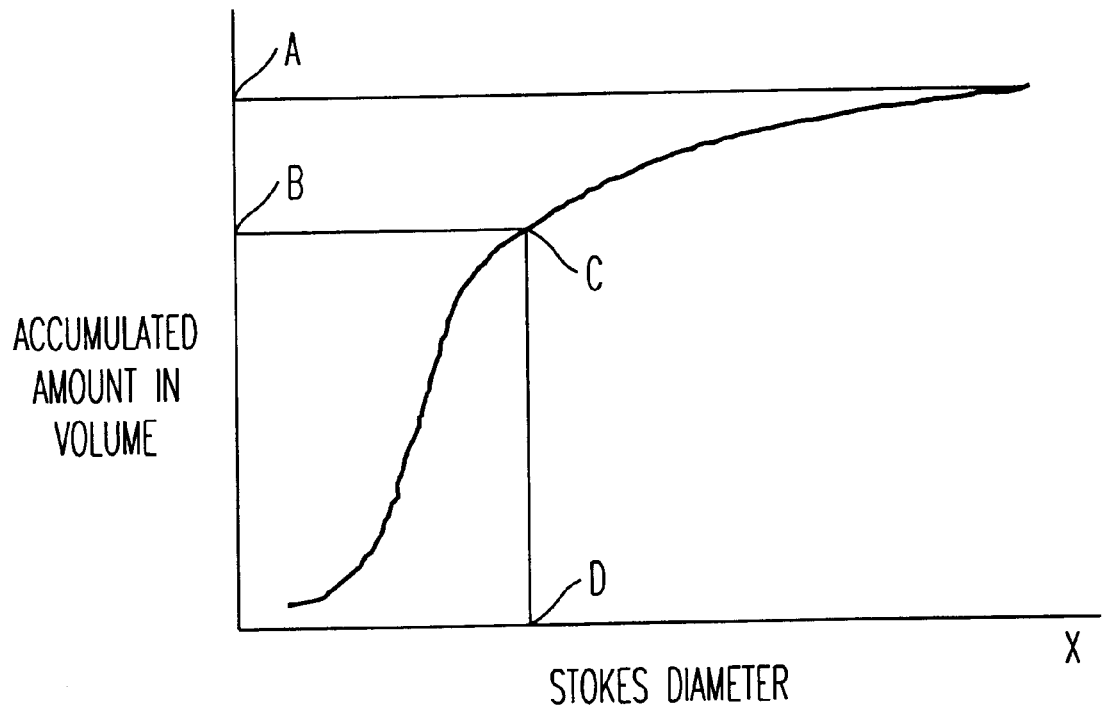
FIG. 6 is a diameter illustrating a method to obtain the volume 75% diameter ($D_{75}$).

In the method to determine the stokes diameter, the volume was obtained from stokes diameter and frequency in the histogram (FIG. 5) of relative frequency of the sample to the stokes diameter, to prepare a graph (FIG. 6) representing the accumulated volume of the sample at a stokes diameter to the stokes diameter. The point (A) in FIG. 6 represents the total volume of the sample. Here, the point (B) at which the accumulated volume was 75% to the total volume was determined, and a line was drawn from the point (B) in parallel with the X-axis until the line intersected the curve. The volume 75% diameter is represented by the value at the point (D) at which a line drawn from the point (C) in parallel with the Y-axis intersected the X axis.

PVC Blackness

For the measurement of PVC blackness, carbon black of the present invention was added to a PVC resin and dispersed by a twin roll mill, followed by seating to obtain an test specimen, whereupon blackness of the test specimen was visually evaluated and represented by a value relative to the standard values of 1 and 10 points which correspond to blackness of carbon black "#40" and "#45", respectively, manufactured by Mitsubishi Chemical Corporation.

Dispersibility Index

The dispersibility index was evaluated by the following method. The dispersed state in a LDPE resin was observed, and the number of non-dispersed agglomerates was counted, whereby the larger the number i.e. the larger the dispersibility index, the poorer the dispersibility.

Test sample carbon black in an amount of 40 wt % was blended to a LDPE resin, followed by kneading at 115° C. for 4 minutes by a 250 cc Banbury mixer.

Blend Conditions

| | |
|---|---|
| LDPE resin | 101.89 g |
| Calcium stearate | 1.39 g |
| Irganox 1010 | 0.87 g |
| Test sample carbon black | 69.43 g |

Then, the mixture was diluted to a carbon black concentration of 1 wt % by a twin roll mill at 120° C.

Diluted Compound Preparation Conditions

| | |
|---|---|
| LDPE resin | 58.3 g |
| Calcium stearate | 0.2 g |
| Carbon black 40%-incorporated resin | 1.5 g |

The diluted compound was sheeted with a slit width of 0.3 mm, and the obtained sheet was cut into chips, which were then formed into a film of 65±3 μm on a hot plate of 240° C. The diameter distribution of non-dispersed agglomerates having diameters of at least 0.2 mm in a field of 3.6 mm×4.7 mm, was measured by an optical microscope with 20 magnifications, and the total area of such agglomerates was calculated. The total area was divided by a standard area which is the area of a non-dispersed agglomerate having a diameter of 0.35 mm, to calculate it as the number of standard agglomerates. Such observation was carried out with respect to at least 16 fields, and the average value was taken as a dispersibility index.

Productivity at the same particle size or the same PVC blackness can be represented by the formula:

(Amount of feed stock supplied)×(yield of material oil)/(amount of air)

The higher the yield of total carbon, the lower the consumption rate of the fuel.

Particle Size

This can be obtained by an electron microscope method. The electron microscope method is a method as described below.

Carbon black was thrown into chloroform, ultrasonic waves of 200 KHz were irradiated thereon for 20 minutes to disperse carbon black in chloroform, and the dispersed sample was fixed on the supporting film. The fixed sample was then photographed by a transmission electron microscope, and the particle size was calculated form the diameter in the photographs and the magnification of the photographs. Such operation was repeated about 1500 times, and the particle size was obtained from the arithmetical mean.

TABLE 1

| | Ex. 1 | Ex. 2 | Ex. 3 | Ex. 4 | Comp. Ex. 1 | Comp. Ex. 2 |
|---|---|---|---|---|---|---|
| Fuel kg/H | 54 | 52 | 54 | 58 | 52 | 54 |
| Amount of air $Nm^3/H$ | 520 | 500 | 470 (13) | 480 (20) | 500 (22) | 529 (19) |
| Combustion gas temperature ° C. | 1821 | 1820 | 1920 | 2090 | 1785 | 1810 |
| Oxygen concentration in combustion gas | 0.06 | 0.04 | 0.39 | 0.58 | 4.44 | 5.52 |

TABLE 1-continued

|  | Ex. 1 | Ex. 2 | Ex. 3 | Ex. 4 | Comp. Ex. 1 | Comp. Ex. 2 |
|---|---|---|---|---|---|---|
| Flow rate of combustion gas at choke part m/s | 390 | 378 | 375 | 408 | 384 | 329 |
| Amount of feed stock Kg/H | 55 | 53 | 59 | 62 | 65 | 59 |
| Pressure in the furnace kg/cm³ | 0.54 | 0.57 | 0.62 | 0.65 | 0.58 | 0.50 |
| Potassium concentration ppm | 0 | 800 | 800 | 800 | 0 | 800 |
| Convection time at choke part msec | 2.05 | 2.11 | 2.14 | 1.96 | 2.08 | 1.28 |

Value in ( ) indicates the amount of added oxygen flowing.

TABLE 2

|  | Ex. 1 | Ex. 2 | Ex. 3 | Ex. 4 | Comp. Ex. 1 | Comp. Ex. 2 |
|---|---|---|---|---|---|---|
| Particle size nm | 15 | 15 | 12 | 11 | 17 | 15 |
| $N_2SA$ m²/g | 262 | 248 | 320 | 360 | 193 | 271 |
| CDBP cc/100 g | 103 | 64 | 67 | 68 | 99 | 65 |
| $D_{mod}$ nm | 43 | 32 | 29 | 25 | 68 | 35 |
| $D_{1/2}$ nm | 24 | 19 | 17 | 15 | 35 | 21 |
| $D_{75}$ nm | 53 | 41 | 37 | 31 | 95 | 85 |
| $D_{75}$ $D_{mod}$ | 1.23 | 1.28 | 1.27 | 1.25 | 1.40 | 2.43 |
| PVC blackness index | 16.3 | 19.3 | 30.0 | 32.0 | 8.0 | 18.0 |
| Dispersibility index | 20 | 120 | 125 | 130 | 40 | 175 |
| Yield Material oil % | 63.6 | 65.4 | 61.3 | 66.2 | 37.2 | 35.6 |
| Total carbon % | 32.1 | 33.0 | 32.0 | 34.2 | 19.0 | 18.6 |
| $D_{1/2}/D_{mod}$ | 0.558 | 0.594 | 0.586 | 0.6 | 0.515 | 0.6 |

Comparative Examples 1 and 2

By using the carbon black producing furnace used in Examples, Comparative Example 1 was conducted under conditions of Table 1. Comparative Example 2 was conducted by using the producing furnace of Examples having the length of the choke part adjusted to be 500 mm.

Physical properties of obtained carbon black are shown in Table 2.

When carbon black of the present invention obtained in Examples and one obtained in Comparative Examples are compared, as shown in Table 2, carbon black having a small particle size could be obtained in Examples as compared with Comparative Examples. Further, when Examples 1 and 2 and Comparative Example 2 are compared, although the particle size is same, both yield of material oil and yield of the total carbon are significantly higher in Examples than in Comparative Examples.

Further, Examples 1 and 2 show small $D_{1/2}/D_{mod}$, sharp distribution of the aggregate size, small $D_{75}$ and a small amount of large aggregate as compared with Comparative Example 2. Further, blackness is high, the dispersibility index is low, thus indicating good dispersibility.

EXAMPLES 5 TO 9 AND Comparative Examples 3 and 4

By using the same furnace in Examples 1 to 4, carbon black described in Table 4 was obtained under conditions of Table 3. In Table 3, "flow rate of combustion gas" is a flow rate in the choke.

As shown in Table 4, in Comparative Example 3, $D_{1/2}/D_{mod}$ is large, blackness was low, the dispersibility index was high, thus indicating bad dispersibility, as compared with Examples 5 to 9. Further, in Comparative Example 4, specific surface area $N_2SA$ was small, the particle size is large, and blackness was low.

Comparative Example 5

Comparative Example 5, wherein although the choke diameter was 50 mm, the flow rate in the choke was 105 m/s, such being slow, was compared with Comparative Example 4, wherein although the flow rate in the choke was 250 m/s, the choke diameter was 180 mm, such being large.

As shown in Table 2, in Comparative Example 5, $D_{1/2}/D_{mod}$ was large, the dispersibility index was high, thus indicating bad dispersibility, as compared with Examples 10 to 14. Further, in Comparative Example 4, the specific surface area $N_2SA$ was small, the particle size was large, and blackness was low.

TABLE 3

|  | Fuel kg/h | Amount of air Nm³/h | Combustion gas temp. °C | Oxygen concentration in combustion gas dry vol % | Flow rate of combustion gas m/s | Amount of feed stock supplied kg/h |
|---|---|---|---|---|---|---|
| Ex. 5 | 61 | 586 | 1622 | 0.6 | 336 | 82 |
| Ex. 6 | 58 | 531 | 1777 | 0.1 | 435 | 77 |
| Ex. 7 | 61 | 573 | 1780 | 0.2 | 358 | 82 |
| Ex. 8 | 56 | 535 | 1756 | 0.5 | 391 | 99 |
| Ex. 9 | 56 | 535 | 1748 | 0.5 | 391 | 97 |
| Comp. Ex. 3 | 10.1 | 98 | 1642 | 0.2 | 80 | 14 |
| Comp. Ex. 4 | 310 | 3000 | 1777 | 0.1 | 250 | 435 |
| Comp. Ex. 5 | 16 | 150 | 1622 | 0.6 | 105 | 21 |

|  | Pressure in the furnace kg/cm²G | Potassium concentration ppm | Choke diameter mm | Turbulent mixing speed 1/s |
|---|---|---|---|---|
| Ex. 5 | 1.0 | 0 | 50 | 502 |
| Ex. 6 | 0.5 | 0 | 50 | 646 |
| Ex. 7 | 1.0 | 0 | 50 | 535 |
| Ex. 8 | 0.7 | 98 | 50 | 535 |
| Ex. 9 | 0.7 | 495 | 50 | 585 |
| Comp. Ex. 3 | 0.4 | 0 | 50 | 117 |
| Comp. Ex. 4 | 0.3 | 0 | 180 | 117 |
| Comp. Ex. 5 | 0.5 | 0 | 50 |  |

Turbulent mixing speed here indicates the maximum value at the central axis in the choke.

Two dimensional axis object model was employed for numerical calculation.

TABLE 4

|  | $N_2SA$ m²/g | CrDBP ml/100 g | $D_{mod}$ nm | $D_{1/2}$ nm | $D_{1/2}/D_{mod}$ | PVC blackness | Dispersibility index |
|---|---|---|---|---|---|---|---|
| Ex. 5 | 120 | 90 | 70 | 33 | 0.47 | 4.7 | 11 |
| Ex. 6 | 128 | 93 | 68 | 34 | 0.5 | 5.7 | 13 |
| Ex. 7 | 132 | 94 | 66 | 35 | 0.53 | 4.7 | 15 |
| Ex. 8 | 112 | 77 | 68 | 35 | 0.52 | 5.7 | 28 |

TABLE 4-continued

| | $N_2SA$ $m^2/g$ | CrDBP ml/ 100 g | $D_{mod}$ nm | $D_{1/2}$ nm | $D_{1/2}/D_{mod}$ | PVC blackness | Dispersibility index |
|---|---|---|---|---|---|---|---|
| Ex. 9 | 121 | 59 | 60 | 30 | 0.5 | 8.0 | 78 |
| Comp. Ex. 3 | 101 | 88 | 87 | 63 | 0.72 | 1.0 | 18 |
| Comp. Ex. 4 | 110 | 91 | 80 | 44 | 0.55 | 2.0 | 20 |
| Comp. Ex. 5 | 122 | 88 | 73 | 58 | 0.79 | 3.3 | 85 |

Comparative Examples

Carbon black was produced in the same manner as in Example 5, except that the turbulent mixing speed was 117/s, the choke diameter was 50 mm, and the flow rate in the choke was 80 m/s in Comparative Example 3, or the turbulent mixing speed was 117/s, the flow rate in the choke was 250 m/s, and the choke diameter was 180 mm in Comparative Example 4. Physical properties of the obtained carbon black are shown in Table 4.

EXAMPLES 10 TO 13

A carbon black producing apparatus was installed which had a structure in which a first reaction zone having an inner diameter of 500 mm and a length of 1400 mm and provided with a duct for introducing air and a combustion burner, a second reaction zone connected from the first reaction zone and comprising a choke part having an inner diameter of 60 mm and a length of 800 mm and having a plurality of feed stock nozzles provided along the circumference, a third reaction zone having an inner diameter of 100 mm and a length of 6000 mm and equipped with a quenching apparatus, and a control valve having a inner valve diameter of 80 mm as a throttle mechanism, were sequentially connected.

EXAMPLE 14

A carbon black producing apparatus, wherein in Examples 10 to 13, the choke part was made to a taper type having an inlet part inner diameter of 50 mm and outlet part inner diameter of 100 mm, was installed.

By using each producing apparatus of above-mentioned Examples 10 to 14, using creosote oil as a fuel and a feed stock, carbon black was produced under conditions shown in Table 5. Various properties of obtained carbon black are shown in Table 6.

To determine analytical characteristic of carbon black produced by the present invention, the above-described testing methods were employed.

Comparative Examples 6 to 9

By using a producing furnace wherein of the carbon black producing furnace used in Examples, the length of the choke part was changed to 500 mm, carbon black of Comparative Example 6 or 7 was produced under conditions shown in Table 5. The physical properties are shown in Table 6. Further, as Comparative Example 8 and Comparative Example 9, properties of commercially available carbon black "#990" and "#960", respectively, manufactured by Mitsubishi Chemical Corporation, are shown.

When carbon blacks of the present invention are compared with one of Comparative Examples, as shown in Table 6, the time from material oil jetting to significant turbulence (turbulence of the gas stream in such an extent that the turbulence can not substantially ignored as shown in FIG. 3) was shorter than 1.5 ms in Comparative Examples 6 and 7. Accordingly, the formation of the aggregate of large particle size could not be suppressed. Therefore, carbon blacks obtained in Examples had small $D_{1/2}/D_{mod}$ and a sharp distribution of the aggregate size as compared with one of Comparative Examples. Further, $D_{75}$ was small, and the amount of carbon black of large aggregate size was small. Further, blackness was high, dispersibility index was low, thus indicating good dispersibility.

TABLE 5

| | Fuel kg/h | Amount of air $Nm^3/h$ | Combustion gas temp. °C. | Oxygen concentration in combustion gas dry vol % | Flow rate of combustion gas in the choke m/s | Amount of feed stock supplied kg/h |
|---|---|---|---|---|---|---|
| Ex. 10 | 53 | 530 | 1622 | 0.65 | 356 | 100 |
| Ex. 11 | 52 | 500 | 1785 | 0.04 | 368 | 65 |
| Ex. 12 | 54 | 530 | 1748 | 0.46 | 383 | 80 |
| Ex. 13 | 54 | 520 | 1821 | 0.06 | 390 | 55 |
| Ex. 14 | 78 (*1) | 750 | 1840 | 0.04 | 374 | 80 |
| Comp. Ex. 6 | 52 | 520 | 1625 | 0.65 | 353 | 85 |
| Comp. Ex. 7 | 52 | 500 | 1770 | 0.04 | 369 | 70 |

| | Pressure in the furnace $kg/cm^2G$ | Potassium concentration ppm | Time from choke inlet to material oil jetting ms | Time from material oil jetting to significant turbulence ms | Choke diameter mm |
|---|---|---|---|---|---|
| Ex. 10 | 0.60 | 0 | 0.28 | 1.97 | 60 |
| Ex. 11 | 0.58 | 0 | 0.27 | 1.9 | 60 |
| Ex. 12 | 0.58 | 495 | 0.26 | 1.83 | 60 |
| Ex. 13 | 0.54 | 0 | 0.26 | 1.80 | 60 |
| Ex. 14 | 0.62 | 800 | 0.15 | 2.19 | Inlet 50 Outlet 100 |
| Comp. Ex. 6 | 0.45 | 80 | 0.28 | 1.13 | 60 |
| Comp. Ex. 7 | 0.42 | 0 | 0.27 | 1.08 | 60 |

(*1) Average flow rate in the choke.

TABLE 6

| | Particle size nm | $N_2SA$ $m^2/g$ | CrDBP cc/100 g | $D_{mod}$ nm | $D_{1/2}$ nm | $D_{75}$ nm | $D_{1/2}/D_{mod}$ |
|---|---|---|---|---|---|---|---|
| Ex. 10 | 24 | 120 | 90 | 70 | 33 | 86 | 0.471 |
| Ex. 11 | 17 | 193 | 99 | 68 | 35 | 82 | 0.515 |
| Ex. 12 | 20 | 163 | 74 | 40 | 23 | 49 | 0.575 |
| Ex. 13 | 15 | 262 | 103 | 43 | 24 | 53 | 0.558 |
| Ex. 14 | 15 | 260 | 70 | 33 | 20 | 43 | 0.606 |
| Comp. Ex. 6 | 23 | 130 | 96 | 68 | 42 | 124 | 0.618 |
| Comp. Ex. 7 | 19 | 175 | 85 | 57 | 35 | 93 | 0.614 |
| Comp. Ex. 8 | 15 | 240 | 82 | 44 | 37 | 67 | 0.841 |
| Comp. Ex. 9 | 15 | 240 | 60 | 44 | 37 | 75 | 0.841 |

TABLE 6-continued

|  | $D_{75}/D_{mod}$ | PVC blackness index | Dispersibility index |
|---|---|---|---|
| Ex. 10 | 1.23 | 5.3 | 10 |
| Ex. 11 | 1.20 | 8.0 | 15 |
| Ex. 12 | 1.23 | 12.3 | 40 |
| Ex. 13 | 1.23 | 16.3 | 20 |
| Ex. 14 | 1.30 | 18 | 80 |
| Comp. Ex. 6 | 1.82 | 6.3 | 20 |
| Comp. Ex. 7 | 1.63 | 8.0 | 30 |
| Comp. Ex. 8 | 1.52 | 16.7 | 40 |
| Comp. Ex. 9 | 1.70 | 18.3 | 180 |

EXAMPLES 15 TO 18

A carbon black producing furnace, of which the scheme is shown in FIG. 1, was installed which had a structure in which a first reaction zone provided with a duct for introducing air and a combustion burner, a second reaction zone connected from the first reaction zone and comprising a choke part having a inner diameter of 60 mm and a length of 1000 mm and having a plurality of feed stock nozzles provided along the circumference, and a third reaction zone having an inner diameter of 100 mm and a length of 6000 mm and equipped with a quenching apparatus, were sequentially connected.

The part of the material nozzle was 100 mm away from the inlet of the choke part.

By using the above-mentioned furnace, carbon black having properties shown in Table 7 was produced by adjusting the combustion gas temperature at the part of introducing the feed stock, the oxygen concentration in the combustion gas and the amount of feed stock supplied. Creosote oil was used as the fuel and the feed stock. Oxygen was added to the air introduced from the duct for introducing air in the first reaction zone, to keep high temperature atmosphere of at least 1900° C. at the part of introducing the feed stock.

In the Table, the SEM specific surface area and the heat resistant aging time were obtained from the following methods.

SEM Specific Surface Area

The SEM specific surface area was calculated from the following formula:

$$SEM = 6000/(\rho \cdot dA)$$

ρ: Specific gravity of carbon black (1.86 g/cm³)
dA: Volume area particle size (nm)

Heat Resistant Aging Time

The heat resistant aging time was evaluated by the following method.

Carbon black was mixed in a dispersing agent (magnesium stearate) is a blend ratio of 40%, followed by crushing and mixing for 10 minutes is a household mixer to prepare a dry color. The dry color was blended to a polypropylene compound with a blend ratio of 1.25% (0.5% as carbon black), followed by kneading at 140° C. for 20 minutes by a Banbury mixer. Then, the mixture was seated by a twin roll mill at 170° C., which was then press-formed into a thick plate of 2 mm at a mold temperature of 220° C. under molding pressure of 100 kgf/cm². Five seats of test piece thus prepared were subjected to heat resistant aging test in a gear type oven of 150° C. for a period of 285 hours. The time when whitening on the surface was visually observed, was taken as a heat resistant aging time.

Comparative Examples 10 to 13

By using the carbon black producing furnace used in Examples, carbon black having physical properties of Comparative Example 10 shown in Table 7 was obtained, by adjusting the combustion gas temperature at the part of introducing a feed stock, the part for terminating the reaction, the amount of potassium added and the flow rate of the gas in the choke. In Comparative Examples 11 to 13, physical properties of commercially available carbon black are shown.

When each Example and Comparative Example 11 are compared, PVC blackness is significantly high in Examples as compared with Comparative Example 10. This is considered to be attributable to the particle size being out of the range defined in the first invention of the present specification, in Comparative Example 1.

When each Example and Comparative Example 11 are compared, the heat resistant aging time is significantly short in Comparative Example 11 as compared with Examples. This is considered to be attributable to the pH being out of the range defined in the first invention of the present specification.

When each Example and Comparative Example 3 and 4 are compared, dispersibility index is large and thus dispersibility is bad in Comparative Examples 12 and 13. This is considered to be attributable to $D_{1/2}/D_{mod}$ in Comparative Examples 12 and 13, being 0.71 and 0.68, respectively, each exceeding the range defined in the first invention of the present specification.

TABLE 7

|  | Particle size nm | $N_2SA$ m²/g | $D_{1/2}$ nm | $D_{mod}$ nm | $D_{1/2}/D_{mod}$ | $D_{75}$ nm | $D_{75}/D_{mod}$ |
|---|---|---|---|---|---|---|---|
| Ex. 15 | 12 | 320 | 17 | 29 | 0.586 | 37 | 1.27 |
| Ex. 16 | 11 | 360 | 15 | 25 | 0.6 | 31 | 1.24 |
| Ex. 17 | 10.1 | 520 | 15 | 32 | 0.47 | 39 | 1.22 |
| Ex. 18 | 8.3 | 694 | 11 | 26 | 0.423 | 41 | 1.58 |
| Comp. Ex. 10 | 17 | 193 | 35 | 68 | 0.515 | 82 | 1.21 |
| Comp. Ex. 11 | 13 | 550 | 25 | 45 | 0.556 | 64 | 1.42 |
| Comp. Ex. 12 | 15 | 300 | 22 | 31 | 0.71 | 165 | 5.32 |
| Comp. Ex. 13 | 13 | 350 | 21 | 31 | 0.677 | 211 | 6.81 |

|  | CDBP cc/100 g | pH | PVC blackness | Dispersibility index | Heat resistant aging time hr |
|---|---|---|---|---|---|
| Ex. 15 | 67 | 6.5 | 30 | 125 | 280 or longer |
| Ex. 16 | 68 | 6.8 | 32 | 130 | 280 or longer |
| Ex. 17 | 110 | 5.9 | 28 | 55 | 280 or longer |
| Ex. 18 | 110 | 6.2 | 33 | 85 | 280 or longer |
| Comp. Ex. 10 | 99 | 6.6 | 8 | 15 | 280 or longer |
| Comp. Ex. 11 | 97 | 2.0 | 27 | 55 | 144 |
| Comp. | 44 | 6.5 | 29 | 720 | |

TABLE 7-continued

| | | | | |
|---|---|---|---|---|
| Ex. 12 | | | | |
| Comp. Ex. 13 | 49 | 6.0 | 29 | 430 |

EXAMPLES 19 TO 22

By using the furnace used in Examples 15 to 18, carbon black having physical properties shown in Table 8 was produced, by adjusting the combustion gas temperature at the part of introducing a feed stock, the oxygen concentration in the combustion gas and the amount of the feed stock supplied. Creosote oil was used as the fuel and the feed stock. Oxygen was added into the air introduced from the duct for introducing air in the first reaction zone, to keep high temperature atmosphere of at least 1900° C. at the part of introducing the feed stock.

In the Table, to measure T %, the following method was employed.

T %

Toluene coloring power (T %) was determined in accordance with ASTM D-1618-83.

Comparative Example 14 to 16

By using the carbon black producing furnace used in Examples, adjusting the combustion gas temperature at the part of introducing a feed stock, the part for terminating the reaction, the amount of potassium added and the flow rate of the gas in the choke, carbon black having physical properties of Comparative Example 14 or 15 as shown in Table 8 was obtained. In Comparative Example 16, physical properties of commercially available carbon black are shown.

When each Example and Comparative Example 14 are compared, PVC blackness is significantly high in Examples as compared with Comparative Example 14. This is considered to be attributable to the particle size being out of the range defined in the second invention of the present specification, in Comparative Example 14.

Further, when each Example and Comparative Example 15 are compared, the T % value tends to be high in Examples. This indicates that the ratio of unreacted polycyclic aromatic hydrocarbon in carbon black is low, and safety of carbon black is high. In Comparative Example 15, the value of the $N_2SA/SEM$ ratio is considered to be out of the range defined in the second invention of the present specification. Relation between the $N_2SA/SEM$ ratio and the ratio of unreacted polycyclic aromatic hydrocarbon is thus indicated.

When each Example and Comparative Example 16 are compared, the heat resistant aging time is significantly short in Comparative Example 16 as compared with Examples. This is considered to be attributable to the pH being out of the range defined in the second invention of the present specification.

TABLE 8

| | Particle size nm | $N_2SA$ $m^2/g$ | SEM $m^2/g$ | $N_2SA$ /SEM | $D_{1/2}$ nm | $D_{mod}$ nm | $D_{1/2}/D_{mod}$ | $D_{75}$ nm |
|---|---|---|---|---|---|---|---|---|
| Ex. 19 | 12 | 320 | 218 | 1.47 | 17 | 29 | 0.586 | 37 |
| Ex. 20 | 11 | 360 | 240 | 1.50 | 15 | 25 | 0.6 | 31 |
| Ex. 21 | 10.1 | 520 | 278 | 1.87 | 15 | 32 | 0.47 | 39 |
| Ex. 22 | 8.3 | 694 | 313 | 2.2 | 11 | 26 | 0.423 | 41 |
| Comp. Ex. 14 | 17 | 193 | 170 | 1.13 | 35 | 68 | 0.515 | 82 |
| Comp. Ex. 15 | 11 | 301 | 235 | 1.28 | 17 | 26 | 0.654 | 63 |
| Comp. Ex. 16 | 13 | 550 | 262 | 2.1 | 25 | 45 | 0.556 | 64 |

| | $D_{75}/D_{mod}$ | cDBP cc/100 g | pH | T % | PVC blackness | Dispersibility index | Heat resistant aging time hr |
|---|---|---|---|---|---|---|---|
| Ex. 19 | 1.27 | 67 | 6.5 | 99 | 30 | 125 | 280 or longer |
| Ex. 20 | 1.24 | 68 | 6.8 | 99 | 32 | 130 | 280 or longer |
| Ex. 21 | 1.22 | 110 | 5.9 | 98 | 28 | 55 | 280 or longer |
| Ex. 22 | 1.58 | 110 | 6.2 | 99 | 33 | 85 | 280 or longer |
| Comp. Ex. 14 | 1.21 | 99 | 6.6 | 97 | 8 | 15 | 280 or longer |
| Comp. Ex. 15 | 2.42 | 70 | 7.1 | 65 | 30 | 260 | 280 or longer |
| Comp. Ex. 16 | 1.42 | 97 | 2.0 | 99 | 27 | 55 | 144 |

EXAMPLES 23 TO 26

By using the furnace used in Examples 15 to 18, adjusting the combustion gas temperature at the part of introducing a feed stock, the oxygen concentration in the combustion gas and the amount of feed stock supplied, carbon black having physical properties shown in Table 9 was produced. Creosote oil was used as the fuel and the feed stock. Oxygen was added into the air introduced from the duct for introducing air in the first reaction zone, to keep high temperature atmosphere of at least 1900° C. at the part of introducing the feed stock.

Comparative Examples 17 to 21

By using the carbon black producing furnace used in Examples, adjusting the combustion gas temperature at the part of introducing a feed stock, the part for terminating the reaction, the amount of potassium added and the flow rate of the gas in the choke, carbon black having physical properties of Comparative Example 17 or 18 shown in Table 9 was obtained. In Comparative Examples 19 to 21, properties of commercially available carbon black were shown.

When each Example and Comparative Example 17 are compared, PVC blackness is significantly high in Examples as compared with Comparative Example 17. This is considered to be attributable to the particle size in Comparative Example 17 being out of the range defined in the third invention of the present specification.

Further, when each Example and Comparative Example 18 are compared, values of T % are higher in Examples. This indicates that the ratio of unreacted polycyclic aromatic hydrocarbon in carbon black is low, and safety of carbon black is high. This is considered to be attributable to the value of the $N_2SA/SEM$ ratio in Comparative Example 18 being out of the range defined in the third invention of the present specification, and indicates relation between the $N_2SA/SEM$ ratio and the proportion of unreacted polycyclic aromatic hydrocarbon.

When each Example and Comparative Example 19 are compared, the heat resistant aging time is significantly short in Comparative Example 19 as compared with Examples.

This is considered to be attributable to the pH being out of the range defined in the third invention of the present specification.

When each Example and Comparative Examples 20 and 21 are compared, the dispersion indices are large, thus indicating bad dispersibility, in Comparative Example 20 and 21 as compared with Examples. This is considered to be attributable to cDBP being out of the preferred range stipulated in the third invention of the present specification.

TABLE 9

| | Particle size nm | $N_2SA$ $m^2/g$ | SEM $m^2/g$ | $N_2SA$ /SEM | $D_{1/2}$ nm | $D_{mod}$ nm | $D_{1/2}/D_{mod}$ | $D_{75}$ nm |
|---|---|---|---|---|---|---|---|---|
| Ex. 23 | 12 | 320 | 218 | 1.47 | 17 | 29 | 0.586 | 37 |
| Ex. 24 | 11 | 360 | 240 | 1.50 | 15 | 25 | 0.6 | 31 |
| Ex. 25 | 10.1 | 520 | 278 | 1.87 | 15 | 32 | 0.47 | 39 |
| Ex. 26 | 8.3 | 694 | 313 | 2.2 | 11 | 26 | 0.423 | 41 |
| Comp. Ex. 17 | 17 | 193 | 170 | 1.13 | 35 | 68 | 0.515 | 82 |
| Comp. Ex. 18 | 11 | 301 | 235 | 1.28 | 17 | 26 | 0.654 | 63 |
| Comp. Ex. 19 | 13 | 550 | 262 | 2.1 | 25 | 45 | 0.556 | 64 |
| Comp. Ex. 20 | 15 | 300 | 182 | 1.65 | 22 | 31 | 0.71 | 165 |
| Comp. Ex. 21 | 13 | 350 | 214 | 1.64 | 21 | 31 | 0.677 | 211 |

| | $D_{75}/D_{mod}$ | cDBP cc/100 g | pH | T % | PVC blackness | Dispersibility index | Heat resistant aging time hr |
|---|---|---|---|---|---|---|---|
| Ex. 23 | 1.27 | 67 | 6.5 | 99 | 30 | 125 | 280 or longer |
| Ex. 24 | 1.24 | 68 | 6.8 | 99 | 32 | 130 | 280 or longer |
| Ex. 25 | 1.22 | 110 | 5.9 | 98 | 28 | 55 | 280 or longer |
| Ex. 26 | 1.58 | 110 | 6.2 | 99 | 33 | 85 | 280 or longer |
| Comp. Ex. 17 | 1.21 | 99 | 6.6 | 97 | 8 | 15 | 280 or longer |
| Comp. Ex. 18 | 2.42 | 70 | 7.1 | 65 | 30 | 260 | 280 or longer |
| Comp. Ex. 19 | 1.42 | 97 | 2.0 | 99 | 27 | 55 | 144 |
| Comp. Ex. 20 | 5.32 | 44 | 6.5 | 98 | 29 | 720 | |
| Comp. Ex. 21 | 6.81 | 49 | 6.0 | 99 | 29 | 430 | |

EXAMPLES 27 TO 32

By using above-mentioned furnace, adjusting the combustion gas temperature at the part of introducing a feed stock, the oxygen concentration in the combustion gas and the amount of feed stock supplied, carbon black having physical properties shown in Table 10 was produced. Creosote oil was used as the fuel and the feed stock. Oxygen was added into the air introduced from the duct for introducing air in the first reaction zone, to keep high temperature atmosphere of at least 1900° C. at the part of introducing the feed stock.

Comparative Examples 22 to 25

By using the carbon black producing furnace used in Examples 27 to 32, adjusting the combustion gas temperature at the part of introducing a feed stock, the part for terminating the reaction, the amount of potassium added and the flow rate of the gas in the choke, carbon black having physical properties of Comparative Example 22 shown in Table 10 was obtained. In Comparative Examples 23 to 25, physical properties of commercially available carbon black were shown.

When each Example and Comparative Example 1 are compared, PVC blackness is high in Examples as compared with Comparative Example 22. This is considered to be attributable to the $N_2SA$ in Comparative Example 1 being out of the range defined in the fourth invention of the present specification.

When each Example and Comparative Example 23 are compared, the heat resistant aging time is significantly short in Comparative Example 2 as compared with Examples. This is considered to be attributable to the pH being out of the range defined in the fourth invention of the present specification.

When each Example and Comparative Examples 24 and 25 are compared, the dispensability indices are large, thus indicating bad dispersibility, in Comparative Examples as compared with Examples. This is considered to be attributable to $D_{1/2}/D_{mod}$ being out of the range defined in the fourth invention of the present specification

TABLE 10

| | Particle size nm | $N_2SA$ $m^2/g$ | $D_{1/2}$ nm | $D_{mod}$ nm | $D_{1/2}/D_{mod}$ | $D_{75}$ nm | $D_{75}/$ nm |
|---|---|---|---|---|---|---|---|
| Ex. 27 | 16 | 241 | 24 | 45 | 0.533 | 54 | 1.2 |
| Ex. 28 | 14 | 293 | 26 | 49 | 0.531 | 59 | 1.2 |
| Ex. 29 | 12 | 320 | 17 | 29 | 0.586 | 37 | 1.28 |
| Ex. 30 | 11 | 360 | 15 | 25 | 0.6 | 31 | 1.24 |
| Ex. 31 | 10.1 | 520 | 15 | 32 | 0.47 | 39 | 1.22 |
| Ex. 32 | 8.3 | 694 | 11 | 26 | 0.423 | 41 | 1.58 |
| Comp. Ex. 22 | 17 | 193 | 35 | 68 | 0.515 | 82 | 1.21 |
| Comp. Ex. 23 | 13 | 550 | 25 | 45 | 0.556 | 64 | 1.42 |
| Comp. Ex. 24 | 15 | 300 | 22 | 31 | 0.71 | 165 | 5.32 |
| Comp. Ex. 25 | 13 | 350 | 21 | 31 | 0.677 | 211 | 6.81 |

| | DBP cc/100 g | pH | PVC blackness | Dispersibility index | Heat resistant aging time hr |
|---|---|---|---|---|---|
| Ex. 27 | 109 | 7.7 | 20 | 100 | 280 or longer |
| Ex. 28 | 132 | 5.8 | 13 | 10 | 280 or longer |
| Ex. 29 | 87 | 6.5 | 30 | 125 | 280 or longer |
| Ex. 30 | 96 | 6.8 | 32 | 130 | 280 or longer |
| Ex. 31 | 215 | 5.9 | 28 | 55 | 280 or longer |
| Ex. 32 | 157 | 6.2 | 33 | 85 | 280 or longer |
| Comp. Ex. 22 | 122 | 6.6 | 8 | 15 | 280 or longer |
| Comp. Ex. 23 | 150 | 2.0 | 27 | 55 | 144 |
| Comp. Ex. 24 | 54 | 6.5 | 29 | 720 | — |
| Comp. Ex. 25 | 65 | 6.0 | 29 | 430 | — |

EXAMPLES 33 AND 34

By using the furnace used in Examples 15 to 18, adjusting the combustion gas temperature at the part of introducing a feed stock, the oxygen concentration in the combustion gas and the amount of feed stock supplied, carbon black having physical properties shown in Table 11 was produced. Creosote oil was used as the fuel and the feed stock. Oxygen was added into the air introduced from the duct for introducing air in the first reaction zone, to keep high temperature atmosphere of at least 1900° C. at the part of introducing the feed stock.

Comparative Examples 26 to 29

By using the carbon black producing furnace used in Examples 33 and 34, adjusting the combustion gas temperature at the part of introducing a feed stock, the part for terminating the reaction, the amount of potassium added and the flow rate of the gas in the choke, carbon black having physical properties of Comparative Example 26 shown in Table 11 was obtained. In Comparative Examples 27 to 29, physical properties of commercially available carbon black were shown.

When each Example and Comparative Examples are compared, the dispersibility indices are large, thus indicating significantly bad dispersibility, in Comparative Examples as compared with Examples. This is considered to be attributable to the DBP/$D_{mod}$ ratio being out of the range defined in the fifth invention of the present specification.

TABLE 11

| | Particle size nm | $N_2SA$ m²/g | $D_{1/2}$ nm | $D_{mod}$ nm | $D_{1/2}/D_{mod}$ | $D_{75}$ nm | $D_{75}/$ nm |
|---|---|---|---|---|---|---|---|
| Ex. 33 | 19.1 | 520 | 15 | 32 | 0.47 | 39 | 1.22 |
| Ex. 34 | 8.3 | 694 | 11 | 26 | 0.423 | 41 | 1.58 |
| Comp. Ex. 26 | 16 | 241 | 24 | 45 | 0.533 | 54 | 1.2 |
| Comp. Ex. 27 | 12 | 320 | 17 | 29 | 0.586 | 37 | 1.28 |
| Comp. Ex. 28 | 15 | 300 | 22 | 31 | 0.71 | 165 | 5.32 |
| Comp. Ex. 29 | 13 | 350 | 21 | 31 | 0.677 | 211 | 6.81 |

| | DBP cc/100 g | DPB/$D_{mod}$ | pH | PVC blackness | Dispersibility index | Heat resistant aging time hr |
|---|---|---|---|---|---|---|
| Ex. 33 | 215 | 6.72 | 5.9 | 28 | 55 | 280 or longer |
| Ex. 34 | 157 | 6.04 | 6.2 | 33 | 85 | 280 or longer |
| Comp. Ex. 26 | 109 | 2.42 | 7.7 | 20 | 100 | 280 or longer |
| Comp. Ex. 27 | 87 | 3.0 | 6.5 | 30 | 125 | 280 or longer |
| Comp. Ex. 28 | 54 | 1.74 | 6.5 | 29 | 720 | — |
| Comp. Ex. 29 | 65 | 2.1 | 6.0 | 29 | 430 | — |

EXAMPLES 35 TO 39

Figure 7:
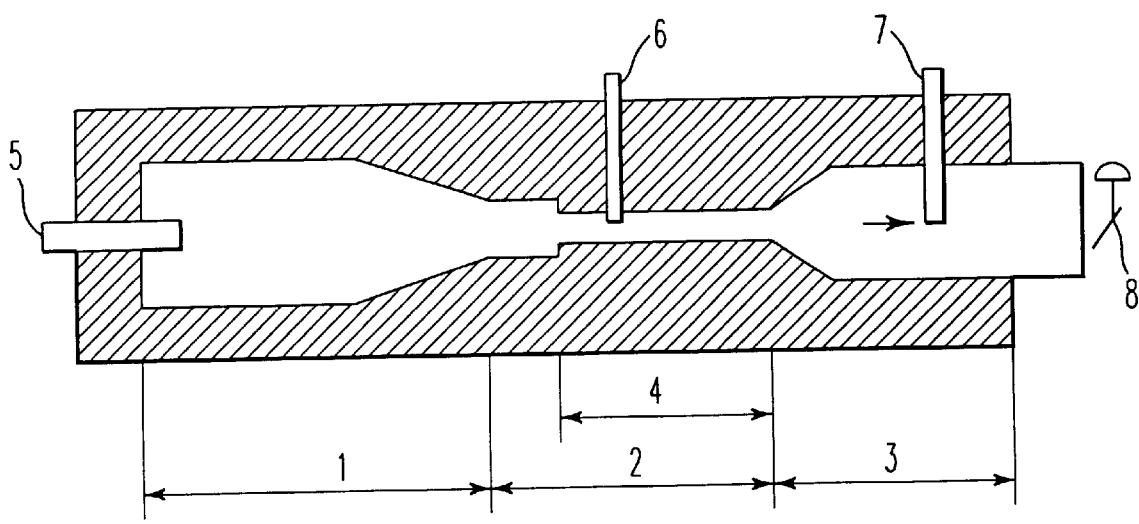
FIG. 7 is a longitudinal schematic diagram of important part illustrating one example of the carbon black producing apparatus of the present invention.

A carbon black producing furnace as illustrated in FIG. 7, was installed which had a structure in which a first reaction zone having an inner diameter of 500 mm and a length of 1400 mm and provided with a duct for introducing air and a combustion burner, a second reaction zone connected from the first reaction zone and comprising a choke part having an inner diameter of 60 mm and a length of 800 mm and having a plurality of feed stock nozzles provided along the circumference, a third reaction zone having an inner diameter of 100 mm and a length of 6000 mm and equipped with a quenching apparatus, and a control valve having an inner valve diameter of 80 mm as a throttle mechanism, were sequentially connected. The inlet angle of the choke part was 90°.

By using the above-mentioned furnace, carbon black was produced under condition as illustrated in Table 12. Creosote oil was used as the fuel and the feed stock.

In Table 12, "combustion gas temperature", "oxygen concentration in the combustion gas" and "pressure in the furnace" are values at the part where the feed stock was introduced. "Potassium concentration" was a value of the concentration of potassium hydroxide added into the feed stock taken as the concentration of potassium.

Various physical properties of obtained carbon black are shown in Table 13.

Comparative Examples 30 to 32

In Comparative Example 30, carbon black was produced under conditions shown in Table 12, by changing the flow rate at the choke part to be 207 m/s, such being less than 250 m/s, under carbon black production conditions shown in Examples. The physical properties of obtained carbon black are shown in Table 13. Further, in Comparative Example 31 and Comparative Example 32, physical properties of commercially available carbon black #990 and #960, respectively, manufactured by Mitsubishi Chemical Corporation, are shown.

When obtained carbon black of the present invention is compared with Comparative Examples, as shown in Table 13, $D_{1/2}/D_{mod}$ is small, and the distribution of the aggregate size is sharp in Examples as compared with Comparative Examples. Further, blackness is high, dispersibility index is low, thus indicating good dispersibility.

EXAMPLE 40 AND Comparative Example 33

The conditions and results of the simulation of carbon black by a computer are shown in Table 12 and Table 13 as Example 40 and Comparative Example 33.

In Comparative Example 33 shown in Table 13, the particle size is large as compared with Example 40. This is considered to be attributable to the choke inlet angle being out of the range of from 45 to 100°.

TABLE 12

| | Fuel kg/h | Amount of air Nm³/h | Combustion gas temp. °C | Oxygen concentration in combustion gas dry vol % | Flow rate of combustion gas at choke part m/s | Amount of feed stock supplied kg/h |
|---|---|---|---|---|---|---|
| Ex. 35 | 53 | 530 | 1622 | 0.65 | 356 | 100 |
| Ex. 36 | 52 | 500 | 1785 | 0.04 | 368 | 65 |
| Ex. 37 | 54 | 530 | 1748 | 0.46 | 383 | 80 |
| Ex. 38 | 54 | 520 | 1821 | 0.06 | 390 | 55 |
| Ex. 39 | 52 | 500 | 1820 | 0.04 | 378 | 53 |
| Comp. Ex. 30 | 30 | 300 | 1620 | 0.65 | 207 | 45 |
| Ex. 40 | 83 | 807 | 2000 | 0 | 459 | 110.9 |
| Comp. Ex. 33 | 83 | 807 | 2000 | 0 | 459 | 110.9 |

| | Pressure in the furnace kgf/cm²G | Potassium concentration ppm | Choke inlet angle ° |
|---|---|---|---|

TABLE 12-continued

| | | | |
|---|---|---|---|
| Ex. 35 | 0.60 | 0 | 90 |
| Ex. 36 | 0.58 | 0 | 90 |
| Ex. 37 | 0.58 | 495 | 90 |
| Ex. 38 | 0.54 | 0 | 90 |
| Ex. 39 | 0.57 | 800 | 90 |
| Comp. Ex. 30 | 0.2 | 500 | 90 |
| Ex. 40 | 0.5 | 0 | 90 |
| Comp. Ex. 33 | 0.5 | 0 | 15 |

TABLE 13

| | Particle size nm | $N_2SA$ $m^2/g$ | CrDBP cc/ 100 g | $D_{mod}$ nm | $D_{1/2}$ nm | $D_{1/2}/D_{mod}$ | PVA blackness | Dispersibility index |
|---|---|---|---|---|---|---|---|---|
| Ex. 35 | 24 | 120 | 90 | 70 | 33 | 0.471 | 5.3 | 10 |
| Ex. 36 | 17 | 193 | 99 | 68 | 35 | 0.515 | 8.D | 15 |
| Ex. 37 | 20 | 163 | 74 | 40 | 23 | 0.575 | 12.3 | 40 |
| Ex. 38 | 15 | 262 | 103 | 43 | 24 | 0.558 | 16.3 | 20 |
| Ex. 39 | 15 | 248 | 64 | 32 | 19 | 0.594 | 19.3 | 120 |
| Comp. Ex. 30 | 22 | 156 | 75 | 54 | 60 | 1.11 | 6.7 | 60 |
| Comp. Ex. 31 | 15 | 240 | 82 | 44 | 37 | 0.841 | 16.7 | 40 |
| Comp. Ex. 32 | 15 | 240 | 60 | 44 | 37 | 0.841 | 18.3 | 180 |
| Ex. 40 | 45 | — | — | — | — | — | — | — |
| Comp. Ex. 33 | 27 | — | — | — | — | — | — | — |

EXAMPLES 41 AND 42

A carbon black producing furnace, of which the scheme is shown in FIG. 7, was installed which had a structure in which a first reaction zone having an inner diameter of 500 mm and a length of 1400 mm and provided with a duct for introducing air and a combustion burner, a second reaction zone connected from the first reaction zone and comprising a choke part having an inner diameter of 50 mm and a length of 800 mm and having a plurality of feed stock nozzles provided along the circumference, and a third reaction zone having an inner diameter of 200 mm and a length of 6000 mm and equipped with a quenching apparatus, were sequentially connected. The part of introducing a feed stock was 100 mm away from the choke part inlet. As the material for the choke part, a double tube structure cooling cell made by phosphorus deoxidized copper was used.

The equivalent sand roughness of the material was 0.045 mm.

By using the above-mentioned producing apparatus, carbon black was produced under condition shown in Table 14. Propane gas was used as a fuel, creosote oil (described as "material oil" in Table 14) was used as a feed stock. In Table 14, "temperature in the furnace", "oxygen concentration in combustion gas" and "flow rate of combustion gas" are represented by the values at the part where the feed stock was introduced. "Oxygen concentration in combustion gas" was the oxygen concentration in the air introduced from the duct for introducing air. "Potassium concentration" was the concentration of potassium hydroxide added into the feed stock taken as the concentration of potassium.

Various properties obtained carbon black are shown in Table 15.

Comparative Example 34

The same producing apparatus used in Examples 41 and 42 were installed, except that the inner diameter of the choke part was 60 mm, and the choke part, made of high purity alumina brick, having no double structure, was used. The equivalent sand roughness of alumina brick is about 3 mm.

Comparative Example 35

The same producing apparatus as in Examples 41 and 42 were installed, except that the length of the choke part was 250 mm, and as the material for the choke part, the stainless double tube structure cooling cell was used (the equivalent sand roughness $\epsilon$ of the inner surface of the stainless double tube was 0.045 mm).

When obtained carbon black of the present invention is compared with Comparative Examples, as evident from Table 15, carbon black obtained in Examples has small $D_{1/2}/D_{mod}$ and a sharp distribution of the aggregate size, as compared with carbon black of Comparative Examples. Further, $D_{75}$ is small, and the amount of carbon black of large aggregate size is small. Further, blackness is high, dispersibility index is low, thus indicating good dispersibility.

TABLE 14

| | Ex. 41 | Ex. 42 | Comp. Ex. 34 | Comp. Ex. 35 |
|---|---|---|---|---|
| Amount of fuel supplied $Nm^3/H$ | 21.9 | 25.6 | 21.8 | 21.9 |
| Amount of combustion air $Nm^3/H$ | 450 | 450 | 520 | 450 |
| Oxygen concentration in combustion air % | 24.9 | 24.9 | 21.0 | 24.9 |
| Oxygen concentration in combustion gas % | 0.5 | 0.5 | 0.06 | 0.5 |
| Flow rate of combustion gas m/s | 452 | 483 | 390 | 452 |
| Amount of feed stock supplied Kg/H | 36.5 | 75.2 | 55 | 36.5 |
| Temperature in the furnace ° C. | 1857 | 1958 | 1821 | 1860 |
| Potassium concentration ppm | 0 | 765 | 0 | 0 |
| Residue time at choke part ms | 2.21 | 2.07 | 2.05 | 0.69 |

TABLE 15

| | Ex. 41 | Ex. 42 | Comp. Ex. 34 | Comp. Ex. 35 |
|---|---|---|---|---|
| Particle size nm | 15 | 15 | 15 | 15 |
| $N_2SA$ $m^2/g$ | 325 | 229 | 262 | 334 |
| CrDBP cc/100 g | 103 | 63 | 103 | 101 |
| $D_{mod}$ nm | 42 | 41 | 43 | 52 |
| $D_{1/2}$ nm | 20 | 19 | 24 | 45 |

TABLE 15-continued

|  | Ex. 41 | Ex. 42 | Comp. Ex. 34 | Comp. Ex. 35 |
|---|---|---|---|---|
| $D_{75}$ nm | 48 | 52 | 53 | 101 |
| $D_{75}/D_{mod}$ index | 1.14 | 1.27 | 1.23 | 1.94 |
| PVC blackness index | 21.0 | 25.0 | 16.3 | 19.3 |
| Dispersibility index | 10 | 40 | 20 | 50 |

EXAMPLES 43 TO 47

A carbon black producing furnace, of which the scheme is shown in FIG. 7, was installed which had a structure in which a first reaction zone having an inner diameter of 500 mm and a length of 1400 mm and provided with a duct for introducing air and a combustion burner, a second reaction zone connected from the first reaction zone and comprising a choke part having a inner diameter of 60 mm and a length of 800 mm and having a plurality of feed stock nozzles provided along the circumference, a third reaction zone having an inner diameter of 100 mm and a length of 6000 mm and equipped with a quenching apparatus, and a control valve having an inner valve diameter of 80 mm as a throttle mechanism, were sequentially connected.

By using above-mentioned producing apparatus, carbon black was produced under conditions shown in Table 16. Creosote oil was used as a fuel and a feed stock.

In Table 16, "combustion gas temperature", "oxygen concentration in combustion gas" and "pressure in the furnace" are represented by the values at the part where the feed stock was introduced. "Potassium concentration" is the concentration of potassium hydroxide added into the feed stock taken as the concentration of potassium.

Various physical properties of obtained carbon black are shown in Table 17.

Comparative Example 36 to 39

By using a producing furnace wherein in the carbon black producing furnace used in Examples, the length of the choke part was changed to 500 mm, carbon black of Comparative Example 36 or 37 was produced under conditions shown in Table 16. The physical properties are shown in Table 17. In Comparative Example 38 and Comparative Example 39, physical properties of commercially available carbon black #990 and #960, respectively, manufactured by Mitsubishi Chemical Corporation, were shown.

When obtained carbon black of the present invention and one of Comparative Examples are compared, as shown in Table 2, $D_{1/2}/D_{mod}$ is small, and the distribution of the aggregate size is sharp in Examples, as compared with Comparative Examples. Further, $D_{75}$ is small, and the amount of one of large aggregate size is small. Further, blackness is high, dispersibility index is low, thus indicating good dispersibility.

EXAMPLE 48 AND Comparative Example 40

Conditions and results of the simulation of carbon black by a computer, as mentioned above, are shown in Example 48 and Comparative Example 40 in Table 16 and Table 17.

In Comparative Example 40 shown in Table 17, the particle size is large as compared with Example 48. This is considered to be attributable to the choke inlet angle being out of the range of from 45 to 100°.

TABLE 16

|  | Fuel kg/h | Amount of air Nm³/h | Combustion gas temp. °C | Oxygen concentration in combustion gas dry vol % | Flow rate of combustion gas at choke part m/s | Amount of feed stock supplied kg/h |
|---|---|---|---|---|---|---|
| Ex. 43 | 53 | 530 | 1622 | 0.65 | 356 | 100 |
| Ex. 44 | 52 | 500 | 1785 | 0.04 | 368 | 65 |
| Ex. 45 | 54 | 530 | 1748 | 0.46 | 383 | 80 |
| Ex. 46 | 54 | 520 | 1821 | 0.06 | 390 | 55 |
| Ex. 47 | 52 | 500 | 1820 | 0.04 | 378 | 53 |
| Comp. Ex. 36 | 52 | 520 | 1625 | 0.65 | 353 | 85 |
| Comp. Ex. 37 | 52 | 500 | 1770 | 0.04 | 369 | 70 |
| Ex. 48 | 83 | 807 | 2000 | 0 | 459 | 110.9 |
| Comp. Ex. 40 | 83 | 807 | 2000 | 0 | 459 | 110.9 |

|  | Pressure in the furnace kgf/cm²G | Potassium concentration ppm | Convection time at choke part ms | Choke length mm | Choke inlet angle ° |
|---|---|---|---|---|---|
| Ex. 43 | 0.60 | 0 | 2.25 | 800 | 90 |
| Ex. 44 | 0.58 | 0 | 2.17 | 800 | 90 |
| Ex. 45 | 0.58 | 495 | 2.09 | 800 | 90 |
| Ex. 46 | 0.54 | 0 | 2.05 | 800 | 90 |
| Ex. 47 | 0.57 | 800 | 2.11 | 800 | 90 |
| Comp. Ex. 36 | 0.45 | 80 | 1.42 | 500 | 90 |
| Comp. Ex. 37 | 0.42 | 0 | 1.35 | 500 | 90 |
| Ex. 48 | 0.5 | 0 | 2.4 | 1000 | 90 |
| Comp. Ex. 40 | 0.5 | 0 | 2.4 | 1000 | 15 |

TABLE 17

|  | Particle size nm | NSA m²/g | CrDBP cc/100 g | $D_{mod}$ nm | $D_{1/2}$ nm | $D_{1/2}/D_{mod}$ | $D_{75}$ nm |
|---|---|---|---|---|---|---|---|
| Ex. 43 | 24 | 120 | 90 | 70 | 33 | 0.471 | 86 |
| Ex. 44 | 17 | 193 | 99 | 68 | 35 | 0.515 | 82 |
| Ex. 45 | 20 | 163 | 74 | 40 | 23 | 0.575 | 49 |
| Ex. 46 | 15 | 262 | 103 | 43 | 24 | 0.558 | 53 |
| Ex. 47 | 15 | 248 | 64 | 32 | 19 | 0.594 | 41 |
| Comp. Ex. 36 | 23 | 130 | 96 | 68 | 42 | 0.618 | 124 |
| Comp. Ex. 37 | 19 | 175 | 85 | 57 | 35 | 0.614 | 93 |
| Comp. Ex. 38 | 15 | 240 | 82 | 44 | 37 | 0.841 | 67 |
| Comp. Ex. 39 | 15 | 240 | 60 | 44 | 37 | 0.841 | 75 |
| Ex. 48 | 45 | — | — | — | — | — | — |
| Comp. Ex. 40 | 27 | — | — | — | — | — | — |

|  | $D_{75}/D_{mod}$ | PVC blackness index | Dispersibility index |
|---|---|---|---|
| Ex. 43 | 1.23 | 5.3 | 10 |
| Ex. 44 | 1.20 | 8.0 | 15 |
| Ex. 45 | 1.23 | 12.3 | 40 |
| Ex. 46 | 1.23 | 16.3 | 20 |
| Ex. 47 | 1.28 | 19.3 | 120 |
| Comp. | 1.82 | 6.3 | 20 |

TABLE 17-continued

| | | | |
|---|---|---|---|
| Ex. 36 Comp. Ex. 37 | 1.63 | 8.0 | 30 |
| Comp. Ex. 38 | 1.52 | 16.7 | 40 |
| Comp. Ex. 39 | 1.70 | 18.3 | 180 |
| Ex. 48 | — | — | — |
| Comp. Ex. 40 | — | — | — |

EXAMPLES 49 TO 51

By using the furnace used in Examples 1 to 4, carbon black was produced under conditions shown in Table 18. As a burner, one shown in FIG. 4 was used. Creosote oil was used as a fuel and a feed stock. In Examples 50 and 51, oxygen was added to air to raise the combustion temperature. Various properties of obtained carbon black are shown in Table 19.

TABLE 18

| | Ex. 49 | Ex. 50 | Comp. Ex. 51 |
|---|---|---|---|
| Fuel kg/h | 54 | 52 | 58 |
| Amount of air Nm³/h | 520 | 470 (13) | 480 (20) |
| Combustion gas temperature ° C. | 1821 | 1920 | 2090 |
| Oxygen concentration in combustion gas % | 0.06 | 0.39 | 0.58 |
| Amount of cooling water m³/h | 3 | 5 | 5 |
| Temperature at defuser part ° C. | 286 | 298 | 305 |
| Appearance of burner | No damage, good | No damage, good | No damage, good |

Value in ( ) indicates amount of oxygen flowing.

TABLE 19

| | Ex. 49 | Ex. 50 | Ex. 51 |
|---|---|---|---|
| Particle size nm | 15 | 12 | 11 |
| $N_2SA$ m²/g | 262 | 320 | 360 |
| cDBP cc/100 g | 103 | 67 | 68 |
| $D_{mod}$ nm | 43 | 29 | 25 |
| $D_{½}$ nm | 24 | 17 | 15 |
| $D_{75}$ nm | 53 | 37 | 31 |
| PVC blackness index | 16.3 | 30.0 | 32.0 |
| Dispersibility index | 20 | 125 | 130 |

As shown above, it became possible to obtain a high temperature combustion gas without melt-damaging the point of the combustion burner, and it became possible to obtain a high temperature combustion gas with minimum amount of heat emitted from the combustion burner. Further, the diffuser part can be easily exchanged during temperature rising, and the exchange completes in a short period of time. Accordingly, heat shock due to by suddenly cooling brick at the combustion part are less likely to result, and damage in brick can be prevented.

EXAMPLES 52 TO 54

A carbon black producing furnace, of which the scheme is shown in FIG. 8, was installed which had a structure in which a first reaction zone having an inner diameter of 500 mm and a length of 1400 mm and provided with a duct for introducing air and a combustion burner, a second reaction zone connected from the first reaction zone and comprising a choke part having an inner diameter of 60 mm and a length of 800 mm and having two nozzle for introducing feed stock, with a jacket type cooling structure having an outer diameter of 60 mm, provided along the circumference, a third reaction zone having an inner diameter of 100 mm and a length of 6000 mm and equipped with a quenching apparatus, and a control valve having a inner valve diameter of 80 mm as a throttle mechanism, were sequentially connected.

By using above-mentioned producing apparatus, carbon black was produced under conditions shown in Table 20. Creosote oil was used as a fuel and a feed stock.

In Table 20, "combustion gas temperature", "oxygen concentration in combustion gas" and "pressure in the furnace" are represented by values at the part where the feed stock was introduced.

"Flow rate of gas at second reaction zone" indicates the flow rate of gas, obtained by dividing the amount of combustion gas flowing by the cross-sectional area of the furnace including the feed stock nozzle.

"Feed stock nozzle inserting amount" indicates the distance from the top of the feed stock nozzle to the wall.

"Reduction rate of the cross-sectional area in the furnace" is a value, obtained by dividing the cross-sectional area inside the furnace covered with the feed stock nozzle, by the cross-sectional area of the furnace including the nozzle for introducing feed stock.

"Flow rate at nozzle part" indicates the flow rate of gas, obtained by dividing the amount of combustion gas flowing, by the cross-sectional area obtained by subtracting the area covered with the nozzle for introducing feed stock from the cross-sectional area of the second reaction zone at the part of inserting the nozzle for introducing feed stock.

Various properties of obtained carbon black are shown in Table 21.

EXAMPLE 55

Figure 10:
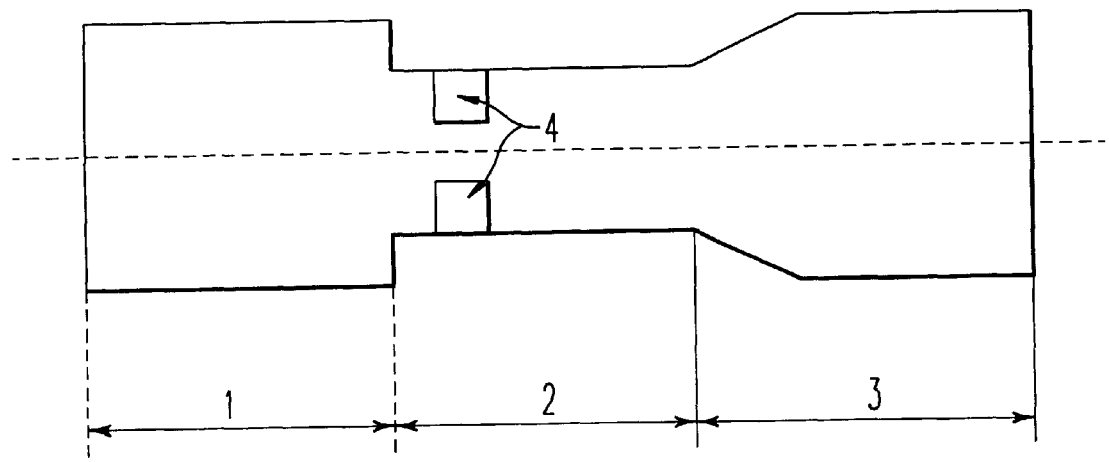
FIG. 10 is a diagram illustrating the calculation model of Example 55.

A model of a carbon black producing furnace as shown in FIG. 10, was produced in a computer, which had a first reaction zone having an inner diameter of 100 mm and a length of 500 mm, a second reaction zone connected from the first reaction zone, having an inner diameter of 60 mm and a length of 800 mm, and provided with a protruding portion having an ejected length of 20 mm and a length of 50 mm, supposed as a nozzle for introducing material oil, and a third reaction zone having an inner diameter of 100 mm and a length of 700 mm.

A combustion gas having physical properties of a density of 0.184 kg/m³ and a viscosity of 6.52 E-5 kg/ms was flowed in the model at an inlet flow rate of 35.2 m/s, and pressure drop was calculated. For the turbulent model, a standard k-ϵ model was employed.

Comparative Example 41

Figure 11:
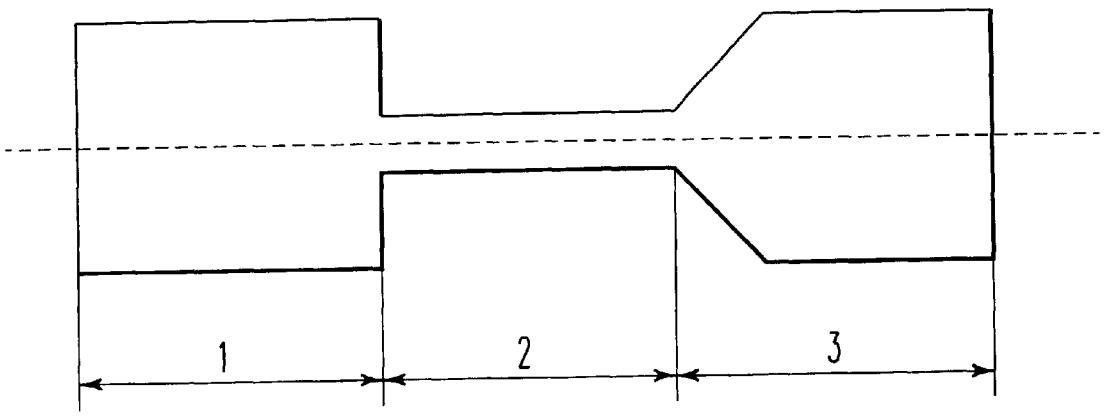
FIG. 11 is a diagram illustrating the calculation model of Comparative Example 41.

A model of a carbon black producing furnace as shown in FIG. 11, was produced in a computer, which had a first reaction zone having an inner diameter of 100 mm and a length of 500 mm, a second reaction zone connected from the first reaction zone, and provided with a choke part having an inner diameter of 20 mm and a length of 800 mm, and a third reaction zone having an inner diameter of 100 mm and a length of 700 mm. The pressure drop when a combustion gas flowed at an inlet flow rate of 35.2 m/s was calculated. Physical properties of the gas and turbulent model are as defined in Example 55.

Conditions for the calculation and the obtained pressure drop are shown in Table 20. The pressure drop indicates difference between the maximum and the minimum of the static pressure in the furnace.

When Example 55 and Comparative Example 41 are compared, the pressure drop in the furnace is smaller in Example 55 than Comparative Example 41. Accordingly, the flow rate of the combustion gas at the part of introducing the feed stock can be made high to a level of close to Mach 1, with less pressure drop in Example 55.

TABLE 20

| | Ex. 52 | Ex. 53 | Ex. 54 | Ex. 55 | Comp. Ex. 41 |
|---|---|---|---|---|---|
| Fuel kg/h | 53 | 52 | 52 | — | — |
| Amount of air Nm³/h | 530 | 500 | 500 | — | — |
| Combustion gas temperature ° C. | 1622 | 1785 | 1820 | 1800 | 1800 |
| Oxygen concentration in combustion gas vol % | 0.65 | 0.04 | 0.04 | — | — |
| Inner diameter at second reaction zone mm | 60 | 60 | 60 | 60 | 20 |
| Flow rate of gas at second reaction zone m/s | 356 | 368 | 378 | 97.7 | 880 |
| Feed stock introducing nozzle inserting amount mm | 20 | 20 | 20 | 20 | 0 |
| Reduction rate of cross-sectional area in the furnace % | 58.7 | 58.7 | 58.7 | 88.9 | 0 |
| Flow rate at nozzle part m/s | 862 | 891 | 915 | 880 | 880 |
| Flow rate at nozzle part Mach | 0.99 | 0.98 | 0.99 | 0.96 | 0.96 |
| Amount of material oil introduced kg/H | 100 | 65 | 53 | — | — |
| Pressure in the furnace kgf/cm²G | 0.60 | 0.58 | 0.57 | 0.5 | 0.5 |

TABLE 20-continued

| | Ex. 52 | Ex. 53 | Ex. 54 | Ex. 55 | Comp. Ex. 41 |
|---|---|---|---|---|---|
| Pressure drop in the furnace kgf/cm² | — | — | — | 1.3 | 1.8 |

TABLE 21

| | Ex. 52 | Ex. 53 | Ex. 54 |
|---|---|---|---|
| Particle size nm | 24 | 17 | 15 |
| $N_2SA$ m²/g | 120 | 193 | 248 |
| cDBP cc/100 g | 90 | 99 | 64 |
| $D_{mod}$ nm | 70 | 68 | 32 |
| $D_{½}$ nm | 33 | 35 | 19 |
| $D_{½}/D_{mod}$ | 0.471 | 0.515 | 0.281 |
| PVC blackness index | 5.3 | 8.0 | 19.3 |
| Dispersibility index | 10 | 15 | 120 | chemical composition % of the refractory material indicates wt % in the follwing explanations.

EXAMPLE 56

(1) Shape of the Furnace

A furnace type carbon black producing furnace was installed which had a structure in which a first reaction zone having an inner diameter of 500 mm and a length of 1400 mm, in which a high temperature combustion gas stream of 2200° C. was formed by a burner for mixing and combusting oxygen enriched air and a fuel gas LPG, a second reaction zone connected from the first reaction zone, comprising a throttle part, having an inner diameter of 50 mm and a length of 300 mm, and having two nozzles to introduce creosote oil as a material oil into the obtained high temperature combustion gas stream provided along the circumference, a third reaction zone located at the down stream to the second reaction zone, having an inner diameter of 100 mm and a length of 6000 mm to terminate the reaction by jetting a cooling water, were sequentially connected.

(2) Refractory Material Constituting the Furnace

In above-mentioned furnace, the refractory material at the whole region of the first reaction zone and the second reaction zone to the part of introducing material oil, was a four layer structure having, from the inside, stamp-applied layer of magnesia stamp material (chemical composition: MgO 99%), re-bonded magnesite-chrome brick (chemical composition: MgO 66%, $Cr_2O_3$ 20%, $Fe_2O_3$ 7%), high alumina brick and a refractory board. The refractory material in the second reaction zone after the part of introducing material oil was a four layer structure having, from the inside, high alumina refractory material ($Al_2O_3$ 99%, $SiO_2$ 0.2%, $Fe_2O_3$ 0.2%), alumina type castable and a refractory board. The third reaction zone had a double layer structure having, from the inside, above-mentioned high alumina brick and alumina type castable (3) Shape and Properties of the Stamp Before and After Operation After the furnace was continuously operated for 2 months at a temperature of the furnace inner surface of 1800° C., the furnace was cooled and the inside of the furnace was checked. Although some cracks were observed on the stamp material, damages such as separation were not confirmed.

A change in thickness of the layer of the stamp material before and after the operation of 2 months was measured, and a reduction of only about 2 mm was found after the operation of 2 months at a temperature of the furnace inner surface of 1800° C.

Changes in the composition of the surface of the stamp material before and after the operation are shown in Table 22. The composition did not significantly change before and after the operation, thus indicating a composition having improved refractoriness.

Further, as there was no change in porosity, it is considered that refractoriness did not decrease. Therefore, it has been found that the carbon black producing furnace having stamp-applied by the stamp material can adequately used practically even under operation at very high temperature.

TABLE 22

|  | Before | After (2 months) | Remarks |
|---|---|---|---|
| MgO | 99.4 | 99.8 | |
| $Fe_2O_3$ | 0.1 | 0.1 | |
| $Al_2O_3$ | 0.1 | <0.01 | |
| $SiO_2$ | 0.1 | <0.01 | Decrease: Increase in refractoriness |
| $TiO_2$ | 0.1 | 0.06 | |
| $Cr_2O_3$ | <0.01 | <0.01 | |
| CaO | <0.01 | <0.01 | |
| Total | 100.0% | 100.0% | |
| Porosity | 30.0% | 29.8% | |

EXAMPLE 57

(1) Shape of the Furnace

A furnace type carbon black producing furnace was installed which had a structure in which a first reaction zone having an inner diameter of 500 mm and a length of 1400 mm, in which a high temperature combustion gas stream of 1750° C. was formed by a burner for mixing and combusting oxygen enriched air and a fuel gas LPG, a second reaction zone connected from the first reaction zone, comprising a throttle part, having an inner diameter of 50 mm and a length of 300 mm, and having two nozzles to introduce creosote oil as a material oil into the obtained high temperature combustion gas stream provided along the circumference, a third reaction zone located at the down stream to the second reaction zone, having an inner diameter of 100 mm and a length of 6000 mm to terminate the reaction by jetting a cooling water, were sequentially connected.

(2) Refractory Material Constituting the Furnace

In above-mentioned furnace, the refractory material of the whole region of the first reaction zone and the second reaction zone to the part of introducing material oil, was a three layer structure having, from the inside, re-bonded magnesite-chrome brick (chemical composition: MgO 66%, $Cr_2O_3$ 20%, $Fe_2O_3$ 7%), high alumina brick and a refractory board. The refractory material in the second reaction zone after the part of introducing material oil was a three layer structure having, from the inside, high alumina refractory material ($Al_2O_3$ 99%, $SiO_2$ 0.2%, $Fe_2O_3$ 0.2%), alumina type castable and a refractory board. The third reaction zone had a double layer structure having, from the inside, above-mentioned high alumina brick and alumina type castable.

The conditions of the most inner surface of the refractory material after above-mentioned producing furnace was continuously operated for 50 hours are shown in Table 23, together with production conditions and properties of produced carbon black.

EXAMPLE 58

A high temperature combustion gas stream of 1900° C. was formed by a burner for mixing and combusting oxygen enriched air and fuel gas LPG in a furnace of the same shape as Example 57. The refractory material used was the same as Example 57.

The conditions of the most inner surface of the refractory material after above-mentioned producing furnace was continuously operated for 50 hours are shown in Table 23, together with the production conditions and properties of carbon black produced.

EXAMPLE 59

A high temperature combustion gas stream of 2000° C. was formed by a burner for mixing and combusting oxygen enriched air and fuel gas LPG in a furnace of the same shape as Example 57. The refractory material used was the same as Example 57.

The conditions of the most inner surface of the refractory material after above-mentioned producing furnace was continuously operated for 50 hours are shown in Table 23, together with the production conditions and properties of carbon black produced.

EXAMPLE 60

A high temperature combustion gas stream of 2000° C. was formed by a burner for mixing and combusting oxygen enriched air and fuel gas LPG in a furnace of the same shape as Example 57, except that the refractory material of the whole region of the first reaction zone and the second reaction zone to the part of introducing material oil, was three layer structure having, from the inside, semi-re-bonded magnesite-chrome brick (chemical composition: MgO 70%, $Cr_2O_3$ 20%, $Fe_2O_3$ 4%), high alumina brick and a refractory board.

The conditions of the most inner surface of the refractory material after above-mentioned producing furnace was continuously operated for 50 hours are shown in Table 23, together with the production conditions and properties of carbon black produced.

EXAMPLE 61

A high temperature combustion gas stream of 2000° C. was formed by a burner for mixing and combusting oxygen enriched air and fuel gas LPG in a furnace of the same shape as Example 57, except that the refractory material of the whole region of the first reaction zone and the second reaction zone to the part of introducing material oil, was three layer structure having, from the inside, directly bonded magnesite-chrome brick (chemical composition: MgO 70%, $Cr20_3$ 20%, $Fe20_3$ 4%), high alumina brick and a refractory board.

The conditions of the most inner surface of the refractory material after above-mentioned producing furnace was continuously operated for 50 hours are shown in Table 23, together with the production conditions and properties of carbon black produced.

Comparative Example 42

A high temperature combustion gas stream of 1750° C. was formed by a burner for mixing and combusting oxygen enriched air and fuel gas LPG in a furnace of the same shape as Example 57, except that the refractory material of the whole region of the first reaction zone and the second reaction zone to the part of introducing material oil was double layer structure having, from the inside, high alumina refractory material (chemical composition: $Al_2O_3$ 99%) and a refractory board.

The conditions of the most inner surface of the refractory material after above-mentioned producing furnace was continuously operated for 50 hours, are shown in Table 23, together with the production conditions and properties of carbon black produced.

Comparative Example 43

A high temperature combustion gas stream of 1900° C. was formed by a burner for mixing and combusting oxygen enriched air and fuel gas LPG in a furnace of the same shape as Example 57. The refractory material used was the same as in Comparative Example 42.

The conditions of the most inner surface of the refractory material after above-mentioned producing furnace was continuously operated for 50 hours, are shown in Table 23, together with the production conditions and properties of carbon black produced.

Comparative Example 44

A high temperature combustion gas stream of 1750° C. was formed by a burner for mixing and combusting oxygen enriched air and fuel gas LPG in a furnace of the same shape as Example 57, except that the refractory material of the whole region of the first reaction zone and the second reaction zone to the part of introducing material oil, was three layer structure having, from the inside, zirconia refractory material (chemical composition: $ZrO_2$ 99%), high alumina refractory material and a refractory board.

The conditions of the most inner surface of the refractory material after above-mentioned producing furnace was continuously operated for 50 hours, are shown in Table 23, together with the production conditions and properties of carbon black produced.

Comparative Example 45

A high combustion gas stream of 1900° C. was formed by a burner for mixing and combusting oxygen enriched air and fuel gas LPG in a furnace of the same shape as Example 57. The refractory material used was the same as in Comparative Example 44.

The conditions of the most inner surface of the refractory material after above-mentioned producing furnace was continuously operated for 50 hours, are shown in Table 23 (Table 23-1 to Table 23-3), together with the production conditions and properties of carbon black produced.

TABLE 23-1

|  | Example 57 | Example 58 | Example 59 |
|---|---|---|---|
| Refractory material for the most inner surface | Magnesite-chrome refractory material (re-bonded) | Magnesite-chrome refractory material (re-bonded) | Magnesite-chrome refractory material (re-bonded) |
| Main components (%) | MgO 66 $Cr_2O_3$ 20 $Fe_2O_3$ 7 | MgO 66 $Cr_2O_3$ 20 $Fe_2O_3$ 7 | MgO 66 $Cr_2O_3$ 20 $Fe_2O_3$ 7 |
| Temperature of high temperature gas*1 (° C.) | 1750 | 1900 | 2000 |
| Particle size of formed carbon black (nm)*2 | 15 | 12 | 10 |
| Amount of fuel LPG ($Nm^3$/h) | 10 | 12 | 14 |
| Amount of air for combustion ($Nm^3$/h) | 350 | 350 | 350 |
| Oxygen concentration (%) | 21 | 25 | 27 |
| Amount of carbon black formed (kg/h) | 12 | 16 | 11 |
| Condition of refractory material after 50 days continuous operation | Good (no crack or melt-deterioration) | Good (no crack or melt-deterioration) | Good (no crack or melt-deterioration) |

TABLE 23-2

|  | Example 60 | Example 61 | Comparative Example 42 |
|---|---|---|---|
| Refractory material for the most inner surface | Magnesite-chrome refractory material (semi re-bonded) | Magnesite-chrome refractory material (direct) | High alumina refractory material |
| Main components (%) | MgO 70 $Cr_2O_3$ 20 $Fe_2O_3$ 4 | MgO 70 $Cr_2O_3$ 20 $Fe_2O_3$ 4 | $Al_2O_3$ 99 |
| Temperature of high temperature gas*1 (° C.) | 2000 | 2000 | 1750 |
| Particle size of formed carbon black (nm)*2 | 10 | 10 | 15 |
| Amount of fuel LPG ($Nm^3$/h) | 14 | 14 | 10 |
| Amount of air for combustion ($Nm^3$/h) | 350 | 350 | 350 |
| Oxygen concentration (%) | 27 | 27 | 21 |
| Amount of carbon black formed (kg/h) | 11 | 11 | 12 |
| Condition of refractory material after 50 days continuous operation | Good (no crack or melt-deterioration) | Good (no crack or melt-deterioration) | A little wear at the edge |

TABLE 23-3

|  | Comparative Example 43 | Comparative Example 44 | Comparative Example 45 |
|---|---|---|---|
| Refractory material for the most inner surface | High alumina-refractory material | Zirconia refractory material | Zirconia refractory material |
| Main components (%) | $Al_2O_3$ 99 | $ZrO_2$ 95 | $ZrO_2$ 95 |
| Temperature of high temperature gas[*1] (° C.) | 1900 | 1750 | 1900 |
| Particle size of formed carbon black (nm)[*2] | 12 | 15 | 12 |
| Amount of fuel LPG ($Nm^3/h$) | 12 | 10 | 12 |
| Amount of air for combustion ($Nm^3/h$) | 350 | 350 | 350 |
| Oxygen concentration (%) | 25 | 21 | 25 |
| Amount of carbon black formed (kg/h) | 16 | 12 | 16 |
| Condition of refractory material after 50 days continuous operation | Large melt-deterioration | Small cracks | Cracks and partial seperetion |

[*1]A radiation thermometer was used to measure the temperature of the high temperature gas in the furnace.
[*2]An electron microscope method was used to measure the particle size of formed carbon black. The electron microscope method is the following method. Carbon black was thrown into chloroform, ultrasonic waves of 200 KHz were irradiated thereon to disperse carbon black in chloroform, and the dispersed sample was fixed on the supporting film. The fixed sample was then photographed by a transmission electron microscope, and the particle size was calculated from the diameter in the photographs and the magnification of the photographs. Such operation was repeated about 1500 times, and the particle size was obtained from the arithmetical mean.

In Examples 62 to 64 and Comparative Examples 46 to 53 as mentioned below, creosote oil was used as a feed stock (material oil). The estimated gas temperature is a temperature obtained by conducting heat transmission calculation based on the formula called as Fourie's formula:

$$Q=\lambda A \Delta T/L$$

wherein Q is the amount of heat transmission per unit time, $\lambda$ is thermal conductivity, A is the area where the heat passes, $\Delta T$ is the difference in temperature between two points, and L is the distance between the two points, which is a base of the heat transmission calculation, based on the value measured by using thermocouple put in the furnace wall, and by conducting simulation by a computer using a finite element method, considering the shape of the furnace.

EXAMPLE 62

Figure 12:
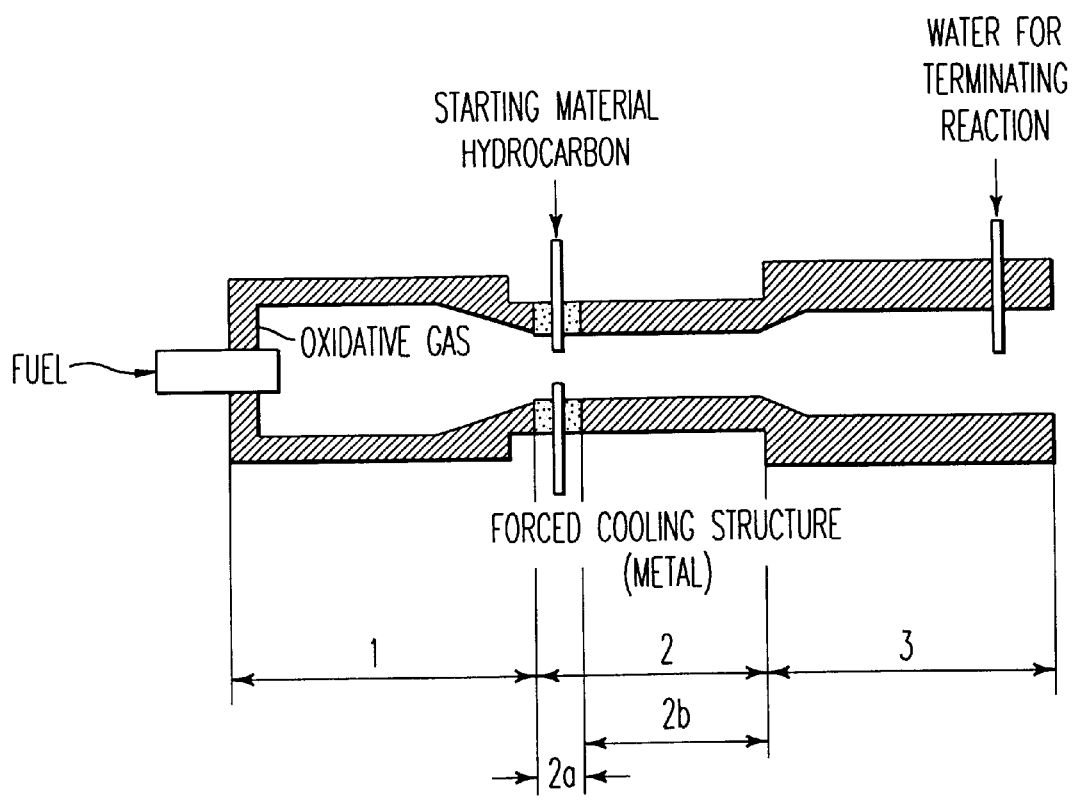
FIG. 12 is a diagram illustrating the scheme of a carbon black producing apparatus used in Examples 62 to 64.

A carbon black producing apparatus, of which the scheme is shown in FIG. 12, which has a first reaction zone (combustion zone) wherein the inner wall was constituted by magnesia-chromia brick with 70 wt % of magnesia and 18 wt % of chromia, the maximum tube diameter was 400 mm, the length was 2000 mm, the taper angle at the throttle portion was 15°, and the diameter at the final of the outlet was 60 mm, a second reaction zone (reaction zone) connected from the first reaction zone and comprising a choke part (throttle portion) having an inner diameter of 60 mm and a total length in the axis direction of 1000 mm, and a third reaction zone connected from the second reaction zone, having an inner diameter of 200 mm and a total length in the axis direction of 3000 mm, and equipped with an apparatus for introducing a water for terminating the reaction, was used to produce carbon black.

In the producing apparatus, the first step part at the choke part, including the material oil introducing apparatus installed 100 mm from the choke part, was made of a metal (copper), was capable of being cooled by a forced water cooler type, and had a inner diameter of 60 mm and a length in the axis direction of 200 mm. The latter step part at the choke part connected from the first step part, had the same inside diameter as the first step part of 60 mm and a length in the axis direction of 800 mm, and had a inner wall made of high purity alumina having a silica content of at most 0.5 wt %. The third reaction zone was constituted by similar brick to the latter step part at the choke part. In FIG. 12, 1 is the first reaction zone, 2 is the second reaction zone, 2a is the first step part at the choke part, 2b is the latter step part at the choke part, and 3 is the third reaction zone.

The production of carbon black was conducted without adding potassium into the feed stock, at the estimated gas temperature at the inlet of the second reaction zone of 2000° C. The production conditions and physical properties of obtained carbon black are shown in Table 24.

EXAMPLE 63

By using a producing apparatus shown in FIG. 12, carbon black was produced under condition of the potassium concentration in the feed stock of 1000 ppm at the estimated gas temperature at the inlet of the second reaction zone of 2000° C. The production conditions and physical properties of obtained carbon black are shown in Table 24.

EXAMPLE 64

By using the producing apparatus shown in FIG. 12, carbon black was produced under condition of the potassium concentration in the feed stock of 400 ppm at the estimated gas temperature at the inlet of the second reaction zone of 2000° C. The production conditions and physical properties of obtained carbon black are shown in Table 24.

TABLE 24

|  |  | Example 62 | Example 63 | Example 64 |
|---|---|---|---|---|
| Amount of air supplied for fuel | $Nm^3/h$ | 500 | 500 | 500 |
| Oxygen concentration in the air | VOL. % | 26.0 | 26.0 | 26.0 |
| Amount of fuel supplied | kg/h | 63.0 | 63.0 | 63.0 |
| Gas temperature at the inlet of second zone | ° C. | 2000 | 2000 | 2000 |
| Flow rate at the inlet of second zone | m/s | 426 | 426 | 426 |
| Amount of material oil supplied | kg/h | 140.0 | 140.0 | 140.0 |
| Potassium concentration in material oil | ppm | 0 | 1000 | 400 |
| Deformation in second zone | After 2 months | 1 mm or smaller | 1 mm or smaller | 1 mm or smaller |

TABLE 24-continued

|  |  | Example 62 | Example 63 | Example 64 |
|---|---|---|---|---|
| Particle size | nm | 22.3 | 22.2 | 22.0 |
| DBP oil absorption | mL/100 g | 153 | 81 | 102 |
| Ash content | % | 0.03 | 0.23 | 0.11 |
| $D_{mod}$ | nm | 95 | 76 | 84 |
| $D_{75}$ | nm | 119 | 98 | 106 |

Comparative Example 46

Figure 13:
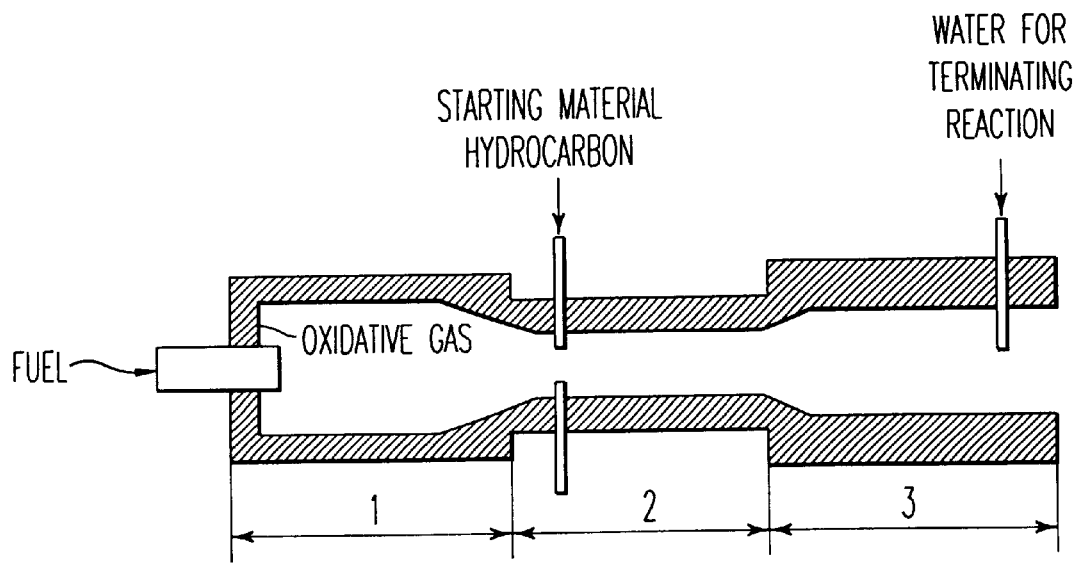
FIG. 13 is a diagram illustrating the scheme of a carbon black producing apparatus used in Comparative Examples 46 to 48.

Carbon black was produced under the same conditions as in Example 62 except that a producing apparatus, of which the scheme is shown in FIG. 13, was used. In the producing apparatus, the choke part had an inner diameter of 60 mm and a length in the axis direction of 1000 mm, and was constituted by alumina brick having a silica content of at most 0.5 wt %. The apparatus for introducing the feed stock was installed at the part 100 mm from the choke part inlet.

The production was conducted under condition of the potassium concentration in the feed stock being 1000 ppm. The production conditions and physical properties of obtained carbon black are shown in Table 25. In order to achieve as small particle size as Examples, it is required to suppress the amount of material oil supplied to be low, thus indicating poor productivity.

Comparative Example 47

By using the producing apparatus, of which the scheme is shown in FIG. 13, carbon black was produced under condition of the estimated gas temperature at the inlet of the second zone being 1950° C., while the oxygen concentration and amount of the fuel in an oxidative gas was increased, thereby brick at the choke part was deformed in one day. The production conditions are shown in Table 25.

Comparative Example 48

By using the producing apparatus, of which the scheme is shown in FIG. 13, carbon black was produced by adjusting the oxygen concentration and the amount of the fuel in an oxidative gas, and setting the estimated combustion gas temperature at the inlet of the second zone to be 2000° C., at the potassium concentration in material oil of 1000 ppm. The production conditions and physical properties of obtained carbon black are shown in Table 25. Damages of so large as 20 mm were observed on the inner wall of the second zone, and it was found to be difficult to continuously produce carbon black of good quality.

TABLE 25

|  |  | Comp. Ex. 46 | Comp. Ex. 47 | Comp. Ex. 48 |
|---|---|---|---|---|
| Amount of air supplied for fuel | Nm³/h | 500 | 500 | 500 |
| Oxygen concentration in the air | VOL. % | 21.0 | 24.0 | 26.0 |
| Amount of fuel supplied | kg/h | 51.0 | 58.0 | 63.0 |
| Gas temperature at the inlet of second zone | ° C. | 1800 | 1950 | 2000 |
| Flow rate at the inlet of second zone | m/s | 385 | 415 | 426 |

TABLE 25-continued

|  |  | Comp. Ex. 46 | Comp. Ex. 47 | Comp. Ex. 48 |
|---|---|---|---|---|
| Amount of material oil supplied | kg/h | 90.0 | 120.0 | 120.0 |
| Potassium concentration in material oil | ppm | 1000 | 1000 | 1000 |
| Deformation in second zone |  | After 2 months None | Deformed in one day | 1 Damage on 20 mm |
| Particle size | nm | 22.2 |  | 22.0 |
| DBP oil absorption | mL/100 g | 81 |  | 80 |
| Ash content | % | 0.24 |  | 0.22 |
| $D_{mod}$ | nm | 77 |  | 80 |
| $D_{75}$ | nm | 102 |  | 146 |

Comparative Example 49

Figure 14:
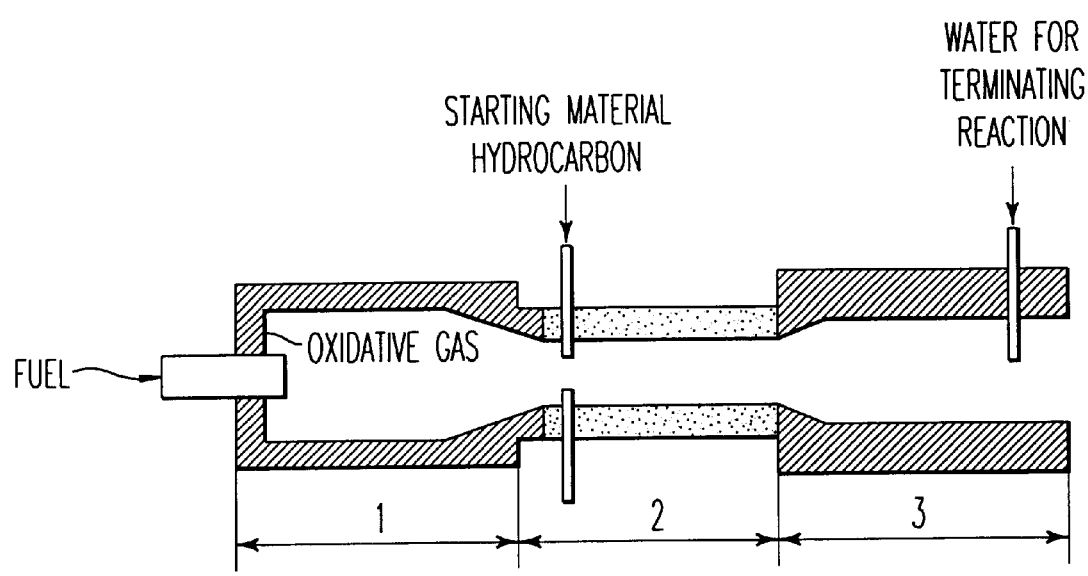
FIG. 14 is a diagram illustrating the scheme of a carbon black producing apparatus used in Comparative Examples 49 to 51.

Carbon black was produced by using a carbon black producing apparatus of which the scheme is shown in FIG. 14, wherein the whole region of a second zone having a tube inner diameter of 60 mm and a length of 1000 mm, was constituted by a metal (copper) having forced water cooler structure, and by setting the estimated combustion gas temperature at the inlet of the second zone to be 2000° C., at the potassium concentration in material oil of 0 ppm.

The production conditions and physical properties of obtained carbon black are shown in Table 26. As evident from the Table, both DBP oil absorption and aggregate mode diameter ($D_{mod}$) were large.

Comparative Example 50

Carbon black was produced by conducting same operations as in Comparative Example 49, except that the potassium concentration in material oil was 1000 ppm. The production conditions and physical properties of obtained carbon black are shown in Table 26. As evident from the Table, both DBP oil absorption and aggregate mode diameter ($D_{mod}$) were large.

Comparative Example 51

Carbon black was produced by conducting the same operations as in Comparative Example 49, except that the potassium concentration in material oil was 8000 ppm. The production conditions and physical properties of obtained carbon black are shown in Table 26. As evident from the Table, the ash content was large.

TABLE 26

|  |  | Comp Ex. 49 | Comp. Ex. 50 | Comp. Ex. 51 |
|---|---|---|---|---|
| Amount of air supplied for fuel | Nm³/h | 500 | 500 | 500 |
| Oxygen concentration in the air | VOL. % | 26.0 | 26.0 | 26.0 |
| Amount of fuel supplied | kg/h | 63.0 | 63.0 | 63.0 |
| Gas temperature at the inlet of second zone | ° C. | 2000 | 2000 | 2000 |
| Flow rate at the inlet of second zone | m/s | 426 | 426 | 426 |
| Amount of material oil supplied | kg/h | 140.0 | 140.0 | 140.0 |

TABLE 26-continued

|  |  | Comp Ex. 49 | Comp. Ex. 50 | Comp. Ex. 51 |
| --- | --- | --- | --- | --- |
| Potassium concentration in material oil | ppm | 0 | 1000 | 8000 |
| Deformation in second zone | After 2 months | 1 mm or smaller | 1 mm or smaller | 1 mm or smaller |
| Particle size | nm | 22.3 | 22.2 | 22.0 |
| DBP oil absorption | mL/100 g | 205 | 102 | 79 |
| Ash content | % | 0.03 | 0.23 | 0.94 |
| $D_{mod}$ | nm | 102 | 90 | 78 |
| $D_{75}$ | nm | 143 | 132 | 118 |

Comparative Example 52

By using the same apparatus used in Example 62, except that the total length in the axis direction of the forced cooling structure at the first step part of the choke part was 500 mm (the apparatus for introducing material oil was installed at the part 100 mm from the inlet), carbon black was produced under conditions of the potassium concentration in material oil being 1000 ppm, at the estimated gas temperature at the inlet of the second zone of 2000° C.

The production conditions and physical properties of obtained carbon black are shown in Table 27. As evident from the Table, the ratio of the aggregate 75% diameter to the aggregate mode diameter was large, thus indicating a broad aggregate distribution.

Comparative Example 53

Carbon black was produced under conditions of the estimated gas temperature at the inlet of the second zone being 2000° C. and the potassium concentration in material oil being 1000 ppm, by using the same apparatus used in Example 62, except that the part from the inlet of the choke part to 100 mm downstream to the part of introducing material oil in the axis direction, was constituted by a metal forced cooling structure as the throttle portion first step part; the connecting 800 mm in the axis direction was constituted by alumina refractory material as the choke part latter step part; and the inner diameter was 120 mm.

The production conditions and physical properties of obtained carbon black are shown in Table 27. As evident from the Table, the ratio of the aggregate 75% diameter to the aggregate mode diameter was large, thus indicating a broad aggregate distribution. Further, the particle size was found to be large.

TABLE 27

|  |  | Comp. Ex. 52 | Comp. Ex. 53 |
| --- | --- | --- | --- |
| Amount of air supplied for fuel | Nm³/h | 500 | 500 |
| Oxygen concentration in the air | VOL. % | 26.0 | 26.0 |
| Amount of fuel supplied | kg/h | 63.0 | 63.0 |
| Gas temperature at the inlet of second zone | ° C. | 2000 | 2000 |
| Flow rate at the inlet of second zone | m/s | 426 | 426 |
| Amount of material oil supplied | kg/h | 140.0 | 140.0 |

TABLE 27-continued

|  |  | Comp. Ex. 52 | Comp. Ex. 53 |
| --- | --- | --- | --- |
| Potassium concentration in material oil | ppm | 1000 | 1000 |
| Deformation in second zone | After 2 months | 1 mm or smaller | 1 mm or smaller |
| Particle size | nm | 22.3 | 23.8 |
| DBP oil absorption | mL/100 g | 101 | 78 |
| Ash content | % | 0.22 | 0.20 |
| $D_{mod}$ | nm | 78 | 88 |
| $D_{75}$ | nm | 110 | 136 |

EXAMPLES 65 TO 68

A carbon black producing furnace was installed which had a structure in which a combustion zone having an internal diameter of 500 mm and a length of 1400 mm and provided with a duct for introducing air and a combustion burner, a feed stock introducing zone, connected from the combustion zone, and made of a choke part having an inner diameter of 60 mm and a length of 800 mm and having a plurality of feed stock nozzles provided along the circumference, a rear reaction zone having an inner diameter of 100 mm and a length of 6000 mm and equipped with a quenching apparatus, and a control valve having an inner valve diameter of 80 mm as a throttle mechanism, were sequentially connected.

Figure 15:
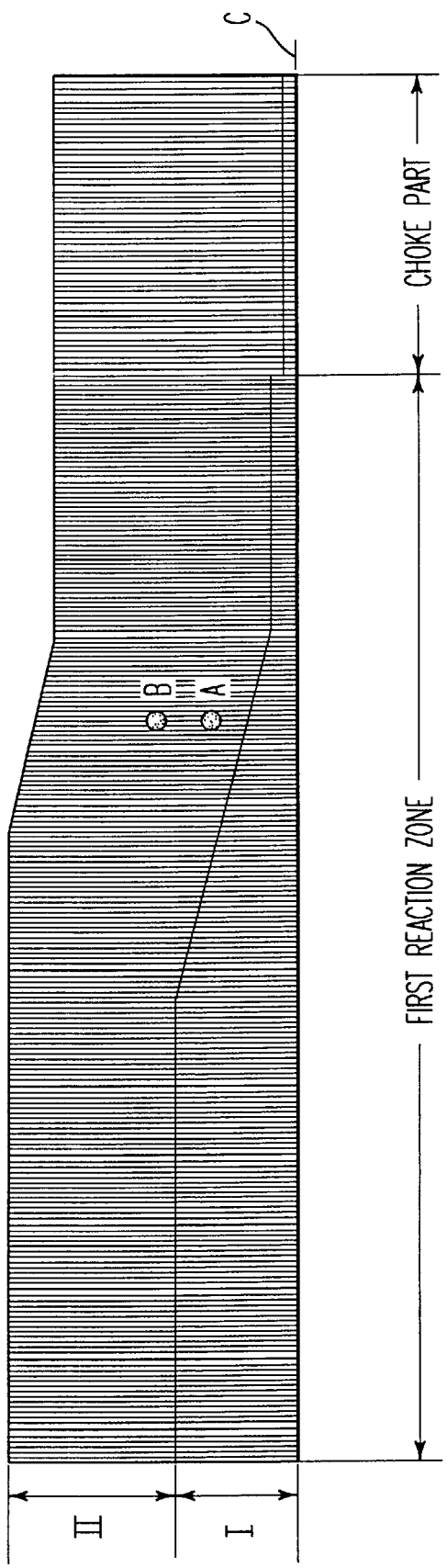
FIG. 15 is a modeling diagram to calculate heat transmission of a carbon black producing furnace.

For heat transfer analysis, modeling of the furnace was conducted as shown in FIG. 15. In the Figure, the line C indicates the central axis in the furnace. Part I indicates the part where the combustion gas fuel flowed, and part II indicates the part of the refractory material. The refractory material was constituted by magnesia, chrome brick, high alumina brick, refractory brick, refractory board, iron or the like. For the modeling of the furnace, the dimensions of the part at which such a material was used, were precisely modeled. Further, the temperature dependency on thermal conductivity of such a material was obtained, and input as a physical property. For the coefficient of heat transfer of the outer surface of the furnace, the value of heat transfer by natural convection was input even in the open air. In FIG. 15, the parts A and B indicate the parts at which thermocouples were put. The part A was 75 mm from the furnace inner wall, and the part B was 220 mm from the furnace inner wall.

Figure 16:
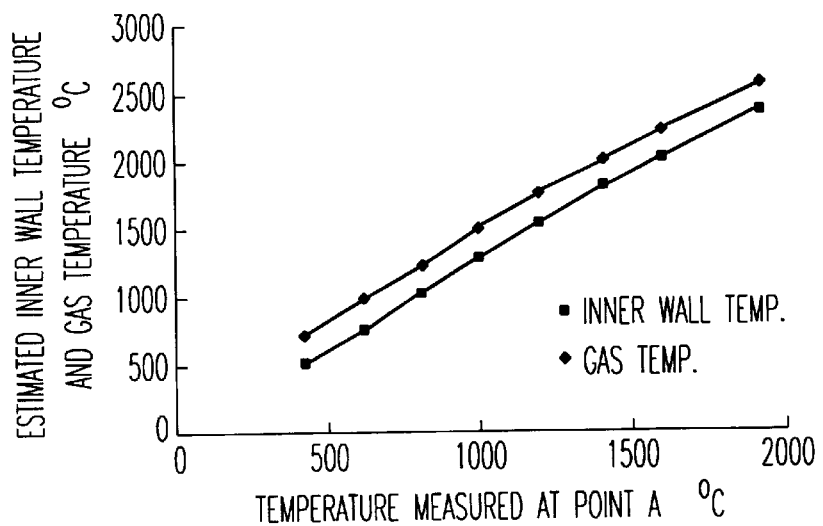
FIG. 16 is a diagram to estimate the furnace inner wall temperature and the gas temperature in the furnace from the measured temperature of the point A.
Figure 17:
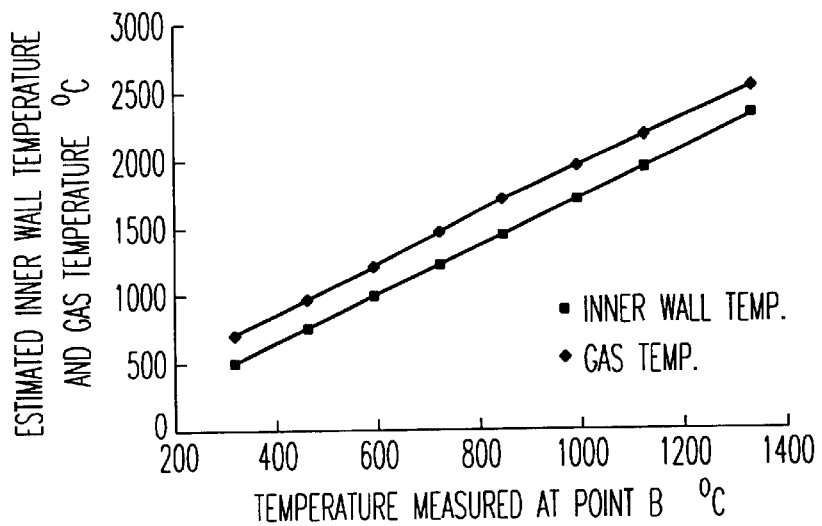
FIG. 17 is a diagram to estimate the furnace inner wall temperature and the gas temperature in the furnace from the measured temperature of the point B.

By conducting analysis of heat transfer and moving of the gas by using a computer, relation of the temperature at the measured points (point A and point B) with the gas temperature in the furnace and the temperature of the furnace inner wall, was clarified. The relation is indicated in FIG. 16 and FIG. 17.

The temperature of the furnace inner wall and the combustion gas temperature in the furnace were estimated from the temperatures at the measured points, and carbon black was produced within such a range that the temperature of the furnace inner wall was at most the heat resistant temperature of the refractory material, and the combustion gas temperature in the furnace was at least 1800° C. Other conditions are shown in Table 28. Creosote oil was used as the fuel and the feed stock. In Examples 67 and 68, oxygen was added to the air to raise the combustion gas temperature.

Further, the maximum temperature to use the furnace material is about 1950° C. Accordingly, the temperature of the furnace inner wall was obtained on occasion by the method of the present invention, and when the temperature of the wall was about to exceed the temperature during operation, at least one amount of the oxidative gas or the fuel to be supplied into the furnace was reduced to decrease the temperature. Damages of the furnace wall due to heat could be prevented in such a manner, and carbon black could be stably produced at a high temperature.

In Table 28, "combustion gas temperature", "oxygen concentration in combustion gas" and "pressure in the furnace" are represented by values at the part where the feed stock was introduced. The combustion gas temperature was represented by the value estimated by above-mentioned method. "Potassium concentration" is the concentration of potassium hydroxide added into the feed stock taken as the potassium concentration.

Various properties of obtained carbon black are shown in Table 29.

Production Example 1

Production Example 1 was conducted under conditions shown in Table 28 by using the carbon black producing furnace used in Examples 65 to 68.

In Production Example, the temperature was lower as compared with Example 65. In Table 28, for the combustion gas temperature of the Production Example 1, one estimated by above-mentioned method, and the gas temperature directly measured by inserting a thermocouple in the furnace, are shown. There is little difference between them, thus indicating above-mentioned method by the estimated value being appropriate.

Physical properties of obtained carbon black are shown in Table 29.

When carbon black obtained in Examples and one obtained in Production Example 1 are compared, as shown in Table 29, carbon black having a small particle size could be obtained in Example 65 as compared with Production Example 1. $D_{1/2}/D_{mod}$ is small, and the distribution of the aggregate size is sharp. Further, $D_{75}$ is small, and the amount of one of large aggregate size is small. Further, blackness is high, dispersibility index is low, thus indicating good dispersibility.

TABLE 28

|  | Ex. 65 | Ex. 66 | Ex. 67 | Ex. 68 | Production Ex. 1 |
|---|---|---|---|---|---|
| Fuel kg/h | 54 | 52 | 54 | 58 | 52 |
| Amount of air Nm³/h | 520 | 500 | 470 (13) | 480 (20) | 500 |
| Combustion gas temperature | 1821 | 1820 | 1920 | 2090 | 1785 [1780] |
| Oxygen concentration in combustion gas % | 0.06 | 0.04 | 0.39 | 0.58 | 4.44 |
| Flow rate of combustion gas at choke part m/s | 390 | 378 | 375 | 408 | 384 |
| Amount of feed stock kg/h | 55 | 53 | 59 | 62 | 65 |
| Pressure in the furnace kg/cm²G | 0.54 | 0.57 | 0.62 | 0.65 | 0.58 |
| Potassium concentration ppm | 0 | 800 | 800 | 800 | 0 |

TABLE 28-continued

|  | Ex. 65 | Ex. 66 | Ex. 67 | Ex. 68 | Production Ex. 1 |
|---|---|---|---|---|---|
| Convection time at choke part msec | 2.05 | 2.11 | 2.14 | 1.96 | 2.08 |

Value in ( ) indicates the amount of added oxygen flowing.
Value in [ ] indicates a measured value by directly inserting a thermocouple into the furnace.

TABLE 29

|  |  | Ex. 65 | Ex. 66 | Ex. 67 | Ex. 68 | Production Ex. 1 |
|---|---|---|---|---|---|---|
| Particle size nm |  | 15 | 15 | 12 | 11 | 17 |
| $N_2SA$ m²/g |  | 262 | 248 | 320 | 360 | 193 |
| CrDBP cc/100 g |  | 103 | 84 | 67 | 68 | 99 |
| $D_{mod}$ nm |  | 43 | 32 | 29 | 25 | 68 |
| $D_{1/2}$ nm |  | 24 | 19 | 17 | 15 | 35 |
| $D_{75}$ nm |  | 53 | 41 | 37 | 31 | 95 |
| $D_{75}$ $D_{mod}$ |  | 1.23 | 1.28 | 1.27 | 1.25 | 1.40 |
| PVC blackness index |  | 16.3 | 19.3 | 30.0 | 32.0 | 8.0 |
| Dispersibility index |  | 20 | 120 | 125 | 130 | 40 |
| Yield | Material oil % | 63.6 | 65.4 | 61.3 | 66.2 | 37.2 |
|  | Total carbon % | 32.1 | 33.0 | 32.0 | 34.2 | 19.0 |
| $D_{1/2}/D_{mod}$ |  | 0.558 | 0.594 | 0.586 | 0.6 | 0.615 |

EXAMPLE 69

(1) Shape of the Furnace

A furnace type carbon black producing furnace was installed which had a structure in which a first reaction zone having an inner diameter of 500 mm and a length of 1400 mm, in which a high temperature combustion gas stream of 2200° C. was formed by a burner for mixing and combusting oxygen enriched air and a fuel gas LPG, a second reaction zone, connected from the first reaction zone, and comprising a throttle portion, having an inner diameter of 50 mm and a length of 300 mm and having two nozzles to introduce creosote oil as a material oil into the obtained high temperature combustion gas stream, provided along the circumference, a third reaction zone located at downstream to the second reaction zone, having an inner diameter of 100 mm and a length of 6000 mm to terminate the reaction by jetting a cooling water, were sequentially connected.

(2) Refractory Material Constituting the Furnace

In above-mentioned furnace, the refractory material at the whole region of the first reaction zone and the second reaction zone to the part of introducing material oil was a four layer structure having, from the inside, magnesia brick (chemical composition: MgO 99%), magnesite-chrome brick (chemical composition: MgO 66%, $Cr_2O_3$ 20%, $Fe_2O_3$ 7%), high alumina brick and a refractory board. The refractory material in the second reaction zone at the lower part of introducing material oil was a four layer structure having, from the inside, high alumina refractory material ($Al_2O_3$ 99%, $SiO_2$ 0.2%, $Fe_2O_3$ 0.2%), alumina type castable and a refractory board. The third reaction zone had a double layer structure having, from the inside, above-mentioned high alumina brick and alumina type castable.

(3) Measurements of Magnesia Refractory Material

Above-mentioned magnesia brick had a thickness of 50 mm, a width at the inner wall side of from 70 to 100 mm and a length of from 150 to 250 mm.

(3) Temperature Rising and Falling Speed

The speed during temperature rising and temperature falling was defined as shown in Table 30, and temperature controlling was conducted so that the change in temperature of inner wall brick was not larger than the speed.

TABLE 30

Temperature rising and falling speed at inner surface of brick

| Temperature | Temperature rising | Temperature falling |
|---|---|---|
| 0–800° C. | 80° C./h | 80° C./h |
| 800–1300° C. | 30° C./h | 30° C./h |
| 1300° C. or above | 80° C./h | 80° C./h |

Conditions of the most inner surface of the refractory material, after above-mentioned producing furnace was continuously operated for 50 hours, is shown in Table 31 (Table 31-1 and Table 32-2), together with properties and production conditions of obtained carbon black.

EXAMPLE 70

A high temperature combustion gas stream of 1900° C. was formed by a burner for mixing and combusting oxygen enriched air and fuel gas LPG by using a carbon black producing furnace of the same shape as in Example 69. Refractory material used here was the same as in Example 69.

Conditions of the most inner surface of the refractory material, after above-mentioned producing furnace was continuously operated for 50 hours, are shown in Table 31 (Table 31-1 and Table 31-2), together with properties and production conditions of obtained carbon black.

EXAMPLE 71

A high temperature combustion gas stream of 2000° C. was formed by a burner for mixing and combusting oxygen enriched air and fuel gas LPG by using a carbon black producing furnace of the same shape as in Example 69. Refractory material used here was the same as in Example 69.

Conditions of the most inner surface of the refractory material, after above-mentioned producing furnace was continuously operated for 50 hours, are shown in Table 31 (Table 31-1 and Table 31-2), together with properties and production conditions of obtained carbon black.

Comparative Example 54

A high combustion gas stream of 1750° C. was produced by a burner for mixing and combusting oxygen enriched air and fuel gas LPG by using a carbon black producing furnace of the same shape as in Example 69, except that the refractory material of the whole region of the first reaction zone and the second reaction zone to the part of introducing feed stock, was a double layer structure having, from the inside, high alumina refractory material (chemical composition: $Al_2O_3$ 99%) and a refractory board.

The conditions of the most inner surface of the refractory material, after above-mentioned producing furnace was continuously operated for 50 hours, are shown in Table 31 (Table 31-1 and Table 31-2), together with the production conditions and properties of carbon black obtained.

Comparative Example 55

A high temperature combustion gas stream of 1900° C. was formed by a burner for mixing and combusting oxygen enriched air and fuel gas LPG by using a carbon black producing furnace of the same shape as in Example 69. Refractory material used here was the same as in Example 54.

Conditions of the most inner surface of the refractory material after above-mentioned producing furnace was continuously operated for 50 hours are shown in Table 31 (Table 31-1 and Table 31-2) with properties and production conditions of obtained carbon black.

Comparative Example 56

A high temperature combustion gas stream of 1750° C. was formed by a burner for mixing and combusting oxygen enriched air and fuel gas LPG, by using a carbon black producing furnace of the same shape as in Example 69. The refractory material at the whole region of the first reaction zone and the second reaction zone to the part for introducing the feed stock was a three layer structure having, from the inside, zirconia refractory material (chemical composition: $ZrO_2$ 95%), high alumina refractory material and a refractory board. The refractory material at the part downstream to the part for introducing feed stock, was the same as in Example 69.

Conditions of the most inner surface of the refractory material, after above-mentioned producing furnace was continuously operated for 50 hours, are shown in Table 31 (Table 31-1 and Table 31-2), together with properties and production conditions of obtained carbon black.

Comparative Example 57

A high temperature combustion gas stream of 1900° C. was formed by a burner for mixing and combusting oxygen enriched air and fuel gas LPG by using a carbon black producing furnace of the same shape as in Example 69. Refractory material used here was the same as in Example 56.

Conditions of the most inner surface of the refractory material, after above-mentioned producing furnace was continuously operated for 50 hours, are shown in Table 31 (Table 31-1 and Table 31-2), together with properties and production conditions of obtained carbon black.

TABLE 31-1

| | Example 69 | Example 70 | Example 71 |
|---|---|---|---|
| Refractory material for the most inner surface | Magnesia refractory material | Magnesia refractory material | Magnesia refractory material |
| Main components (%) | MgO 99.5<br>$Fe_2O_3$ <0.1<br>$Al_2O_3$ <0.1 | MgO 99.5<br>$Fe_2O_3$ <0.1<br>$Al_2O_3$ <0.1 | MgO 99.5<br>$Fe_2O_3$ <0.1<br>$Al_2O_3$ <0.1 |
| Temperature of high temperature gas*1 (° C.) | 1750 | 1900 | 2000 |
| Particle size of formed | 15 | 12 | 10 |

TABLE 31-1-continued

|  | Example 69 | Example 70 | Example 71 |
|---|---|---|---|
| carbon black (nm)*2 |  |  |  |
| Amount of fuel LPG (Nm³/h) | 10 | 12 | 14 |
| Amount of air for combustion (Nm³/h) | 350 | 350 | 350 |
| Oxygen concentration (%) | 21 | 25 | 27 |
| Amount of carbon black formed (kg/h) | 12 | 16 | 11 |
| Condition of refractory material after 50 days continuous operation | Good (no crack or melt-deterioration) | Good (no crack or melt-deterioration) | Good (with fine cracks) |

TABLE 31-2

|  | Comp. Ex. 54 | Comp. Ex. 55 | Comp. Ex. 56 | Comp. Ex. 57 |
|---|---|---|---|---|
| Refractory material for the most inner surface | High alumina refractory material | High alumina refractory material | Zirconia refractory material | Zirconia refractory material |
| Main components (%) | $Al_2O_3$ 99 | $Al_2O_3$ 99 | $ZrO_2$ 95 | $ZrO_2$ 95 |
| Temperature of high temperature gas (° C.) | 1750 | 1900 | 1750 | 1900 |
| Particle size of formed carbon black (nm)*2 | 15 | 12 | 15 | 12 |
| Amount of fuel LPG (Nm³/h) | 10 | 12 | 10 | 12 |
| Amount of air for combustion (Nm³/h) | 350 | 350 | 350 | 350 |
| Oxygen concentration (%) | 21 | 25 | 21 | 25 |
| Amount of carbon black formed (kg/h) | 12 | 16 | 12 | 16 |
| Condition of refractory material after 50 days continuous operation | Good(no crack or melt-deterioration) | Large melt-deterioration | Small cracks | Large cracks and partial seperation |

*1A radiation thermometer was used to measure the temperature of the high temperature gas in the furnace.
*2An electron microscope method was used to measure the particle size of formed carbon black. The electron microscope method is the following method. Carbon black was thrown into chloroform, ultrasonic waves of 200 KHz were irradiated thereon to disperse carbon black in chloroform, and the dispersed sample was fixed on the supporting film. The fixed sample was then photographed by a transmission electron microscope, and the particle size was calculated form the diameter in the photographs and the magnification of the photographs. Such operation was repeated about 1500 times, and the particle size was obtained from the arithmetical mean.

EXAMPLES 72 TO 76

Figure 18:
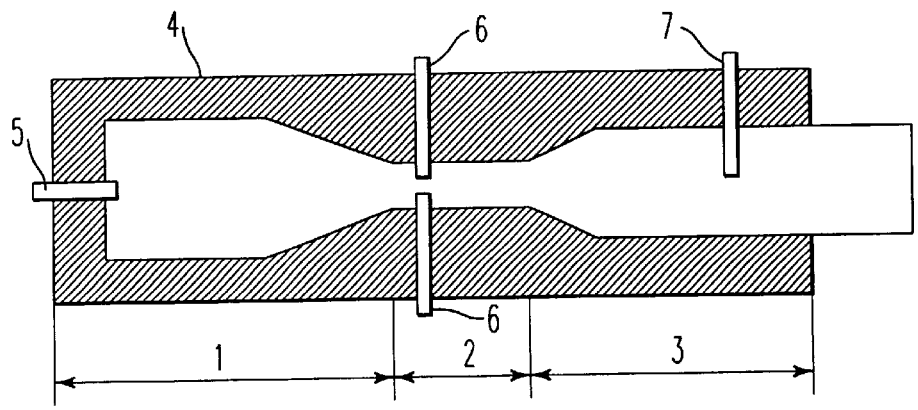
FIG. 18 is a longitudinal schematic diagram of important part illustrating one example of a producing furnace which can be used for producing carbon black of the present invention.

By using a producing furnace, of which the scheme is shown in FIG. 18, carbon blacks A to C were produced under production conditions shown in Table 32. The producing furnace had a diameter at the choke part of 60 mm and a length at the choke part of 700 mm. Termination of the reaction was conducted by spraying water at a rate of 150 kg/hr, at the part 200 mm from the choke part outlet, in the third reaction zone having a diameter of 200 mm connected from the choke part outlet. In FIG. 18, 13 indicates the furnace wall.

Physical properties of carbon blacks A to C which are obtained carbon blacks, are shown in Table 32. Physical properties of commercially available carbon black "#990" manufactured by Mitsubishi Chemical Corporation together are shown in Table 32.

Figure 19:
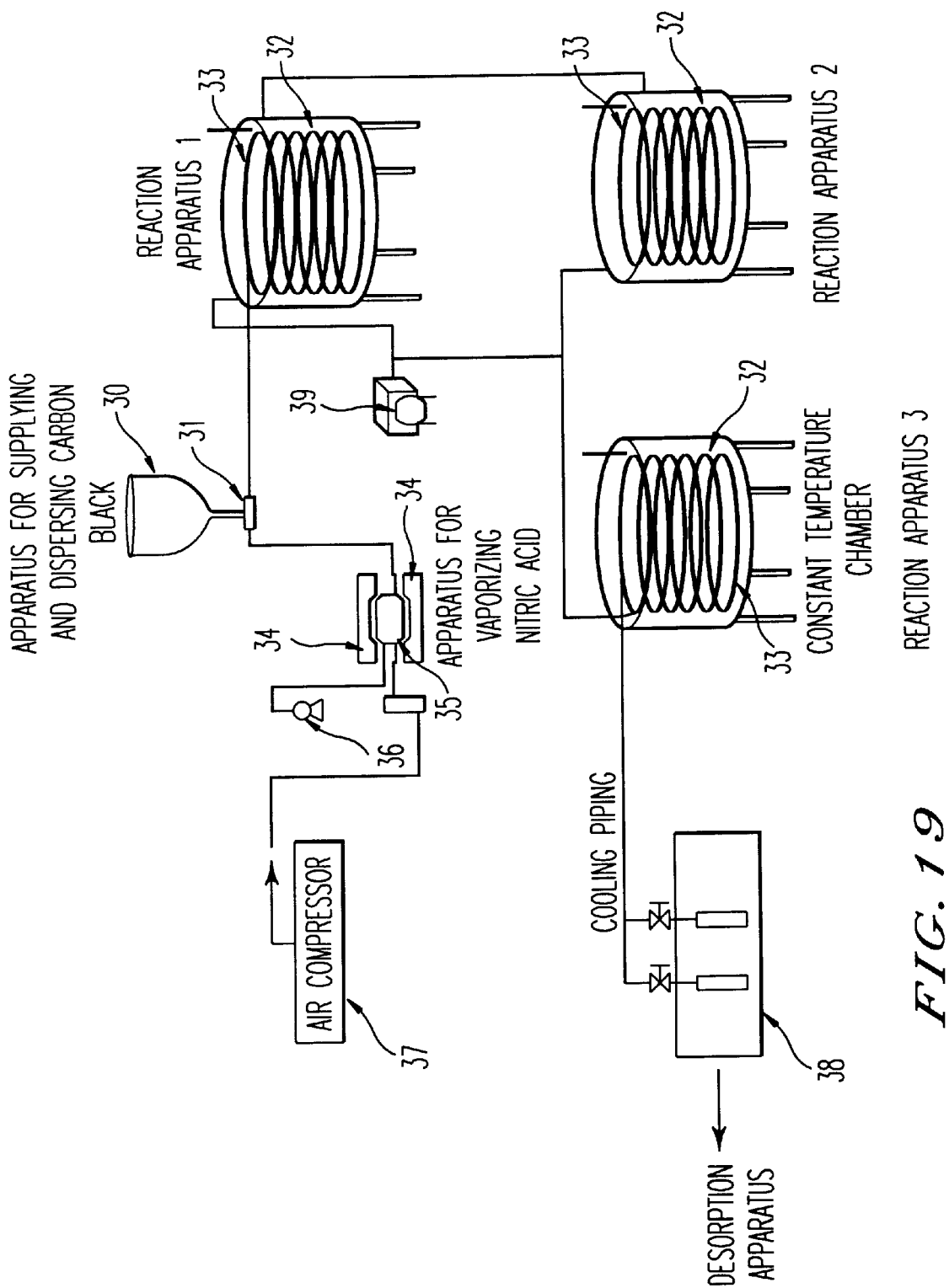
FIG. 19 is a diagram illustrating the scheme of an accompanying air current type oxidation reaction apparatus used in Example 72.

Using such carbon blacks A to C as a base, oxidation treatment was conducted under oxidation conditions shown in Table 33 by using an accompanying air current type oxidation reaction apparatus, of which the scheme is shown in FIG. 19.

The accompanying air current type oxidation reaction apparatus of FIG. 19 consisted of an apparatus for vaporizing nitric acid, an apparatus for supplying and dispersing carbon black, oxidation reaction apparatuses, separation apparatus and desorption apparatus.

The apparatus for vaporizing nitric acid was one in which a gas such as air or nitrogen to be accompanied with carbon black, as pre-heated at from 100 to 150° C., was introduced into a cylinder 35 heated by a heater 34, supplied by a nitric acid quantitative pump 36, finely-atomized into the cylinder 35 and vaporized, to generate a high pressure nitric acid-containing gas stream. In FIG. 19, 37 is an air compressor.

Figure 20:
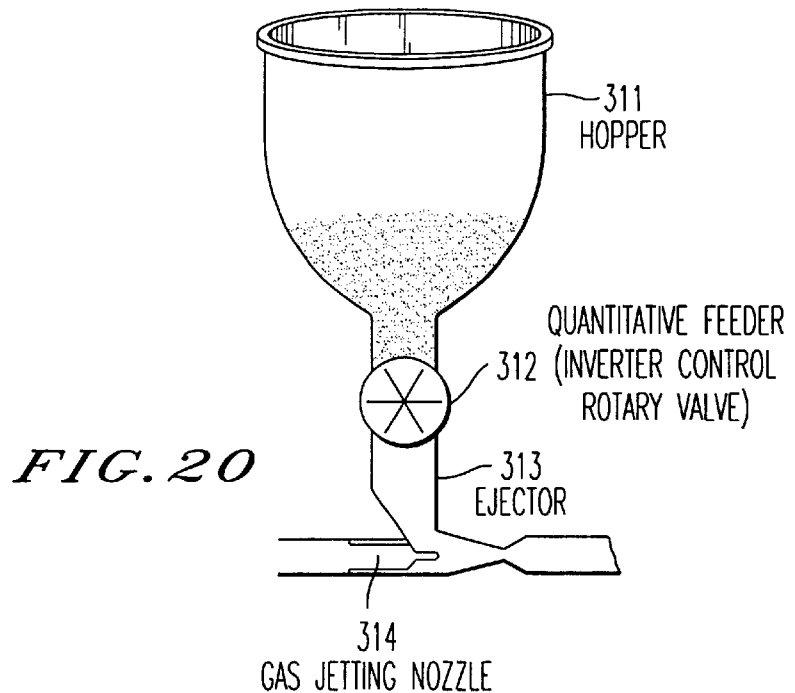
FIG. 20 is a diagram illustrating the scheme of a apparatus for supplying and dispersing carbon black in the apparatus illustrated in FIG. 19.

Into the nitric acid-containing gas thus obtained, base carbon black was dispersed into the gas stream by quantitatively supplied by apparatus for supplying and dispersing carbon black (30) equipped with an ejector type dispersing machine 31. Details of the apparatus for supplying and dispersing carbon black are shown in FIG. 20. In FIG. 20, 311 is a hopper, 312 is a quantitative feeder made of inverter control rotary valve, 313 is an ejector and 314 is a gas jetting nozzle.

The distance between the vaporization apparatus and the apparatus for supplying and dispersing carbon black was totally 3 m (the residue time was about 0.5 second). For the ejector part to disperse carbon black, one having a nozzle diameter of 2 mm was used, and a jetting speed was about 300 m/s.

The reaction apparatus was made by a constant temperature chamber 32 and a reaction tube 33 constituted by a piping installed spirally in the constant temperature chamber. The constant temperature chamber 32 was capable of adjusting the temperature by flowing air having the temperature controlled to be from atmospheric temperature to 250° C., to keep the predetermined residue time under conditions where the temperature was controlled to be within a certain range to a certain range of flow rate. The reaction tube had an inner diameter of 25 mm, and was made by a stainless piping having a total length of 100 mm, and installed in the reaction chamber in a form of a spiral having a diameter of from 1.8 to 2 mm. 39 is a hot air machine.

In the apparatus shown in FIG. 19, three reaction apparatuses were arranged in line with one another, and they could be recombined with one another.

The gas stream having carbon black dispersed was introduced into the reaction tube, and subjected to an oxidation reaction. In each Example mentioned hereinafter, the residue time was adjusted by changing the number of the reaction apparatuses combined.

The gas stream having carbon black after the oxidation reaction was cooled while passing through a cooling piping having a total length of 10 m connected from the reaction apparatus, and then introduced into the separation apparatus in which carbon black was separated from the gas.

In the separation apparatus 38, carbon black was separated from the gas stream by a collecting bag to recover carbon black.

Figure 21:
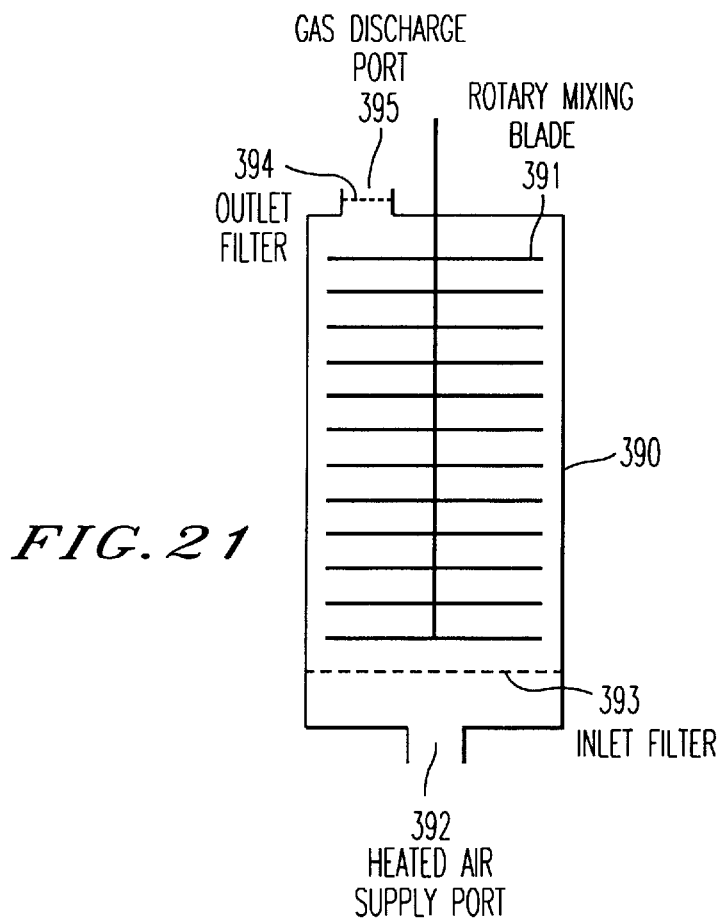
FIG. 21 is a desorption apparatus used in Example 72.

Separated carbon black was introduced into the desorption apparatus. Details of the desorption apparatus are shown in FIG. 21. The desorption apparatus has a cylindrical part (390) having an inner diameter of 400 mm and a height of 600 mm and provided a heater outside, and an inlet filter (393) installed all over the lower part of the cylinder part. The heated air was introduced into the cylinder from the heated air supply port (392) by means of the inlet filter, carbon black in the cylinder became in the fluid state, and nitrogen oxide and moisture contained in carbon black were desorbed therefrom. In FIG. 21, 394 is an outlet filter, 395 is a gas discharge port. In each Example mentioned hereinafter, the cylinder part having 1 kg of carbon black packed, while air for separation pre-heated to 120° C. was introduced therein at 100 l/min, was preliminarily heated for one hour, with the temperature in the apparatus being adjusted at 120° C. Then, the temperature was raised and kept at 150° C. for 1 hour to conduct desorption. Then the temperature was decreased to 30° C., carbon black was taken from the cylinder and adequately mixed, thereupon the sampling was conducted to measure physical properties and evaluate optical suitability.

Production Example 2 to 4

By using carbon black B having physical properties shown in Table 32, obtained under production conditions shown in Table 32, and "#990" manufactured by Mitsubishi Chemical Corporation, accompanying air current type nitric acid oxidation was conducted under conditions shown in Table 34, and carbon black having physical properties shown in Table 34 was obtained.

Production Example 5

Oxidation of carbon black was conducted by using the accompanying air current type oxidation apparatus shown in FIG. 19, wherein the apparatus for vaporizing nitric acid was removed, and an ozone-containing gas obtained by using, as a material, a compressed air generated in the air compressor, and by passing it through an ozonizer, was used as the accompanying air current, and carbon black having physical properties shown in Table 34 was obtained.

Production Example 6

10 g of carbon B was packed in a fluid column having an internal volume of 250 ml, and ozone gas having an ozone concentration of 1.6 vol % was passed through the column at 0.5 l/min to conduct the oxidation reaction for 24 hours, and carbon black having physical properties shown in Table 34 was obtained.

TABLE 32

| | | Carbon black | | | |
|---|---|---|---|---|---|
| | | A | B | C | #990 |
| Production conditions | Volume of combustion gas (Nm³/h) | 750 | 750 | 750 | — |
| | Temperature of combustion gas (° C.) | 1950 | 1950 | 1950 | — |
| | Amount of material oil supplied (kg/h) | 48 | 42 | 38 | — |
| | Amount of potassium hydroxide (g/h) | 960 | 920 | 0 | — |
| Physical properties | Average particle size (nm) | 13.0 | 12.3 | 11.5 | 15.6 |
| | SEM (m²/g) | 212 | 233 | 255 | 182 |
| | cDBP (ml/100 g) | 75 | 75 | 98 | 83 |
| | $D_{mod}$ (nm) | 40 | 37 | 34 | 45 |
| | $D_{½}$ (nm) | 20 | 19 | 17 | 37 |
| | $D_{75}$ (nm) | 51 | 44 | 42 | 75 |
| | Amount of iodide absorbed (mg/g) | 412 | 442 | 491 | 252 |
| | $N_2SA$ (m²/g) | 430 | 465 | 534 | 273 |
| | Volatile content (%) | 3.2 | 3.6 | 4.0 | 1.2 |
| | $N_2SA$/SEM | 2.03 | 2.00 | 2.09 | 1.50 |
| | PVC blackness | 27 | 27 | 26 | 15 |

TABLE 33

| | | Ex. 72 | Ex. 73 | Ex. 74 | Ex. 75 | Ex. 76 |
|---|---|---|---|---|---|---|
| | Base carbon black | CB A | CB B | CB C | CB B | CB B |
| Oxidation conditions | Oxidation temperature (° C.) | 150 | 150 | 150 | 150 | 150 |
| | Oxidation time (sec) | 30 | 30 | 30 | 30 | 30 |
| | Amount of oxidizing agent (nitric acid) (parts by weight) | 112 | 112 | 112 | 80 | 187 |
| | Carbon black concentration (g/m³) | 250 | 250 | 250 | 350 | 150 |
| Physical properties | Average particle size (nm) | 13.0 | 12.3 | 11.5 | 12.3 | 12.3 |
| | SEM (m²/g) | 212 | 233 | 255 | 233 | 233 |
| | cDBP (ml/100 g) | 75 | 75 | 98 | 75 | 75 |
| | Amount of iodide absorbed (mg/g) | 200 | 232 | 255 | 231 | 212 |
| | $N_2SA$ (m²/g) | 546 | 581 | 631 | 566 | 590 |
| | Volatile content (%) | 21.5 | 22.2 | 24.6 | 20.1 | 27.3 |
| | Volatile content/$N_2SA$ (mg/m³) | 0.39 | 0.38 | 0.39 | 0.36 | 0.46 |
| | $N_2SA$/SEM | 2.58 | 2.49 | 2.47 | 2.43 | 2.53 |
| | Amount of iodide/$N_2SA$ (mg/g) | 0.37 | 0.40 | 0.40 | 0.41 | 0.36 |
| | PVC blackness | 29 | 30 | 32 | 30 | 30 |
| | Difference in PVC blackness from base | +2 | +3 | +6 | +3 | +3 |

CB Carbon black

TABLE 34

Conditions for oxidation treatment and properties of carbon black

|  |  | Prod. Ex. 2 | Prod. Ex. 3 | Prod. Ex. 4 | Prod. Ex. 5 | Prod. Ex. 6 |
|---|---|---|---|---|---|---|
| Oxidation conditions | Base carbon black | #990 | CB B | CB B | CB B | CB B |
|  | Oxidation Process | AC | AC | AC | AC | column |
|  | Oxidizing agent | Nitric acid gas | Nitric acid gas | Nitric acid gas | Ozone | Ozone |
|  | Oxidation temperature (° C.) | 150 | 200 | 150 | 27 | 27 |
|  | Oxidation time (sec) | 30 | 30 | 20 | 30 | 1440 |
|  | Amount of oxidizing agent (parts by weight) | 112 | 112 | 50 | 120 | 247 |
|  | Carbon black concentration (g/m$^3$) | 250 | 250 | 400 | 10 |  |
| Physical properties | Average particle size | 15.6 | 12.3 | 12.3 | 12.3 | 12.3 |
|  | SEM (m$^2$/g) | 182 | 233 | 233 | 233 | 233 |
|  | cDBP (ml/100 g) | 83 | 75 | 75 | 75 | 75 |
|  | Amount of iodide absorbed (mg/g) | 134 | 388 | 211 | 148 | 121 |
|  | N$_2$SA (m$^2$/g) | 312 | 702 | 513 | 468 | 475 |
|  | Volatile content (%) | 15.8 | 23.0 | 15.2 | 9.7 | 13.8 |
|  | Volatile content /N$_2$SA (mg/m$^3$) | 0.49 | 0.33 | 0.30 | 0.20 | 0.29 |
|  | N$_2$SA/SEM | 1.71 | 3.01 | 2.20 | 2.01 | 2.03 |
|  | Amount of iodide/N$_2$SA (mg/g) | 0.43 | 0.55 | 0.41 | 0.31 | 025 |
|  | PVC blackness | 15 | 27 | 27 | 27 | 27 |
|  | Difference in PVC blackness from base | None | None | None | None | None |

CB Carbon black
AC Accompanying air current

In the Tables, the carbon black concentration indicates the weight (g) of carbon black contained per unit volume (m$^3$) of the accompanying gas in the piping of the reaction apparatus. The oxidation temperature indicates the temperature of the accompanying air current gas in the piping. The oxidation time represents the average residue time of carbon black in the piping of the reaction apparatus. The amount of oxidizing agent is represented by parts by weight of the oxidizing agent introduced based on 100 parts by weight of base carbon black reacted. The difference in PVC blackness from base represents the difference in PVC blackness between carbon black obtained by oxidation treatment and base carbon black before the oxidation treatment.

When Production Examples 3 to 6 and Example 73 are compared, even when the particle size is about same, when the volatile content/N$_2$SA ratio is 0.35 or above, PVC blackness suddenly improves, thus indicating critical significance of the value 0.35.

On the other hand, it was found from Production Example 2 that even if the volatile content/N$_2$SA ratio is 0.35 or above, if the particle size exceeds 14 nm, PVC blackness tends to be poor.

EXAMPLE 77 AND Production Examples 7 and 8

By using the producing furnace used in Examples 72 to 76, carbon blacks D to F were produced under production conditions shown in Table 35. Physical properties of obtained carbon blacks D to F are shown in Table 35.

EXAMPLE 78 AND Production Examples 9 and 10

Using carbon black D or E as a base, oxidation treatment was conducted by an accompanying air current type oxidation apparatus similar to one used in Example 72, under oxidation conditions shown in Table 36.

Physical properties of obtained carbon black are shown in Table 36.

Physical properties of commercially available carbon black "FW200" manufactured by DEGUSSA are also shown in Table 36.

TABLE 35

Production conditions and quality of carbon black

|  |  | Ex. 77 CB D | Prod. Ex. 7 CB E | Prod. Ex. 8 CB F |
|---|---|---|---|---|
| Oxidation conditions | Volume of combustion gas (Nm$^3$/h) | 750 | 250 | 250 |
|  | Oxidation temperature (° C.) | 1950 | 1750 | 1750 |
|  | Amount of material oil (kg/h) | 42 | 10 | 10 |
|  | Residue time during reaction (ms) | 13 | 35 | 8 |
| Physical properties | Average particle size (D) (nm) | 12.3 | 12.1 | 12.2 |
|  | (Dδ)/D (nm) | 0.22 | 0.40 | 0.42 |
|  | cDBP (ml/100 g) | 75 | 75 | 75 |
|  | D$_{mod}$ (nm) | 37 | 45 | 46 |
|  | D½ (nm) | 19 | 39 | 42 |
|  | D½/D$_{mod}$ ratio | 0.53 | 0.86 | 0.91 |
|  | Amount of iodide absorbed (mg/g) | 412 | 487 | 186 |
|  | N$_2$SA (m$^2$/g) | 445 | 641 | 282 |
|  | SEM (m$^2$/g) | 233 | 225 | 224 |
|  | N$_2$SA/SEM | 1.37 | 2.85 | 1.26 |
|  | ph | 6.8 | 7.2 | 6.5 |
|  | Toluene absorbance (%) | 99 | 96 | 22 |
|  | Volatile content (%) | 3.6 | 4.3 | 4.2 |
|  | PVC blackness | 27 | 20 | 22 |

CB Carbon black

TABLE 36

Oxidized carbon black by accompanying air current type nitric acid oxidation and acid carbon black as a comparison

|  | Carbon black | Ex. 78 Oxidized product of carbon black D | Prod. Ex. 9 Oxidized product of carbon black D | Prod. Ex. 10 FW200 by DEGUSSA |
|---|---|---|---|---|
| Oxidation conditions | Oxidation temperature (° C.) | 100 | 100 |  |
|  | Oxidation time (sec) | 30 | 30 |  |
|  | concentration of oxidizing agent (nitric acid) (parts by weight) | 112 | 112 |  |

TABLE 36-continued

Oxidized carbon black by accompanying air current type nitric acid oxidation and acid carbon black as a comparison

|  |  | Ex. 78 Oxidized product of carbon black D | Prod. Ex. 9 Oxidized product of carbon black D | Prod. Ex. 10 FW200 by DEGUSSA |
|---|---|---|---|---|
|  | Carbon black concentration (g/m$^3$) | 250 | 250 |  |
| Physical properties | Average particle size (D) (nm) | 12.3 | 12.1 | 15.6 |
|  | Dδ/D (nm) | 0.22 | 0.40 | 0.25 |
|  | D$_{mod}$ (nm) | 37 | 45 | 42 |
|  | D½ (nm) | 19 | 39 | 23 |
|  | D½/D$_{mod}$ ratio | 0.53 | 0.86 | 0.55 |
|  | cDBP (ml/100 g) | 75 | 75 | 96 |
|  | N$_2$SA (m$^2$/g) | 512 | 825 | 628 |
|  | SEM (m$^2$/g) | 233 | 225 | 182 |
|  | N$^2$SA/SEM | 2.19 | 3.60 | 3.45 |
|  | ph | 2.5 | 2.4 | 2.0 |
|  | Volatile content (%) | 18.2 | 20.3 | 19.4 |
|  | Amount of iodide absorbed: IA (mg/g) | 152 | 321 | 296 |
|  | IA/N$_2$SA (mg/g) | 0.29 | 0.66 | 0.47 |
|  | Volatile content + 0.1 × N$_2$SA | 233 | 285 | 256 |
|  | Acrylic paint blackness | 43 | 8 | 30 |
|  | Acrylic paint gross | 15 | 13 | 15 |
|  | Acrylic paint viscosity (c poise) | 2400 | 16200 | 9800 |
|  | PVC blackness | 28 | 20 | 26 |
|  | Masterbatch torque | 54 | 92 | 85 |
|  | Masterbatch reducibility | 5 | 1 | 2 |

Dδ/D

In the Tables, Dδ/D is represented by the value obtained by obtaining the particle size (D) by above-mentioned method for measuring the particle size (electron microscope method) and standard deviation (Dδ) and dividing Dδ by D.

PVC Blackness

For the measuring of PVC blackness, carbon black was added to a PVC (polyvinyl chloride) resin and dispersed by a twin roll mill, followed by sheeting to obtain a test specimen, whereupon blackness of the test specimen was visually evaluated and represented by a value relative to the standard values of 1, 10, 20 and 28 points which correspond to blackness of carbon black "#40", "#45", "MCF88" and "#2600", respectively, manufactured by Mitsubishi Chemical Corporation.

T %

Toluene coloring power (T %) was determined in accordance with ASTM D-1618-83.

Tests in Characteristic of LDPE Masterbatch

The test in characteristic of LDPE masterbatch was conducted by the following method. The maximum torque during kneading LDPE masterbatch and the diluted condition of masterbatch diluted in the resin were observed and photographed. Uniformity in dilution was visually observed to evaluate quality of diluted condition as reducibility.

Test sample carbon black in an amount of 50 wt % was blended to a LDPE resin, followed by kneading by a 250 cc Banbury mixer at 115° C. for 10 minutes. The torque transition during the kneading was recorded to obtain the maximum torque.

Blend Conditions

| LDPE resin | 101.89 g |
|---|---|
| Calcium stearate | 1.39 g |
| Irganox 1010 | 0.87 g |
| Test sample carbon black | 104.15 g |

Then, the mixture was diluted to a carbon black concentration of 1.2 wt % by a twin roll mill at 120° C. for 5 minutes.

Diluted Compound Preparation Conditions

| LDPE resin | 58.3 g |
|---|---|
| Calcium stearate | 0.2 g |
| Carbon black 50% - incorporated resin | 1.5 g |

The diluted compound was sheeted with a slit width of 0.3 mm, and the obtained sheet was cut into chips, which were then formed into a film of 65±3 μm on a hot plate of 240° C. The film was observed and photographed by an optical microscope with 20 magnifications. From the photograph, the amount of black striae by non-diluted masterbatch or black particles having a diameter of at least 50μ were visually observed. One having little non-diluted masterbatch was evaluated as "5", one having striae by non-diluted masterbatch as 3, and one having agglomerated large particles as 1.

Acrylic Paint Suitability

Acrylic paint suitability (suitability test in acrylic-styrene-melamine compounded paint type) was evaluated by the following method. By using acrylic-styrene-melamine compounded paint varnish (tradename: Acrose #6000 clear) and xylene-ethylbenzene compounded thinner (tradename: Acrose thinner) manufactured by Dainippon Toryo, 2.1 g of carbon black of the present invention, 14.9 g of the paint varnish and 10.0 g of the thinner were put in a closed glass bottle having an internal volume of 140 cc with 90 g of glass beads for dispersion having a diameter of 2.0 mm. The glass bottle and a glass bottle having standard carbon black blended in the same ratio, were arranged in a paint conditioner manufactured by Red Devil, and subjected to dispersion for 240 minutes. 3.0 g of the supernatant was taken as a test sample dispersed paint, and the viscosity was measured by using an E model viscometer manufactured by TOKIMEK. 51.4 g of the paint varnish was added into each dispersed paint remained in the glass bottle, which are then subjected to dispersion for further 5 minutes, and a suitable amount of the supernatant of the test sample paint thus prepared was taken. The test samples paints were arranged and coated on a smooth PET film by using a bar coater of 27 mill so that the uniform thickness can be obtained, and the film was left at room temperature for 30 minutes horizontally. The coated film was put horizontally in a constant temperature chamber controlled to be 120±10° C., and subjected to baking for 30 minutes. Then, it was taken from the constant temperature chamber and cooled, and blackness and gloss of each test sample coated film were visually evaluated. Blackness was evaluated by using the blackness of carbon black "#2650" manufactured by Mitsubishi Chemical Corporation, carbon black "FW200" manufactured by DEGUSSA, as reference values of 10 points and 30 points, respectively. Gloss was visually evaluated by using the gloss of "#2650" and "FW200" as reference values of 10 points and 15 points, respectively.

With regard to carbon black C of the Production Example 7, D$\delta$/D exceeds 0.35, and N$_2$SA/SEM exceeds 2.8, and PVC blackness is low as compared with carbon black of Examples having D$\delta$/D of at most 0.35 and N$_2$SA/SEM of at most 2.8.

In Production Example 9, application to an acrylic paint was attempted by adjusting the pH to be at most 2.5 by an oxidation treatment. However, D$\delta$/D exceeded 0.35, and N$_2$SA/SEM exceeded 2.8. As compared with carbon black of Examples having D$\delta$/D of at most 0.35 and N$_2$SA/SEM of at most 2.8, acrylic paint viscosity was significantly increased, acrylic paint blackness was low, and PVC blackness was still low.

In Production Example 8, D$\delta$/D exceeded 0.35, and PVC blackness was low as compared with carbon black of Examples having D$\delta$/D of at most 0.35. Toluene absorbance was also low.

In Production Example 10, N$_2$SA/SEM exceeded 2.8. Acrylic paint viscosity was high as compared with carbon black of Examples having N$_2$SA/SEM of at most 2.8, and acrylic paint blackness was low as compared with carbon black of Examples having N$_2$SA/SEM of at most 2.8. Masterbatch torque was also high.

EXAMPLES 79 TO 83

By using the same producing furnace used in Example 72, of which the scheme was shown in FIG. 18, carbon black G was produced under production conditions shown in Table 37. Physical properties of carbon black G are shown in Table 37.

Using carbon black G and carbon black B described in Table 32 as bases, an oxidation treatment was conducted under oxidation conditions shown in Table 38. Physical properties of obtained carbon black are shown in Table 38.

Comparative Examples 58 to 61

Physical properties of various commercially available acid carbon blacks are shown in Table 39.

Production Examples 11 and 12

Using commercially available carbon black "#2600" manufactured by Mitsubishi Chemical Corporation and carbon black B as bases, an oxidation treatment was conducted under oxidation conditions shown in Table 40. Physical properties of obtained carbon black are shown in Table 40.

TABLE 37

Production conditions and physical properties of base carbon black

|  |  | Carbon black G |
|---|---|---|
| Production conditions | Volume of combustion gas (Nm$^3$/h) | 750 |
|  | Temperature of combustion gas (° C.) | 1950 |
|  | Amount of material oil (kg/h) | 62 |
|  | Amount of potassium hydroxide (g/h) | 2160 |
| Physical properties | Average particle size (nm) | 15.0 |
|  | cDBP (ml/100 g) | 66 |
|  | D$_{mod}$ (nm) | 44 |
|  | D$_{½}$ (nm) | 24 |
|  | D$_{75}$ (nm) | 55 |
|  | Amount of iodide absorbed (mg/g) | 277 |
|  | N$_2$SA (m$^2$/g) | 293 |
|  | Volatile content (%) | 1.8 |

TABLE 38

Oxidation conditions of accompanying air current type nitric acid oxidation and physical properties of carbon black

|  |  | Ex. 79 | Ex. 80 | Ex. 81 | Ex. 82 | Ex. 83 |
|---|---|---|---|---|---|---|
| Oxidation conditions | Base carbon black | CB G | CB G | CB B | CB B | CB B |
|  | Oxidation temperature (° C.) | 150 | 150 | 150 | 150 | 150 |
|  | Oxidation time (sec) | 30 | 30 | 30 | 30 | 30 |
|  | Nitric acid based on carbon black (wt %) | 112 | 112 | 112 | 80 | 187 |
|  | Dust concentration (g/m$^3$) | 250 | 250 | 250 | 350 | 150 |
| Physical | Average particle size (nm) | 15.0 | 15.0 | 12.3 | 12.3 | 12.3 |

TABLE 38-continued

Oxidation conditions of accompanying air current type nitric acid oxidation and physical properties of carbon black

| | | Ex. 79 | Ex. 80 | Ex. 81 | Ex. 82 | Ex. 83 |
|---|---|---|---|---|---|---|
| proper-ties | $D_{mod}$ (nm) | 45 | 45 | 37 | 36 | 37 |
| | $D_{1/2}$ (nm) | 24 | 24 | 20 | 19 | 20 |
| | $D_{75}$ (nm) | 54 | 55 | 47 | 45 | 46 |
| | $D_{1/2}/D_{mod}$ ratio | 0.53 | 0.53 | 0.54 | 0.53 | 0.54 |
| | $D_{75}/D_{mod}$ ratio | 1.20 | 1.22 | 1.27 | 1.25 | 1.24 |
| | cDBP (ml/100 g) | 66 | 66 | 75 | 75 | 75 |
| | $N_2SA$ (m$^2$/g) | 329 | 352 | 576 | 581 | 592 |
| | Volatile content (%) | 13.2 | 16.7 | 20.5 | 22.2 | 23.1 |
| | Volatile content/$N_2SA$ (mg/m$^2$) | 0.40 | 0.47 | 0.36 | 0.38 | 0.39 |
| | Amount of iodide absorbed:IA (mg/g) | 152 | 142 | 223 | 232 | 252 |
| | IA/$N_2SA$ (mg/g) | 0.46 | 0.40 | 0.39 | 0.40 | 0.43 |
| | Volatile content + 0.1 × $N_2SA$ | 165 | 202 | 263 | 280 | 290 |
| | Acrylic paint blackness | 30 | 30 | 45 | 45 | 45 |
| | Acrylic paint gross | 15 | 15 | 15 | 15 | 15 |
| | Acrylic paint viscosity (c poise) | 1900 | 2000 | 2000 | 2100 | 2000 |

TABLE 39

Physical properties of various acid carbon blacks as powered state

| Carbon black | Comp. Ex. 58 FW200 by DEGUSSA | Comp. Ex. 59 M1300 by CABOT | Comp. Ex. 60 #2650 by MC | Comp. Ex. 61 #2350 by MC |
|---|---|---|---|---|
| Average particle size (nm) | 15.6 | 11.5 | 13.0 | 15.2 |
| $D_{mod}$ (nm) | 42 | 32 | 37 | 41 |
| $D_{½}$ (nm) | 23 | 27 | 29 | 88 |
| $D_{75}$ (nm) | 51 | 315 | 85 | 398 |
| $D_{½}/D_{mod}$ ratio | 0.55 | 0.84 | 0.78 | 2.15 |
| $D_{75}/D_{mod}$ ratio | 1.21 | 9.84 | 2.30 | 9.71 |
| cDBP (ml/100 g) | 96 | 79 | 48 | 43 |
| $N_2SA$ (M$^2$/g) | 628 | 595 | 419 | 581 |
| Volatile content (%) | 19.4 | 16.5 | 8.5 | 7.5 |
| Volatile content/$N_2SA$ (mg/m$^2$) | 0.31 | 0.28 | 0.24 | 0.26 |
| Amount of iodide absorbed:IA (mg/g) | 296 | 400 | 185 | 156 |
| IA/$N_2SA$ (mg/g) | 0.47 | 0.67 | 0.51 | 0.40 |
| Volatile content + 0.1 × $N_2SA$ | 257 | 224 | 121 | 104 |
| Acrylic paint blackness | 30 | 20 | 10 | 6 |
| Acrylic paint gross | 15 | 10 | 10 | 7 |
| Acrylic paint viscosity (c poise) | 9800 | 8200 | 2800 | 2200 |

MC Mitsubishi Chemical Corporation

TABLE 40

Oxidation conditions of accompanying air current type nitric acid oxidation and physical properties of obtained carbon black

| | Base carbon black | Production Example 11 #2650 | Production Example 12 Carbon black B |
|---|---|---|---|
| Oxidation conditions | Oxidation temperature (° C.) | 150 | 150 |
| | Oxidation time (sec) | 30 | 30 |
| | Concentration of oxidizing agent (nitric acid) (parts by weight) | 112 | 56 |
| | Carbon black concentration (g/m$^3$) | 250 | 500 |
| Physical properties | Average particle size (nm) | 13.0 | 12.3 |
| | $D_{mod}$ (nm) | 37 | 37 |
| | $D_{½}$ (nm) | 29 | 20 |
| | $D_{75}$ (nm) | 85 | 47 |
| | $D_{½}/D_{mod}$ ratio | 0.78 | 0.54 |
| | $D_{75}/D_{mod}$ ratio | 2.30 | 1.27 |
| | cDBP (ml/100 g) | 48 | 75 |
| | $N_2SA$ (m$^2$/g) | 419 | 594 |
| | Volatile content (%) | 17.6 | 18.6 |
| | Volatile content/$N_2SA$ (mg/m$^2$) | 0.42 | 0.31 |
| | Amount of iodide absorbed:IA (mg/g) | 185 | 295 |
| | IA/$N_2SA$ (mg/g) | 0.44 | 0.40 |
| | Volatile content + 0.1 × $N_2SA$ | 218 | 202 |
| | Acrylic paint | 18 | 35 |

TABLE 40-continued

Oxidation conditions of accompanying air current type nitric acid oxidation and physical properties of obtained carbon black

| Base carbon black | Production Example 11 #2650 | Production Example 12 Carbon black B |
|---|---|---|
| blackness Acrylic paint gross | 10 | 13 |
| Acrylic paint viscosity (c poise) | 2000 | 5500 |

Carbon blacks of Examples and carbon blacks of Comparative Examples and Production Examples are compared, thereby it was found that one having a particle size of at most 16 nm, $D_{1/2}/D_{mod}$ of at most 0.6 and a volatile content per unit area (represented as "volatile content/$N_2SA$" in Table, unit: mg/m$^2$) of at least 0.35, was excellent in various optical suitability as compared with one of out of above-mentioned range.

EXAMPLE 84

Using carbon black "#2600" manufactured by Mitsubishi Chemical Corporation having an average particle size of 13.0 nm, a $N_2SA$ specific surface area of 370 m$^2$/g, a CrDBP oil absorption of 48 ml/100 g and a volatile content of 2.1 wt %, as a base, an oxidation treatment was conducted by using an oxidation apparatus shown in FIG. 19.

Specifically, a nitric acid containing gas, having a nitric acid gas concentration of 8.0 vol %, obtained by vaporizing 98% concentrated sulfuric acid into air, was pre-heated to 150° C., and introduced into a reaction apparatus at a flow rate of 10 m/sec, in a state where the temperature in the reaction apparatus was controlled to be 150° C.

Into the air current, carbon black was supplied in a constant rate of 56 g/min by the apparatus for supplying and dispersing carbon black as shown in FIG. 19, so that the amount of nitric acid was 91 parts by weight based on 100 parts by weight of carbon black, and the carbon black was dispersed in the air current by an ejector, to conduct an oxidation reaction, wherein the residue time of carbon black in the reaction apparatus was adjusted to be 30 seconds. Then, the air current having carbon black dispersed was cooled to 50° C., and carbon black was separated from the air by a collecting bag. 1 kg of oxidized carbon black thus obtained was treated by the desorption apparatus of fluidized bed type shown in FIG. 21 to conduct desorption.

Carbon black after desorption had a volatile content of 18.2 wt %, a $N_2SA$ specific surface area of 403 m$^2$/g, a volatile content/$N_2SA$ ratio of 0.45 mg/m$^2$, pH 2.2 and an amount of NOx of 75 ppm (carbon black before desorption had an amount of NOx of 4600 ppm).

EXAMPLE 85

The same operations as in Example 84 were conducted except that the nitric acid concentration of the nitric acid-containing gas introduced into the reaction apparatus was adjusted to be 10.0 vol %, and the nitric acid concentration was 112 parts by weight based on 100 parts by weight of carbon black.

Obtained carbon black after desorption operation had a volatile content of 20.7 wt %, a $N_2SA$ specific surface area of 405 m$^2$/g, a volatile content/$N_2SA$ ratio of 0.51 mg/m$^2$, a pH of 2.2 and an amount of NOx of 72 ppm.

EXAMPLE 86

The same operations were conducted as in Example 84 except that the residue time of carbon black in the reaction apparatus was adjusted to be 20 seconds, to conduct an oxidation reaction.

Obtained carbon black after desorption operation had a volatile content of 16.8 wt %, a $N_2SA$ specific surface area of 396 m$^2$/g, a volatile content/$N_2SA$ ratio of 0.42 mg/m$^2$, a pH of 2.2 and an amount of NOx of 81 ppm.

EXAMPLE 87

Using carbon black "#47" manufactured by Mitsubishi Chemical Corporation having an average particle size of 23.4 nm, a $N_2SA$ specific surface area of 126 m$^2$/g and a volatile content of 0.6 wt %, as a base, an oxidation treatment was conducted by using an oxidation apparatus shown in FIG. 19.

Specifically, a nitric acid containing gas, having a nitric acid gas concentration of 5.0 vol %, obtained by vaporizing 70% concentrated sulfuric acid into air, was pre-heated to 100° C., and introduced into a reaction apparatus at a flow rate of 10 m/sec, in a state where the temperature in the reaction apparatus was controlled to be 100° C.

Into the air current, carbon black was supplied in a constant rate of 240 g/min by the apparatus for supplying and dispersing carbon black as shown in FIG. 19, so that the amount of nitric acid was 15 parts by weight based on 100 parts by weight of carbon black, and the carbon black was dispersed in the air current by an ejector, to conduct an oxidation reaction, wherein the residue time of carbon black in the reaction apparatus was adjusted to be 20 seconds. Then, the air current having carbon black dispersed was cooled to 50° C., and carbon black was separated from the air by a collecting bag. 1 kg of oxidized carbon black thus obtained was treated by the desorption apparatus of fluidized bed type shown in FIG. 21 to conduct desorption.

Carbon black after desorption had a volatile content of 3.6 wt %, a $N_2SA$ specific surface area of 126 m$^2$/g, a volatile content/$N_2SA$ ratio of 0.27 mg/m$^2$, a pH of 3.2 and an amount of NOx of 31 ppm.

The fluidity of an ink having the carbon black dispersed was 537 mm/hour.

EXAMPLES 88 AND 89

The same operations as in Example 87 were conducted except that conditions shown in Table 43 were employed. Physical properties of obtained carbon black are shown in Table 43.

Production Example 13

The same operations as in Example 84 were conducted except that an ozone-containing gas having an ozone concentration of 1.6 vol % was used instead of the nitric acid-containing gas. Physical properties of obtained carbon black are shown in Table 41.

Production Example 14

The same operation as in Example 84 were conducted except that conditions shown in Table 41 were employed. The gas used for the oxidation treatment was one having a nitrogen dioxide concentration of 10.0 vol %. Physical properties of obtained carbon black are shown in Table 41.

Production Example 15

500 g of "#2600" and 500 g of diluted nitric acid of 70 wt % were mixed in a super mixer at 1000 rpm, and all the mixture was packed in the desorption apparatus of fluidized bed type shown in FIG. 21. A pre-heated air of 150° C. was introduced to the apparatus at a rate of 100 l/min to conduct desorption for 3 hours by adjusting the temperature of the gas in the apparatus to be 150° C. Then, the temperature was decreased to 30° C., and oxidized carbon black was obtained.

Obtained oxidized carbon black had a volatile content of 11.5 wt %, a $N_2SA$ specific surface area of 422 $m^2/g$, a volatile content/$N_2SA$ ratio of 0.27 Mg/$m^2$, a pH of 2.2 and a NOx content of 118 ppm. Almost all the portion of carbon black was in a form of hard particles, and the hardness of the particles were 35.4 g weight.

Production Example 16

500 g of "#2600" was packed in a rotary kiln having a mixing blade, provided at the periphery having a diameter of 350 mm and a length of 400 mm and installed in a heating oven. In a state where the kiln was rotated at 15 rpm, and the temperature in the kiln was 150±20° C., 70% nitric acid was jetted at the kiln center at a rate of 10 g/min for 30 minutes by a pressure spray nozzle, so that the amount of nitric acid was 40 parts by weight based on 100 parts by weight of carbon black, to conduct oxidation. Then, the air was introduced into the kiln at a rate of 200 l/min for 60 minutes to conduct desorption of the remaining nitrogen oxide from carbon black.

Obtained carbon black had a volatile content of 15.2 wt %, a $N_2SA$ specific surface area of 483 $m^2/g$, a volatile content/$N_2SA$ specific surface area of 0.31 mg/$m^2$, a pH of 2.2 and a NOx content of 86 ppm. Part of obtained carbon black was in a form of hard particles, and the hardness of the particles was 27.2 g weight.

Production Examples 17 and 18

The same operations as in Example 84 were conducted except that the treatment conditions were as shown in Table 42. Physical properties of obtained oxidized carbon black are shown in Table 42.

Production Examples 19 and 20

The same operations as in Example 87 were conducted except that the treatment conditions were as shown in Table 43. The accompanying gas for the oxidation treatment used in Production Example 19 was a nitric acid-containing gas obtained by vaporization of concentrated nitric acid, just like in Example 87, and the accompanying gas for the oxidation treatment used in Production Example 20 was a gas having a nitrogen dioxide concentration of 10.0 vol %.

Physical properties of obtained oxidized carbon black are shown in Table 43.

As evident from Examples and Production Examples, by conducting the oxidation reaction in such a manner that carbon black was dispersed in the mixed gas stream containing gaseous nitric acid, which was then contacted with nitric acid gas in the state where carbon black was dispersed by the energy of the air current, a problem that carbon black is agglomerated to form hard particles could be dissolved.

TABLE 41

Oxidation of Mitsubishi carbon black #2600 by various oxidizing agents

|  | Ex. 84 | Prod. Ex. 13 | Prod. Ex. 14 | Prod. Ex. 16 | #2600 |
|---|---|---|---|---|---|
| Type of oxidizing agent | Nitric acid gas | Ozone gas | Nitrogen dioxide | Liquid nitric acid | None |
| Oxidation apparatus | AC | AC | AC | Rotary kiln | — |
| Carbon black concentration | 250 g/$m^3$ | 10 g/$m^3$ | 20 g/$m^3$ | — | — |
| Amount of oxidizing agent *1 | 91 | 105 | 220 | 40 | — |
| Oxidation temperature | 150° C. | 27° C. | 150° C. | 150° C. | — |
| Reaction time | 30 sec | 30 sec | 30 sec | 30 min | — |
| Volatile content | 18.2% | 10.2% | 11.6% | 15.2% | 2.1% |
| $N_2SA$ | 403 $m^2/g$ | 368 $m^2/g$ | 407 $m^2/g$ | 483 $m^2/g$ | 370 $m^2/g$ |
| Volatile content/$N_2SA$ | 0.45 | 0.28 | 0.29 | 0.31 | 0.06 |
| Hard particles | None | None | None | Partially | None |

*1 Represented by parts by weight based on 100 parts by weight of carbon black
AC Accompanying air current

TABLE 42

Oxidation conditions of accompanying air current type nitric acid oxidation and physical properties of carbon black

|  | Ex. 84 | Ex. 85 | Ex. 86 | Prod. Ex. 17 | Prod. Ex. 18 |
|---|---|---|---|---|---|
| Base | #2600 | #2600 | #2600 | #2600 | #2600 |
| Carbon black concentration | 250 g/$m^3$ | 250 g/$m^3$ | 250 g/$m^3$ | 250 g/$m^3$ | 250 g/$m^3$ |
| Nitric acid concentration | 8% | 10% | 10% | 10% | 10% |
| Amount of nitric acid *1 | 91 | 112 | 112 | 112 | 112 |
| Oxidation temperature | 150° C. | 150° C. | 150° C. | 100° C. | 100° C. |
| Reaction time | 30 sec | 30 sec | 20 sec | 30 sec | 20 sec |
| Volatile content | 18.2% | 20.7% | 16.8% | 13.1% | 13.0% |
| $N_2SA$ | 403 $m^2/g$ | 405 $m^2/g$ | 396 $m^2/g$ | 391 $m^2/g$ | 389 $m^2/g$ |
| Volatile content/$N_2SA$ | 0.45 | 0.51 | 0.42 | 0.33 | 0.33 |

*1 Represented by parts by weight based on 100 parts by weight of carbon black

TABLE 43

Accompanying air current type oxidation treatment of Mitsubishi carbon black #47

|  | Ex. 87 | Ex. 88 | Ex. 89 | Prod. Ex. 19 | Prod. Ex. 20 |
|---|---|---|---|---|---|
| Base | #47 | #47 | #47 | #47 | #47 |
| Type of oxidizing agent | Nitric acid gas | Nitric acid gas | Nitric acid gas | Nitric acid gas | Nitrogen dioxide |
| Carbon black concentration | 950 g/$m^3$ | 950 g/$m^3$ | 1400 g/$m^3$ | 950 g/$m^3$ | 250 g/$m^3$ |
| Nitric acid/$NO_2$ concentration | 5% | 5% | 5% | 5% | 10% |
| Amount of Oxidizing agent | 15% | 15% | 15% | 15% | 110% |

TABLE 43-continued

Accompanying air current type oxidation treatment of Mitsubishi carbon black #47

| *1 | Ex. 87 | Ex. 88 | Ex. 89 | Prod. Ex. 19 | Prod. Ex. 20 |
|---|---|---|---|---|---|
| Oxidation temperature | 100° C. | 70° C. | 100° C. | 150° C. | 100° C. |
| Reaction time | 20 sec | 20 sec | 20 sec | 20 sec | 30 sec |
| Volatile content | 3.6% | 3.1% | 2.7% | 3.4% | 3.0% |
| $N_2SA$ | 126 $m^2/g$ | 126 $m^2/g$ | 126 $m^2/g$ | 138 $m^2/g$ | 141 $m^2/g$ |
| Volatile content/$N_2SA$ | 0.29 | 0.25 | 0.21 | 0.25 | 0.21 |
| Ink left fluidity | 537 mm | 634 mm | 218 mm | 85 mm | 12 mm |

*1 Represented by parts by weight based on 100 parts by weight of carbon black

Hardness of Granulated Particles

The method for measuring the hardness of the granulated particles was determined in accordance with JIS K1510-88b.

pH

The method for measuring the pH was determined in accordance with ASTM D-1512-84.

Amount of NOx Content 50 ml of 0.05 wt % aqueous nitric acid solution was added to 1.0 g of carbon black in a flask, followed by stirring by a stirrer for 30 minutes to elute NOx in carbon black, and carbon black were separated from supernatant solution by a centrifugal separator. To 20 ml of the supernatant solution, 15 ml of 0.0193 mol/L aqueous sulfanilamide solution having the pH preliminarily adjusted to be 7.0±0.1 by sodium hydroxide and acetic acid, and 0.5 g of zinc powder were added, and pure water was added thereto so that the total volume was 100 ml, followed by mixing for 1 minute. The mixed solution was filtrated with a filter vapor, 20 ml of the filtrate was taken, 3 ml of 20 wt % aqueous hydrochloric acid solution and 1 ml of 0.01 wt % N-1-naphthylethylenediamine solution were added thereto, and pure water was added so that the total volume was 25 ml, followed by mixing, and the mixture was left for 15 minutes at a temperature of from 15 to 30° C. Then, the solution was put in a quartz cell for measuring absorbance, and absorbance was measured by an absorbance measuring apparatus having the wavelength adjusted to be 545 nm. By using a calibration regression formula of the nitrogen dioxide ($NO_2$) concentration and the absorbance, prepared by the results of preliminarily measuring absorbance of at least 3 potassium nitrate solutions having known concentration, by conducting above-mentioned operations after separation by the centrifugal separator, the $NO_2$ concentration of the measured solution was calculated, and the NOx concentration contained in carbon black was determined by the formula:

*Concentration of NOx contained (ppm)=(the $NO_2$ concentration of the measured solution)×50/20.*

Left Fluidity of Ink 38.0 g of a phenol resin MS-800 and 2.0 g of an alkyd resin F-104, each manufactured by Showa Varnish, and 5.7 g of No. 6 solvent manufactured by Nippon Sekiyu were mixed by a disperser to prepare a mixed varnish. A test sample having 45.7 g of the mixed varnish and 20.0 g of carbon black mixed in a polyethylene cup, was kneaded by a three roll mill repeatedly about from three times to seven times, so that the kneaded ink had a dispersibility of at most 10 µm at a particle gauge of a full span of 50 µm, to prepare a dispersed ink.

20.0 g of the dispersed ink and 23.8 g of the mixed varnish were kneaded by a three roll mill for three times, 7.64 g of the No. 6 solvent was added thereto, followed by further kneading for three times, to prepare a prepared ink.

2.0 g of the prepared ink and 0.28 g of the No. 6 solvent were kneaded by an ointment spatula on a glass plate for at least 3 minutes. 0.7±0.1 g of the ink was dropped on a smooth glass plate put horizontally, which was then left as it was for 3 hours at a temperature of 25±5° C. Then, the glass plate was turned up vertically, and the length of the ink flowed in 1 hour was measured to determine the fluidity.

INDUSTRIAL APPLICABILITY

By the present invention, carbon black which satisfies blackness and dispersibility, which have been believed to be in an antinomic relation and hardly satisfied simultaneously, and which improves productivity, when used as a black pigment for a resin coloring agent, a printing ink or a coating material, can be obtained.

Further, carbon black which is excellent in prevention of deterioration when used for a resin composition, excellent in wear resistance when used for a rubber composition, excellent in effect of preventing aggregation when used for a coating material composition, and which has a high safety, can be obtained. Accordingly, carbon black of the present invention is highly useful for preparation of a resin coloring agent, a coating material or a rubber composition.

Further, by the present invention, it becomes possible to continuously conduct production of carbon black stably at high temperature. Carbon black of high quality, such as carbon black having a sharp aggregation distribution and significantly reduced ash content, can be continuously and effectively obtained.

When carbon black of the present invention is used as a black pigment for a resin coloring agent, a printing ink or a coating material, high blackness can be obtained which has not been obtained by conventional carbon black. Further, in a case of using carbon black having the same particle size and CDBP as conventional one, the same or higher blackness and dispersibility can be satisfied simultaneously. Thus, the present invention is industrially useful.

What is claimed is:

1. A method for producing a carbon black, the method comprising using a producing Furnace having
   a first reaction zone wherein a high temperature combustion gas stream is formed,
   a second reaction zone having a choke part wherein a hydrocarbon feed stock is mixed with the obtained high temperature combustion gas stream to produce a carbon black, and
   a third reaction zone located downstream to the second reaction zone for terminating the reaction, wherein
   the choke part length is at least 800 nm;
   the choke part diameter is at most 170 mm;
   the oxygen concentration in the combustion gas at the part where the feed stock is introduced is at most 3 vol %; and the obtained carbon black has an average particle size of at most 25 nm, a $D_{1/2}/D_{mod}$ ratio of at most 0.6 and a $D_{75}/D_{mod}$ ratio of at most 1.3.

2. The method according to claim 1, wherein the oxygen concentration in the combustion gas at the part where the feed stock is introduced is from 0.05 to 1 vol %.

3. The method according to claim 1, wherein the obtained corbon black has an average particle size of at most 20 nm.

4. The method according to claim 1, where the obtained carbon black has a dispersibility index of at most 150.

5. The method according to claim 1, wherein the obtained carbon black has $D_{mod}$ of at most 50.

6. The method according to claim 1, wherein the flow rate of the combustion gas in the choke part is at least 250 m/s.

7. The method according to claim 1, wherein the turbulent mixing speed at the part where the feed stock is introduced is at least 120/s.

* * * * *